US006574778B2

(12) United States Patent
Chang et al.

(10) Patent No.: US 6,574,778 B2
(45) Date of Patent: Jun. 3, 2003

(54) BLOCK BASED DESIGN METHODOLOGY

(75) Inventors: Henry Chang, Sunnyvale, CA (US); Larry Cooke, Los Gatos, CA (US); Merrill Hunt, Escondido, CA (US); Wuudiann Ke, Cupertino, CA (US); Christopher K. Lennard, Sunnyvale, CA (US); Grant Martin, Pleasanton, CA (US); Peter Paterson, Mission Viejo, CA (US); Khoan Truong, Milpitas, CA (US); Kumar Venkatramani, Saratoga, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 283 days.

(21) Appl. No.: 09/754,725

(22) Filed: Jan. 4, 2001

(65) Prior Publication Data

US 2001/0025369 A1 Sep. 27, 2001

Related U.S. Application Data

(62) Division of application No. 09/410,356, filed on Sep. 30, 1999, now Pat. No. 6,269,467.
(60) Provisional application No. 60/102,566, filed on Sep. 30, 1998.

(51) Int. Cl.[7] .............................................. G06F 17/50
(52) U.S. Cl. ................................................ 716/1; 716/4
(58) Field of Search ............................... 716/1, 2, 4, 11, 716/18; 703/22

(56) References Cited

U.S. PATENT DOCUMENTS

| 4,858,175 A | 8/1989 | Sato |
| 5,519,633 A | 5/1996 | Chang et al. |
| 5,553,002 A | 9/1996 | Dangelo et al. |
| 5,663,076 A | 9/1997 | Rostoker et al. |
| 6,102,961 A | * 8/2000 | Lee et al. .................. 716/1 |

FOREIGN PATENT DOCUMENTS

| WO | WO 95/31778 | 11/1995 |
| WO | WO 97/46959 | 12/1997 |
| WO | WO 98/13776 | 4/1998 |

OTHER PUBLICATIONS

Madachy, R. (1994) "Knowledge–Based Risk Assessment and Cost Estimation," *IEEE* pp. 172–178.

Larson, N. et al. (1996) "Managing Design Processes: A Risk Assessment Approach," *IEEE Trans. on Systems, Man, and Cybernetics—Part A: Systems and Humans,* 26(6):749–759.

Jacome, M.F. et al. (1997) "NREC: Risk Assessment and Planning of Complex Designs," *IEEE Design and Test of Computers,* pp. 42–49.

Schütz, M. (1995) "How to Efficiently Build VHDL Testbenches," *IEEE* pp. 554–559.

(List continued on next page.)

*Primary Examiner*—Leigh M. Garbowski
(74) *Attorney, Agent, or Firm*—Reed Smith Crosby Heafey

(57) ABSTRACT

A method and apparatus for designing a circuit system, including selecting a plurality of pre-designed circuit blocks to be used to design the circuit system, collecting data reflecting the experience of the designer regarding the pre-designed circuit blocks, the designer's experience being adaptable to a processing method, accepting or rejecting a design of the circuit system in a manner based on the designer's experience data and acceptable degree of risk, upon acceptance, forming block specifications containing criteria and modified constraints for each of the circuit blocks, upon acceptance, forming block specifications for deploying the circuit blocks on a floor plan of a chip, as a system on a chip, in compliance with the criteria and modified constraints, and substantially without changing the selected circuit block and the processing method.

6 Claims, 41 Drawing Sheets

OTHER PUBLICATIONS

Bauer, M. et al. (1997) "Hardware/Software Co–Simulation in a VHDL–based Test Bench Approach," *Proceedings of the Design Automation Conference, US, New York, ACM*, 34:774–779.

"Integrated Set of Design Verification Tools," *IBM Technical Disclosure Bulletin* 38(5):329–333 (1995).

Anderson, T.L. et al. (1997) "Test Requirements for Embedded Core–based Systems and IEEE P1500," *International Test Conference* 28:191–198.

Sachs, H. (1995) "All–Inclusive Approach to System Design Offers Flexibility Over Single On–chip Bus Method," *Computer Design* 37(7):97–98.

Passerone, R. et al. (1988) "Automatic Synthesis of Interfaces Between Incompatible Protocols," *Proceedings 1998 Design and Automation Conference*, pp. 8–13.

Remaklus, W. (1998) "On–Chip Bus Structure for Custom Core Logic Designs," *IEEE* pp. 7–14.

Rowson, J. et al. (1997) "Interface–Based Design," *Proceedings 1997 Design Automation Conference*, pp. 9–13.

Rincon, A.M. et al. (1997) "Core+ASIC Methodology: The Pursuit of System–on–a–Chip," *WESCON/97 Conference Proceedings*, pp. 46–54.

Gupta, R.K. et al. (1997) "Introducing Core–Based System Design," *IEEE Design and Test of Computers*, 14(4):15–25.

"Block–Based Design Methodology Documentation," by Cadence Design Systems, Inc., Services Research & Development, Project Alba, Version 1.2, May 21, 1999.

Merrill Hunt and Jim Rowson, "Blocking in a system on a chip", IEEE Spectrum, Nov. 1996, pp. 35–41.

Michael Keating and Pierre Bricaud, "Reuse Methodology Manual for System–On–A–Chip Designs", Kluwer Academic Publishers, 1998. No Page #.

Virtual Socket Interface Alliance Architecture Document. Version 1.0, Mar. 1997. No Page #.

Virtual Socket Interface Alliance. Analog/Mixed–Signal Development Working Group, "Analog/Mixed–Signal VSI Extension Specification", AMS 1 1.0, 1998. No Page #.

Virtual Socket Interface Alliance. On–Chip Bus Development Working Group, "On–Chip Bus Attributes Specification, Version 1.0", 1988. No Page #.

Virtual Socket Interface Alliance. Implementation/Verification Development Working Group, Specification 1, Version 1.0 (I/VI 1.0), "Structural Netlist and Hard VC Physical Data Types", 1998. No Page #.

National Technology Roadmap for Semiconductors, 1997. No Author Name No Page #.

Steve Glaser, "IP fuels a transformation of culture, companies and cooperation", Electronic Design, Jan. 12, 1998, pp. 55–62.

Digital Systems Testing and Testable Design, revised ed. By Miron Abramovici, Melvin A. Breuer, and Arthur Friedman, IEEE Press Marketing, Sep. 1994. No Page #.

A.J. Van de Goor, "Testing Semiconductor Memories: Theory and Practice", Delft Univ. of Technology, The Netherlands, published by John Wiley, 1991.

* cited by examiner

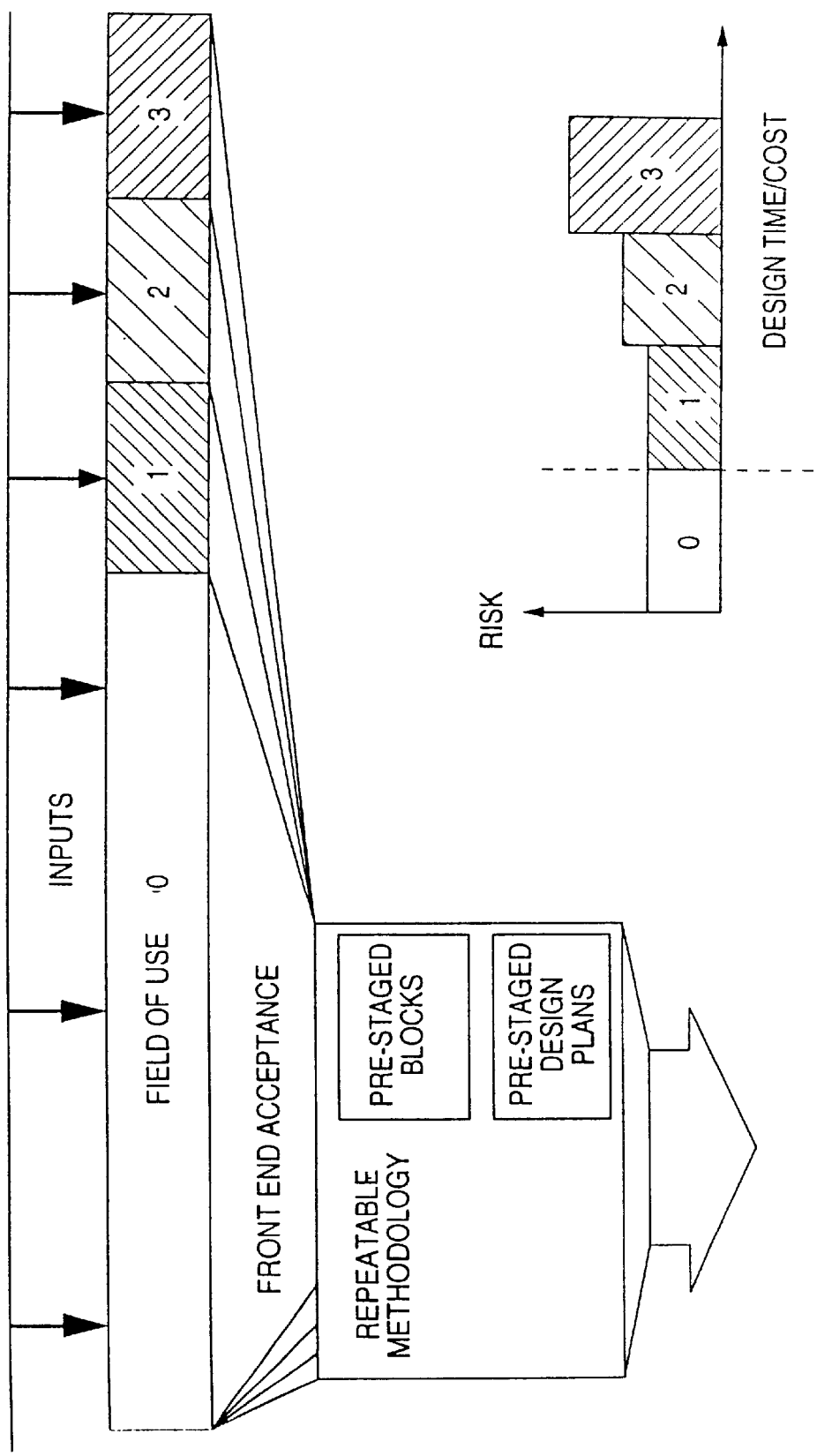

| ASSESSMENT AXIS | CONSTRAINT TYPE | CONSTRAINT CLASS | ROUTING REFINEMENT | EXAMPLE CRITICALITY MEASURES |
|---|---|---|---|---|
| POWER | PER MODE OF OPERATION | RELATIVE | MEDIUM | (EXPECTED-BLOCK-POWER ERROR)+ (BLOCK-ROUTING CRITICALITY) * 0.5 * $V^2$ * $E_{BLOCK}$ |
| PERFORMANCE | TRANSPORT DELAY | ABSOLUTE | FINE | N/A (I.E., LOCAL-CONNECTION NOT A SYSTEM-SUMMED CRITERIA) |
| | LATENCY | RELATIVE | MEDIUM | CRITICALITY OF LATENCY-PATH TO SYSTEM: 1/((1-Pr(STARVATION))* ((REQUIRED PATH-LATENCY)- Σ (BLOCK LATENCY) + Σ (BUS LATENCY)))) CRITICALITY OF BLOCK TO LATENCY PATH: (LATENCY ERROR) / (1-Pr(STARVATION)) |
| | THROUGHPUT | ABSOLUTE | COARSE | N/A (I.E., DOMINATED BY SINGLE BOTTLE-NECK BLOCKS) |
| AREA | AREA | RELATIVE | MEDIUM | (AREA ERROR) + (BLOCK-ROUTING CRITICALITY)*α |
| COST | NRE | RELATIVE | COARSE | |
| | COST PER UNIT | RELATIVE | COARSE | |
| SCHEDULE | RESOURCE ALLOCATION | MIXED | COARSE | |
| | DELIVERY TIMELINES | RELATIVE | COARSE | |
| RISK | POSSIBILITY OF ERROR | MIXED | COARSE | |
| | IMPACT OF ERROR | MIXED | COARSE | |

FIG. 27

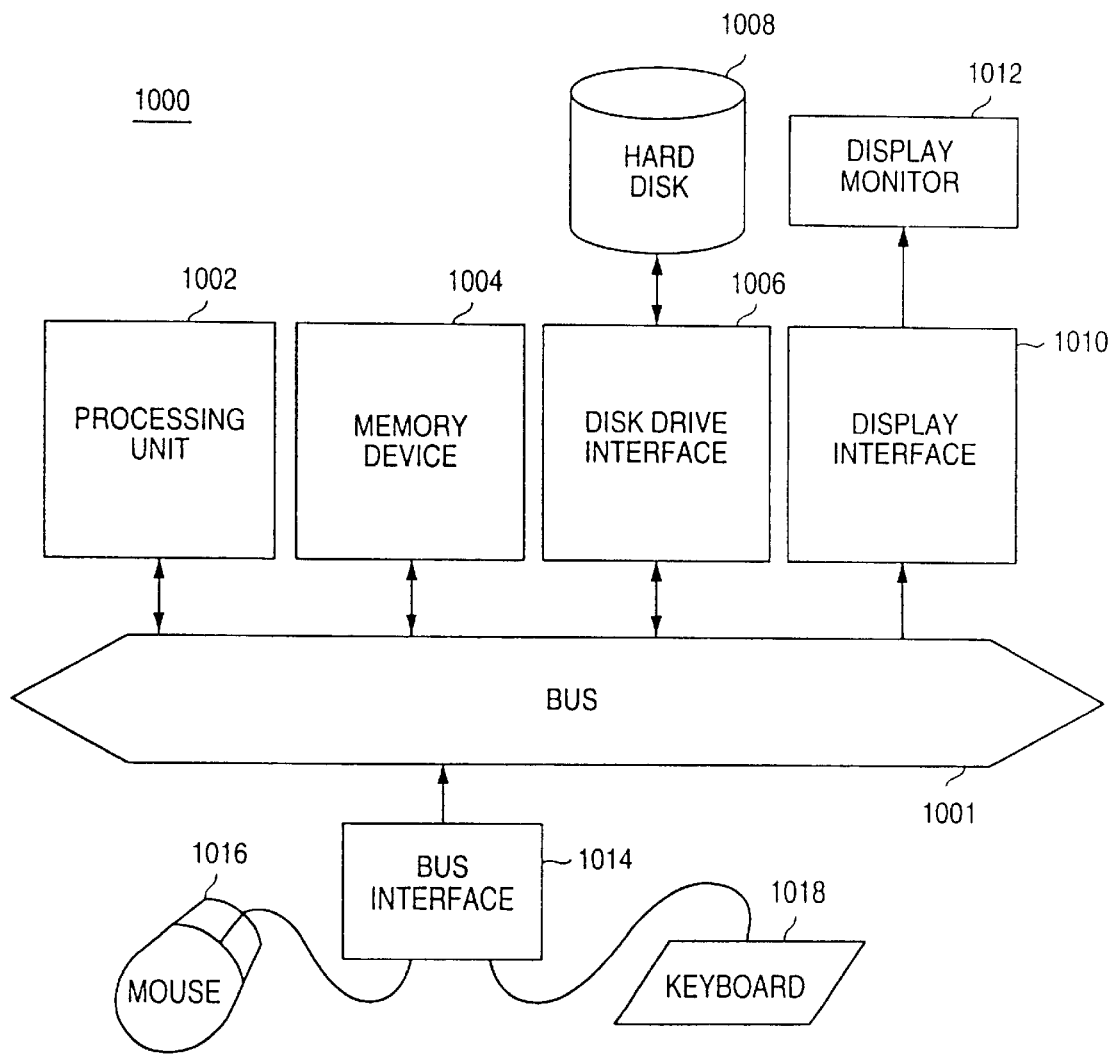
FIG. 38
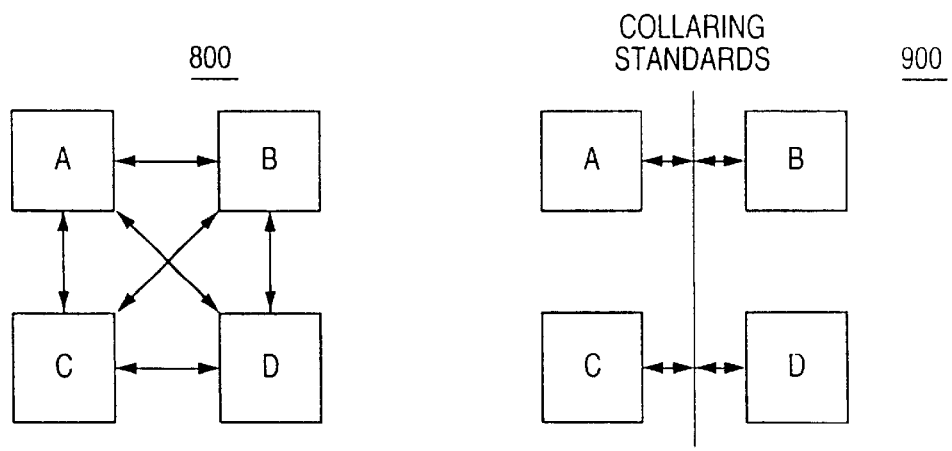
FIG. 39  FIG. 40

| FROM \ TO | BLOCK 1 | BLOCK 2 | BLOCK 3 | MEMORY | PCI | PIO |
|---|---|---|---|---|---|---|
| BLOCK 1 | 0 | 10,000 | 100 | 10,000 | 100 | 100 |
| BLOCK 2 | 8,000 | 0 | 100 | 2,000 | 10,000 | 100 |
| BLOCK 3 | 200 | 100 | 0 | 100 | 200 | 100 |
| MEMORY | 6,000 | 6,000 | 100 | 0 | 100 | 100 |
| PCI | 6,100 | 4,100 | 0 | 200 | 0 | 0 |
| PIO | 0 | 0 | 0 | 0 | 0 | 0 |

FIG. 43

| FROM \ TO | BLOCK 1 | BLOCK 2 | BLOCK 3 | MEMORY | PCI | PIO |
|---|---|---|---|---|---|---|
| BLOCK 1 | 0 | 200 | 25 | 200 | 4 | 25 |
| BLOCK 2 | 160 | 0 | 100 | 40 | 200 | 25 |
| BLOCK 3 | 25 | 100 | 0 | 25 | 25 | 25 |
| MEMORY | 120 | 180 | 25 | 0 | 6 | 25 |
| PCI | 122 | 82 | 0 | 50 | 0 | 0 |
| PIO | 0 | 0 | 0 | 0 | 0 | 0 |

FIG. 44

| FROM \ TO | BLOCK 1 | BLOCK 2 | BLOCK 3 | MEMORY | PCI | PIO |
|---|---|---|---|---|---|---|
| BLOCK 1 | n/a | 50 | 1,000 | 50 | 100 | 1,000 |
| BLOCK 2 | 50 | n/a | 1,000 | 300 | 100 | 1,000 |
| BLOCK 3 | 1,000 | 1,000 | n/a | 500 | 500 | 1,000 |
| MEMORY | 50 | 50 | 500 | n/a | 100 | 1,000 |
| PCI | 100 | 100 | n/a | 50 | n/a | n/a |
| PIO | n/a | n/a | n/a | n/a | n/a | n/a |

FIG. 45

| FROM \ TO | SITE 1 | SITE 2 | SITE 3 | SITE 4 | SITE 5 | SITE 6 |
|---|---|---|---|---|---|---|
| SITE 1 | 0 | 1 | 4 | 9 | 16 | 25 |
| SITE 2 | 1 | 0 | 1 | 4 | 9 | 16 |
| SITE 3 | 4 | 1 | 0 | 1 | 4 | 9 |
| SITE 4 | 9 | 4 | 1 | 0 | 1 | 4 |
| SITE 5 | 16 | 9 | 4 | 1 | 0 | 1 |
| SITE 6 | 25 | 16 | 9 | 4 | 1 | 0 |

FIG. 46

| FROM \ TO | PC1 | BLOCK 2 | BLOCK 1 | MEMORY | BLOCK 3 | PIO |
|---|---|---|---|---|---|---|
| PCT | 0 | 4,100 | 6,100 | 200 | 0 | 0 |
| BLOCK 2 | 10,000 | 0 | 8,000 | 2,000 | 100 | 100 |
| BLOCK 1 | 100 | 10,000 | 0 | 10,000 | 100 | 100 |
| MEMORY | 100 | 6,000 | 6,000 | 0 | 100 | 100 |
| BLOCK 3 | 200 | 100 | 200 | 100 | 0 | 100 |
| PIO | 0 | 0 | 0 | 0 | 0 | 0 |

| FROM \ TO | A | B | C | D | E | F | G | H |
|---|---|---|---|---|---|---|---|---|
| A | 0 | ## | ## | | | | | |
| B | ## | 0 | ## | | | | | |
| C | ## | ## | 0 | | | | | |
| D | | | | 0 | ## | | | |
| E | | | | ## | 0 | ## | | |
| F | | | | | ## | 0 | 6 | 5 |
| G | | | | | | 6 | 0 | ## |
| H | | | | | | 5 | ## | 0 |

| FROM \ TO | A | B | C | D | E | F | G | H |
|---|---|---|---|---|---|---|---|---|
| A | 0 | ## | ## | | | | | |
| B | ## | 0 | ## | | | | | |
| C | ## | ## | 0 | | | | | |
| D | | | | 0 | ## | | | |
| E | | | | ## | 0 | ## | | |
| F | | | | | ## | 0 | 6 | 5 |
| G | | | | | | 6 | 0 | ## |
| H | | | | | | 5 | ## | 0 |

FIG. 51

| FROM \ TO | A | B | C | D | E | F | G | H |
|---|---|---|---|---|---|---|---|---|
| A | 0 | ## | ## | | | | | |
| B | ## | 0 | ## | | | | | |
| C | ## | ## | 0 | | | | | |
| D | | | | 0 | ## | | | |
| E | | | | ## | 0 | ## | | |
| F | | | | | ## | 0 | 6 | 5 |
| G | | | | | | 6 | 0 | ## |
| H | | | | | | 5 | ## | 0 |

FIG. 52

| FROM \ TO | A | B | C | D | E | E' | F | G | H |
|---|---|---|---|---|---|---|---|---|---|
| A | 0 | ## | ## | | | | | | |
| B | ## | 0 | ## | | | | | | |
| C | ## | ## | 0 | | | | | | |
| D | | | | 0 | ## | | | | |
| E | | | | ## | 0 | | | | |
| E' | | | | | | 0 | ## | | |
| F | | | | | | ## | 0 | 6 | 5 |
| G | | | | | | | 6 | 0 | ## |
| H | | | | | | | 5 | ## | 0 |

| FROM \ TO | PCI | BLOCK 2 | BLOCK 1 | MEMORY | BLOCK 3 | PIO |
|---|---|---|---|---|---|---|
| PCI | 0 | 4,100 | 6,100 | 200 | 0 | 0 |
| BLOCK 2 | 10,000 | 0 | 8,000 | 2,000 | 100 | 100 |
| BLOCK 1 | 100 | 10,000 | 0 | 10,000 | 100 | 100 |
| MEMORY | 100 | 6,000 | 6,000 | 0 | 100 | 100 |
| BLOCK 3 | 200 | 100 | 200 | 100 | 0 | 100 |
| PIO | 0 | 0 | 0 | 0 | 0 | 0 |

FIG. 53

| FROM \ TO | PCI | BLOCK 2 | BLOCK 1 | MEMORY | BLOCK 3 | PIO |
|---|---|---|---|---|---|---|
| PCI | 0 | 4,100 | 6,100 | 200 | 0 | 0 |
| BLOCK 2 | 10,000 | 0 | 8,000 | 2,000 | 100 | 100 |
| BLOCK 1 | 100 | 10,000 | 0 | 10,000 | 100 | 100 |
| MEMORY | 100 | 6,000 | 6,000 | 0 | 100 | 100 |
| BLOCK 3 | 200 | 100 | 200 | 100 | 0 | 100 |
| PIO | 0 | 0 | 0 | 0 | 0 | 0 |

FIG. 54

| FROM | TO BUS 1 | BUS 2 |
|---|---|---|
| BUS 1 | 62,600 | 600 |
| BUS 2 | 600 | 100 |

| FROM | TO BLOCK 1 | BLOCK 2 | BLOCK 3 | MEMORY | PCI | PIO |
|---|---|---|---|---|---|---|
| BLOCK 1 | n/a | 31 | 988 | 31 | 91 | 988 |
| BLOCK 2 | 31 | n/a | 997 | 281 | 81 | 988 |
| BLOCK 3 | 976 | 997 | n/a | 488 | 476 | 988 |
| MEMORY | 31 | 38 | 488 | n/a | 94 | 988 |
| PCI | 81 | 81 | n/a | 49 | n/a | n/a |
| PIO | n/a | n/a | n/a | n/a | n/a | n/a |

8 TO 16 BIT BRIDGE         BRIDGE WITH 8 DEEP FIFOs

FIG. 57              FIG. 58

| BUS TYPE | UTILIZATION MIN | UTILIZATION MAX | LATENCY DATA | TRANSFER |
|---|---|---|---|---|
| 1. SERIAL, ASYNCHRONOUS, CLOCK-REGENERATED BUS | 5% | 25% | 50 | 200 |
| 2. MULTIPLE-LINE ASYNCHRONUS CLOCK-REGENERATED BUS | 5% | 25% | 20 | 100 |
| 3. MULTIPLE-LINE SYNCHRONOUS BUS WITH COMBINED DATA AND ADDRESS LINES | 10% | 25% | 5 | 25 |
| 4. SYNCHRONOUS BUS WITH SEPARATE DATA AND ADDRESS LINES | 25% | 50% | 2.5 | 10 |
| 5. BIDIRECTIONAL BUS WITH SINGLE-LEVEL PIPELINED DATA AND ADDRESS LINES | 25% | 75% | 2 | 5 |
| 6. MULTIPLE-LEVEL PIPELINED BUS WITH SOPHISTICATED ARBITRATION | 50% | 75% | 1.5 | 2.5 |
| 7. CROSSBAR SWITCH | 75% | 100% | 1 | 2 |
| 8. POINT-TO-POINT UNIDIRECTIONAL WIRE | 100% | 100% | 0.5 | 1 |

FIG. 59

| PARAMETER | NORMAL MODE | TEST MODE | ISOLATION MODE | BOUNDARY MODE |
|---|---|---|---|---|
| TEST MODEL | BSR MODE=0 | BSR MODE=1 | BSR MODE=1 | BSR MODE=1 |
| TEST CONTROLLER DESIGN | JTAG ir = bypass | JTAG ir=vc_test | JTAG ir=vc_isol | JTAG ir=udl_test |
| TEST ISOLATION | N/A | OUTPUT ISOLATION | INPUT ISOLATION | INPUT ISOLATION |
| TEST VALIDATION | FUNCTIONAL TESTBENCH | VC TEST VECTORS | INPUT ISOLATION | UPDATE BYPASS |

FIG. 60

| GENERIC ARCHITECTURE | TARGETED BLOCKS | TEST INTERFACE | TEST METHOD |
| --- | --- | --- | --- |
| TEST BUS | LEGACY BLOCKS, NON-SCAN BLOCKS | DIRECT ACCESS FROM CHIP I/O | FUNCTIONAL VECTORS |
| BSR | SCAN-BASED BLOCKS | MULTIPLE SCAN + BSR CHAINS | CONCATENATED SCAN VECTORS |
| BIST | REGULAR BLOCKS SUCH AS RAM AND FIFO | BIST CONTROLLER | BUILT-IN ALGORITHMIC TEST PATTERNS |
|  | BUILT-IN LOGIC BIST SUCH AS FULL SCAN | BIST CONTROLLER FOR PRPG/MISR | BUILT-IN RANDOM TEST PATTERNS |
| TAP | BUILT-IN DEBUG AND DIAGNOSTIC BLOCKS | TAP (TDI, TRST, TMS, TCK, TDO) | JTAG PROTOCOLS |

FIG. 63

BLOCK BASED DESIGN METHODOLOGY

CROSS-REFERENCE TO RELATED APPLICATIONS

This is a divisional of application Ser. No. 09/410,356, filed Sep. 30, 1999 now U.S. Pat. No. 6,269,467B1 issued Jul. 31, 2001.

This application depends for priority upon commonly assigned U.S. Provisional Patent Application No. 60/102,566, entitled BLOCK-BASED DESIGN METHODOLOGY, filed Sep. 30, 1998, which is incorporated herein in its entirety by reference.

FIELD OF THE INVENTION

The present invention relates generally to integrated circuit ("IC") device design, and more specifically to the design of systems re-using pre-designed circuit blocks.

BACKGROUND OF THE INVENTION

In recent years, constant innovation in silicon process technology has drastically reduced the price and increased the performance and functionality of integrated circuit devices, thus stimulating the development of the electronics manufacturing and information processing industries. In turn, these fast growing industries impose increasing demands on the integrated circuit design system developers for still faster and cheaper devices. As a result, the design industry is now undergoing drastic changes, including:

(1) Chip designs are getting larger and more complex. For example, in 1997, a typical integrated circuit contained from 100–500K gates. In 1998, the typical device contained one to two million gates.

Technology in 1999 has shown the continuation of this trend with devices of four to six million gates being built.

(2) Chip designs are becoming more application-specific. In the early days of IC design, device manufactures would produce various "off-the-shelf" chips, which end users would design into their electronic products. Currently, electronic product manufactures more often order custom chip designs to perform specific functions.

(3) Electronic product development is now primarily driven by consumer demand, which has shortened product life cycles and, therefore shortened allowed design time and resources. For example, in 1997, the average design cycle was between 12–18 months. In 1998, that average time decreased to 10–12 months and in 1999 the industry is pushing towards 8–10 month design-cycle times.

(4) Design time constraints require parallel design effort. Formerly, critical design decisions for upstream system components could wait until downstream system component designs were verified. Design managers no longer have the luxury of sequentially performing design tasks. Several system components may have to be developed concurrently. Thus, design managers are required to make crucial predictions before at least some system component designs are complete.

To address these demands, electronic system design is now moving to a methodology known in the art as Block Based Design ("BBD"), in which a system is designed by integrating a plurality of existing component design blocks (also referred to in the art as "intellectual property blocks" or "IP blocks"). These pre-designed blocks may be obtained from internal design teams or licensed from other design companies, and may be supported by fundamentally different design structures and environments. Moreover, pre-designed blocks may be developed to meet different design requirements and constraints.

Another challenge faced by designers using BBD is the front-end (project acceptance) delays and risk brought about by uncertainty in determining system design feasibility. Current ASIC (application-specific integrated circuit) designs are primarily presented at the RTL (register transfer level) stage, and some even earlier, at specification level, to designers by customers. These designs are then partitioned in a manner based upon the limitations of available synthesis technology, according to the area, performance, and power tradeoffs required to provide cost-effective implementation. In this manner, the designer accepts a system specification as input and ultimately provides a netlist-level design for physical implementation (including design place, route, and verification). If design specifications are within the capabilities of the intended or available processing technology, including clocking, power, and size specifications, the available design methodology is reasonably predictable and works well with available circuit design tools.

However, the RTL-level design and the system-level design activities are typically uncoupled or loosely coupled, meaning there is no coherent link from the system-level functional definition to the ASIC (RTL) level. The RTL-level design is developed based upon a paper ASIC specification and verified by a newly formed test suit created around the ASIC interface. Thus, available design and implementation methodologies for ASIC design present a number of problems, which hamper efficient block integration.

First, current methodologies do not provide a top-down approach to comprehensively evaluate and ensure compatibility to integrate a plurality of design blocks provided by multiple sources having differing design considerations, while providing hierarchical verification and short assembly time within tight time-to-market constraints.

Also, existing methodologies for ASIC design do not provide scalability. A significant number of existing methodologies are focused around a flat design. This approach has led to significant problems in the length of time required to assemble the top-level design for a system having more than one million gates.

In addition, existing ASIC design methodologies are not suitable for reuse of pre-designed circuit blocks. Available schemes do not provide guidelines to solve the timing, clock, bus, power, block arrangement, verification, and testing problems associated with integrating circuit design blocks within specific device architectures. Thus, without a comprehensive approach to block reuse, existing methodologies bring about an ad-hoc and unpredictable design approach, reduce design realization feasibility, increase cost and time to delivery, and often trigger performance-reducing modifications to the pre-designed circuit blocks themselves in order to fit them into the designed system. Furthermore, existing methodologies do not provide performance trade-off analysis and feedback of critical design parameters, such as clock frequency, and area versus risk of successfully and predictably completing chip designs and implementations.

There is, therefore, a need for a methodology that can satisfy the evolving environment and address the shortcomings of the available art.

There is also a need for a suitable methodology for using and re-using pre-designed circuit blocks from multiple sources in a circuit design.

Combining IP blocks also brings about the need for "glue" logic, the logic that allows the blocks to work together on a single device. Glue logic is the logic primarily responsible for interconnecting design blocks, and normally resides between the blocks, dispersed throughout the design. Glue logic elements can be added to a design during various stages of chip planning, or can reside at the outermost boundary of each block within a design to act as an interconnect mechanism for the host block. Regardless of its source, glue logic must be optimally placed within the design to minimize wire congestion and timing complications which arise from placement of glue logic between blocks, introducing delays which may not have been contemplated by the original block designer.

There is therefore a need in the art to which the present invention pertains for an improved method of placing and distributing glue logic in a block based design.

There is also a need for a glue logic distribution mechanism that takes into account the functional affinity of various glue logic elements, and groups them into new design blocks.

There is also a need in the relevant art for a glue logic distribution mechanism that returns an optimized amount of glue logic to existing designs.

In addition, existing ASIC design methodologies are not suitable for reuse of pre-designed circuit blocks. Available schemes do not provide guidelines to solve the timing, clock, bus, power, block arrangement, verification, and testing problems associated with integrating circuit design blocks within specific device architectures. Since the circuit blocks are from multiple inconsistent sources, the challenge is how to integrate these circuit blocks into a circuit system in a fashion suitable to block-based design.

Therefore, there is a need for a method and apparatus suitable to inter-connect the circuit blocks from multiple inconsistent sources in a fashion suitable to block-based design.

There is another need for a method and apparatus to provide interfaces for converting the circuit blocks having different interfaces into the ones having standardized interfaces.

Of course, all ICs, even those containing an entire system on a single chip, must pass a series of tests to verify that the chip meets performance requirements and that there are no hidden manufacturing defects. If a manufacturing defect is missed, the faulty chip may not be discovered until after the assembly process or, worse yet, in the field. The cost of such "test escapes" in terms of their effect on customer satisfaction can be devastating to a product line.

Generally, there are three types of tests for detecting defects: DC parametric tests, AC parametric tests, and functional ("PLL") tests. In DC parametric tests, the inputs, outputs, input-to-output transmission, total current, and power consumption of the chip are measured. In AC parametric tests, the rising and falling times of the input and output signals, delay time in propagation between input and output terminals, minimum clock pulse width, and operation frequency of the chip are measured. In functional tests, the chip is tested to see if it functions as designed under prescribed operating conditions. Typically, applying a test pattern to an input terminal ("test vectors") and comparing an output pattern detected at an output terminal with an expected pattern carries out a functional test.

Before the advent of Design for Test ("DFT") methodologies, designers created and assembled a chip, then passed the completed design to test designers. The test designers then added package-level test logic, and sent the chip to the manufacturer (the "fab"). The fab testers then probed the chip and ran a board test protocol including the above-described tests on the package-level logic. The available Scan Design methodology is a simple example of a highly effective and widely used method for applying a "single" test method to the entire chip with predictable and consistent test result. Other ad hoc methods may be used to handle nonscannable design styles.

Today, logic previously contained in a whole chip is now used as a single virtual component (VC) or design block to be included in a larger chip. Thus, tests can no longer be designed after circuit design is complete. Designers must plan how to test each design block, as well as the whole packaged chip, throughout the design process. The design process must therefore ensure testability by applying one or more test methods as appropriate.

The benefits of DFT are well known. DFT logic and test vector verification functions allow shorter, production-ready tests early in a production cycle. Also, DFT scan paths provide access to chip and system states that are otherwise unavailable. A good DFT plan thereby shortens time-to-market and reduces testing cost by easing the front-end design process and the development of manufacturing tests.

There are therefore four needs presented by the available art. First, a new DFT for BBD must be able to make effective use of the pre-designed test data among other dissimilar test methods, to share limited test access, and to meet the overall SOC level test objectives.

Second, it must face the emerging difficulties of new defect types and new defect levels due to technology scaling, the new complexities of mixed-signal and mixed technology design, and the increasing I/O count and new packaging techniques.

Third, it must face the difficulties of integrating IP blocks, which inherently lack a unified structural test model. SOC level test access and fault isolation are needed, and the demand for low power design techniques (i.e., latch-based, gated clock, derived clock, pipelines, and low threshold voltage) which are largely unsupported by the currently available DFT methodologies must be addressed.

And the new DFT methodology must overcome the time to market pressure with a coherent and consistent test integration model even when faced with limited or inadequate test information.

The available art requires structural information (i.e., fault models and test models) so that the test data can be partially or fully generated and verified for a set of faults. For example, the Scan Design Methodology is only applicable to synchronous design and detects only single stuck-at-fault models. Moreover, other DFT solutions are scan-based, thus making it rather difficult for sharing and verifying the hard IP test model, which does not contain structural information.

The available art also requires a non-linear computation model that cannot sustain the current gate count explosion, even if sharing and verifying were possible (i.e., soft IP models). However, soft IPs are not necessarily scannable or mergeable, sometimes resulting in unpredictable and unmanageable test development.

Turning finally to design verification, a challenge presented by the use of multiple pre-designed blocks in SOC design is the need for a reliable and efficient functional verification method. In the available art, test suites are used to verify a multi-block design. Each test in the suite is used to test each of the blocks before they are integrated. Then, after integration of the blocks, significant effort is required to adjust the test suite to enable functional verification at the system level. The process of testing and debugging may need to be repeated for a number of iterations before a final, full system verification can be confidently provided.

One available approach to this problem is the substitution of implementation modules for their corresponding behavioral models, thereby allowing chip level simulation and testing in a mixed mode situation. While this approach can offer desirable results if performed effectively, and can be less costly than the iterative block-based simulations described above, this approach is still quite expensive and slow, since the entire chip must be simulated to obtain reliable functional verification.

An especially acute challenge is presented in multi-block designs by the need to functionally verify bus structures. In the available art, bus verification is achieved in either of two ways. The bus may be debugged and verified as an integral part of the overall chip, or it may be verified using bus functional models for the pre-defined blocks, taking into account the detailed implementation provided by newly authored blocks. However, integral bus verification can be slow and costly. The entire chip must be used to verify the bus design, and integral bus verification can only be executed late in the design cycle, when debugging is difficult and time consuming due to the level of detail and the potential for finding no bus-related bugs. The bus functional model approach eases some of these problems, but requires implementation detail for the newly authored blocks. Moreover, the bus functional models may be error prone themselves and may be available only as "black boxes", making signal tracing and debug difficult or impossible.

SUMMARY OF THE INVENTION

To addresses the shortcomings of the available art, the present invention provides a method and apparatus for designing a circuit system, the method, comprising the steps of:

(a) selecting a plurality of pre-designed circuit blocks to be used to design the circuit system;

(b) collecting data reflecting the experience of the designer regarding the pre-designed circuit blocks, the designer's experience being adaptable to a processing method;

(c) accepting or rejecting a design of the circuit system in a manner based on the designer's experience data and acceptable degree of risk;

(d) upon acceptance, forming block specifications containing criteria and modified constraints for each of the circuit blocks (FEA);

(e) upon acceptance, forming block specifications for deploying the circuit blocks on a floor plan of a chip, in compliance with the criteria and modified constraints without changing the selected circuit block and the processing method.

BRIEF DESCRIPTION OF THE DRAWINGS

FIG. 16 illustrates a methodology to assess feasibility of a circuit design using a plurality of pre-designed circuit blocks, in accordance with the present invention.

FIG. 17 illustrates a feasibility assessment result using the methodology shown in FIG. 2, in accordance with the present invention.

FIG. 27 shows an FEA assessment-axes metric, in accordance with the present invention.

FIG. 38 shows a system design without using the collaring process of the present invention.

FIG. 39 shows a system design using the collaring process of the present invention.

FIG. 40 shows a computer system for performing the steps in the collaring process of FIG. 34, in accordance with the present invention.

FIGS. 43–47 and 49–56 are tables illustrating improved delay times through bus modifications implemented using the system and method of the present invention.

FIG. 48 illustrates a bus bridge used in the method and system of the present invention.

FIG. 57 illustrates a bus bridge used in the method and system of the present invention.

FIG. 58 illustrates a bus bridge including a FIFO used in the method and system of the present invention.

FIG. 59 is a table illustrating bus utilization and latency characteristics for a variety of bus types.

FIG. 60 illustrates an Exemplary Consistency Check truth table

FIG. 63 is a table illustrating appropriate test methods for a variety of design architectures.

DETAILED DESCRIPTION PREFERRED AND ALTERNATIVE EMBODIMENTS

To overcome the shortcomings of the available art, the present invention discloses a novel methodology and implementation for block-based design ("BBD").

Figure 1:
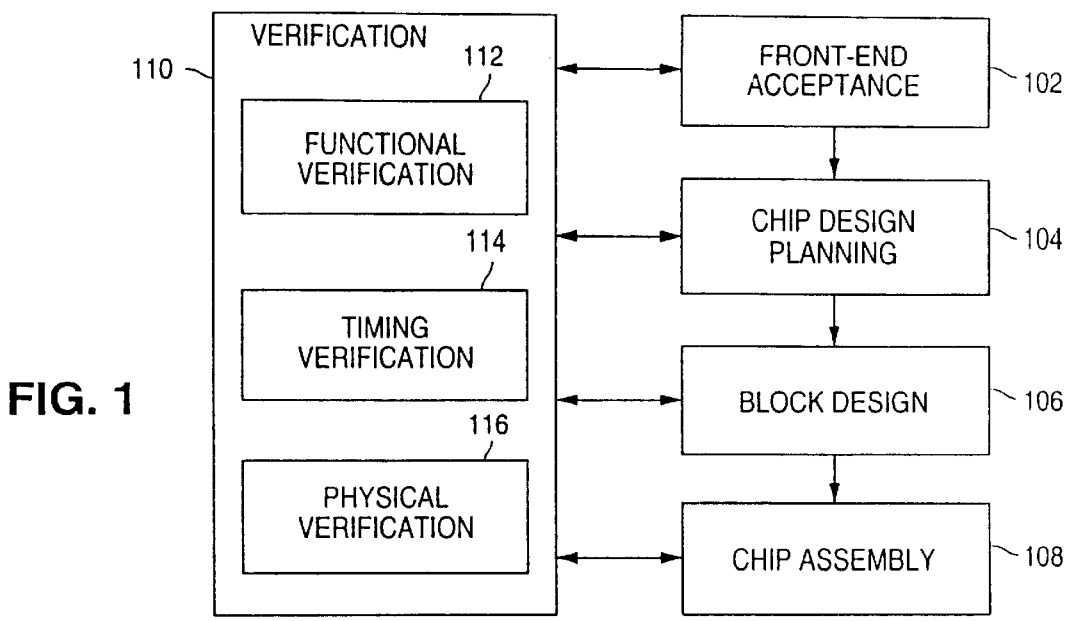
FIG. 1 is a flowchart illustrating a design process based on the block-based design methodology, in accordance with the present invention.

Referring to FIG. 1, a flowchart 100 illustrating a design process based on the block-based design (BBD) methodology in accordance with the present invention is shown. As shown in FIG. 1, the design process includes front-end acceptance design stage 102, chip planning design stage 104, block design stage 106, chip assembly design stage 108, and verification design stage 110.

Front-end acceptance design stage 102 enables a system integrator (chip designer) to evaluate the feasibility of a prospective design project. At front-end acceptance design stage 102, the designer receives a specification from a customer including functional and other requirements (such as delivery time and budget) for designing an ASIC. The customer may also provide some pre-designed circuit blocks and test benches for these circuit blocks. Along with the customer supplied blocks, the designer utilizing front end acceptance design stage 102 may accept, as input, circuit blocks from different sources, some of which may be supplied by a third party, some of which may be legacy circuit blocks, and some of which may be newly authored. These selected circuit blocks can be in a soft, firm, or hard design state. (Note that: soft state is at RTL level; hard is at GDSII level; and firm is between soft and hard, such as at gate level or netlist level). Front-end acceptance design stage 102 then collects the designer's available experiences, including field of use data, estimation data through behavior simulation, and/or partial implementation data. The process of front-end acceptance design stage 102 then provides an assessment to help the designer decide whether to accept the design project based on the design property parameters, including the customer's requirements, the designer's available experience, and the designer's acceptable degree of risk. Furthermore, based on the functional specification, the result of front-end acceptance design stage 102 dictates the final set of pre-designed circuit blocks to be used in the circuit design.

Front-end acceptance design stage 102 provides for three phases of assessment: coarse-grained assessment, medium-grained assessment, and fine-grained assessment. If an assessment at one phase is not satisfactory, front-end acceptance design stage 102 enables refinement of design property parameters and makes a further assessment at the next phase.

If the proposed design project is found acceptable, front-end acceptance design stage 102 provides comprehensive steps to ensure that problems in the design ahead are detected early, and to ensure that these problems can be solved in a comprehensive manner within the bounds defined by project requirements, the designer's available experience, and the processing method selected. Front-end acceptance design stage 102 generates a design specification defining a processing methodology including selected pre-designed circuit blocks, design criteria, and inter-dependant design constraints.

Chip planning design stage 104 translates the design specification from the output of front-end acceptance design stage 102 into block specifications for each of the selected circuit blocks. Tasks executed in chip planning design stage 104 include: (1) developing plans for chip design, assembly, and implementation focused on predictability of delays, routability, area, power dissipation, and timing, and (2) identifying and adjusting constraints. Specifically, based on the design criteria and inter-dependant constraints provided as the output of front-end acceptance design stage 102, chip planning design stage 104 provides chip planning within the bounds (such as requirements and constraints) dictated at front-end acceptance. The inventive chip planning design stage 104 considers one constraint at a time, and yet meets the overall design criteria as specified by front-end acceptance design stage 102. Chip planning design stage 104 achieves this by forming the budget for each of the circuit blocks selected in front-end acceptance design stage 102, revising the specification for the circuit block, and adjusting constraints within the processing method specified by front-end acceptance design stage 102. In contrast to the chip planning design stage of the present invention, existing methodologies either generate new functional blocks or change the processing technology to meet the design criteria, increasing design time and raising project risk. Chip planning design stage 104 also generates specifications for glue logic (i.e. the hardware that is required to interconnect the selected circuit blocks), discussed in further detail below. Chip planning design stage 104 provides as output three types of glue logic, including new glue logic blocks that occupy one or more areas in a chip, distributed glue logic distributed into the selected circuit blocks, and top level block glue logic elements.

To seamlessly interconnect the selected circuit blocks, if necessary, block design stage 106 embeds an interface (called a collar) around each circuit block to form a standard interface. Since a circuit block can be soft, firm, or hard, each collar may be soft, firm, or hard as well. Block design stage 106 output provides that: (1) all circuit blocks in the chip meet the constraints and budget, and fit into dictated chip design plans and architectures; (2) chip assembly design stage 108 is provided with all required models and views of all circuit blocks; (3) the design is enabled for developing methodologies and flows for authoring the new circuit blocks generated in the chip planning design stage 104, adapting legacy circuit blocks, and adapting third party circuit blocks; and (4) the design fits into given chip architectures and budgets.

Chip assembly design stage 108 integrates circuit blocks to tape-out the top-level design for design stage fabrication. Chip assembly design stage 108 includes the final placement of hard blocks and chip bus routing, as well as the completion of any global design details. Chip assembly design stage 108 does not begin until all circuit blocks are designed, modified, and integrated into the chip plan. Inputs for chip assembly design stage 108 include power, area, and timing margin specifications received from the front-end acceptance design stage 102 or chip planning design stage 104.

Verification design stage 110 ensures that the design at each stage meets the customer functional requirements as detailed in the functional specification and chip test bench supplied at front-end acceptance design stage 102. Verification design stage 110 includes functional verification 112, timing verification 114, and physical verification 116.

Functional verification step 112 ensures that the logic functions and chip test benches for the selected circuit blocks at each stage of the design meet the functional requirements of the customer specification. Functional verification can be performed during front-end acceptance design stage 102, chip planning design stage 104, block design stage 106, or chip assembly design stage 108. Timing verification ensures that signal timing at each stage of the design is appropriate to generate the logic functions and pass the tests specified in the customer's specification. Timing verification can be performed during front-end acceptance design stage 102, chip planning design stage 104, block design stage 106, or chip assembly design stage 108. Physical verification ensures that the physical layout for the circuit design meets the customer specification.

During the design process, front-end acceptance design stage 102, chip planning design stage 104, block design stage 106, and chip assembly design stage 108 not only perform their intended functions, but also generate the information needed for functional verification 112, timing verification 114, and physical verification 116 which, together, comprise verification function 110. If any errors occur during verification at a particular stage of the design process, these errors are preferably corrected before going to the next stage.

Thus, at chip assembly design stage 108, the design process not only generates a top-level design for fabricating a chip, but also completes verifications of chip test benches for each of the circuit blocks used in the design and the overall chip test bench for the chip.

FIGS. 2–15 will now be described in summary form. Each of these figures provides a high level description of materials discussed in greater detail below.

II. FRONT END ACCEPTANCE 102

Figure 2:
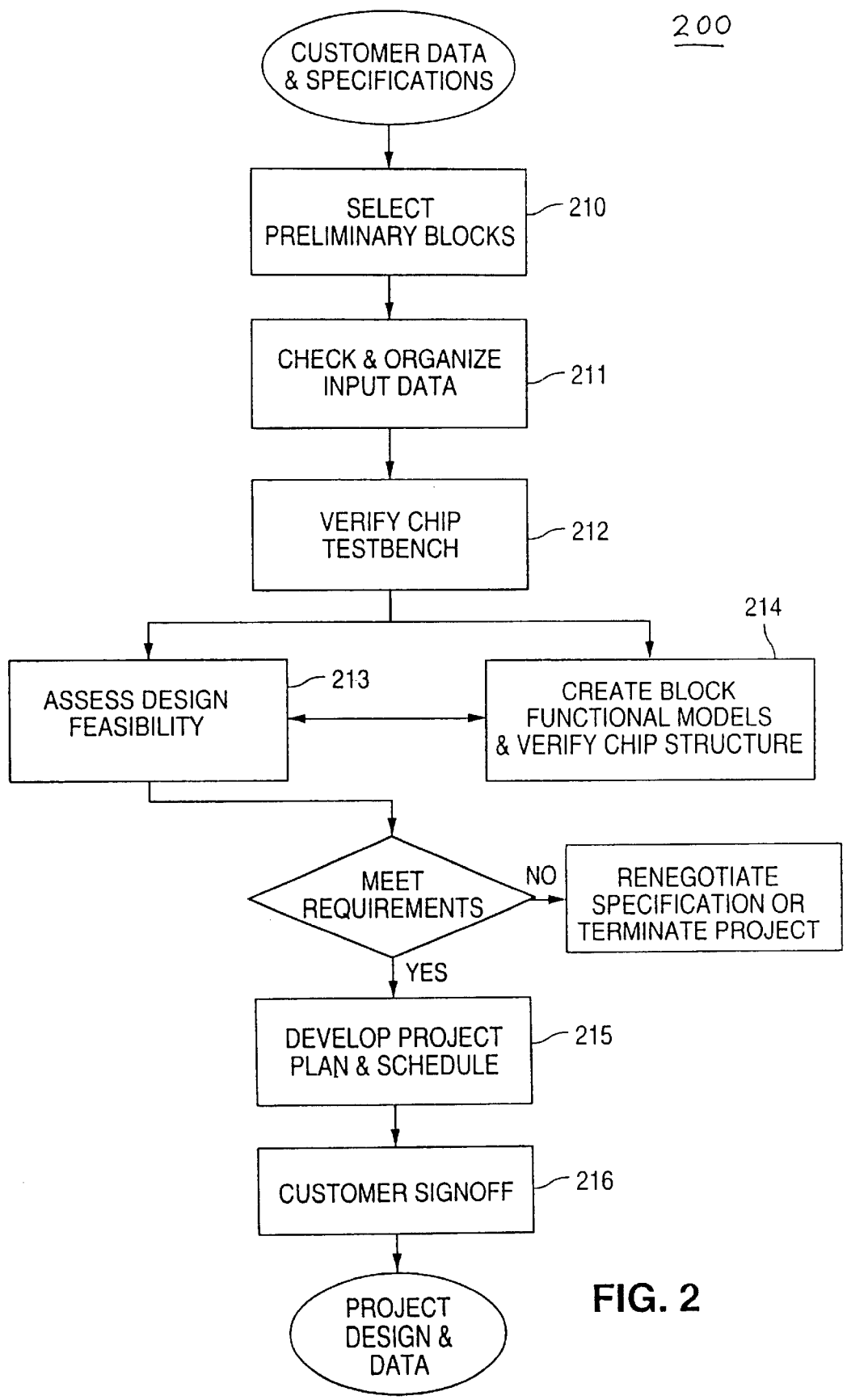
FIG. 2 is a flowchart illustrating the steps of front-end access, in accordance with the present invention.

Referring to FIG. 2, flowchart 200 illustrates the steps 210–216 of front-end acceptance design stage 102, in accordance with the present invention.

III. CHIP PLANNING 104

Chip planning design stage 104 includes the following modules:

(1) clock planning;

(2) bus identification and planning;

(3) power planning;

(4) I/O and analog/mixed-signal requirements;

(5) test planning;

(6) timing and floor planning; and (7) bus verification.

Figure 3:
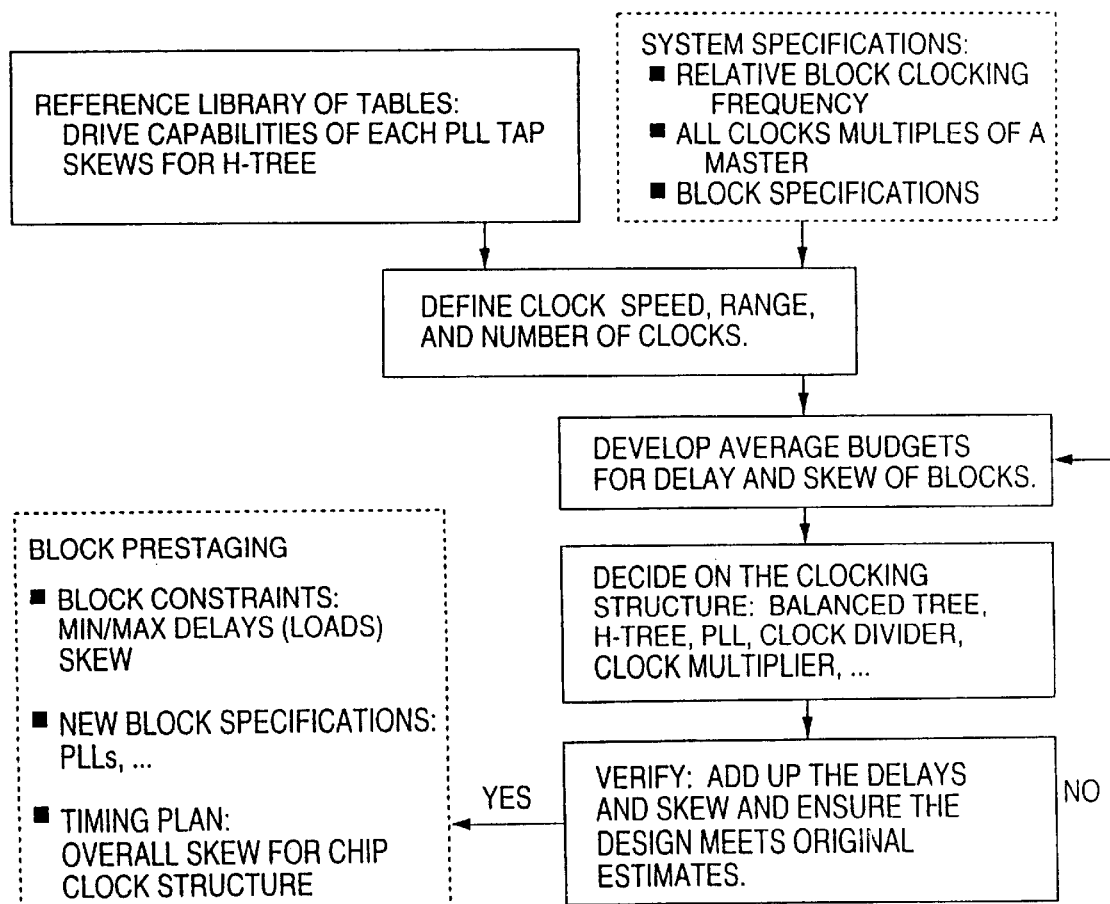
FIG. 3 illustrates a clock-planing module, in accordance with the present invention.

Referring to FIG. 3, there is shown the clock-planning module, in accordance with the present invention.

Figure 4:
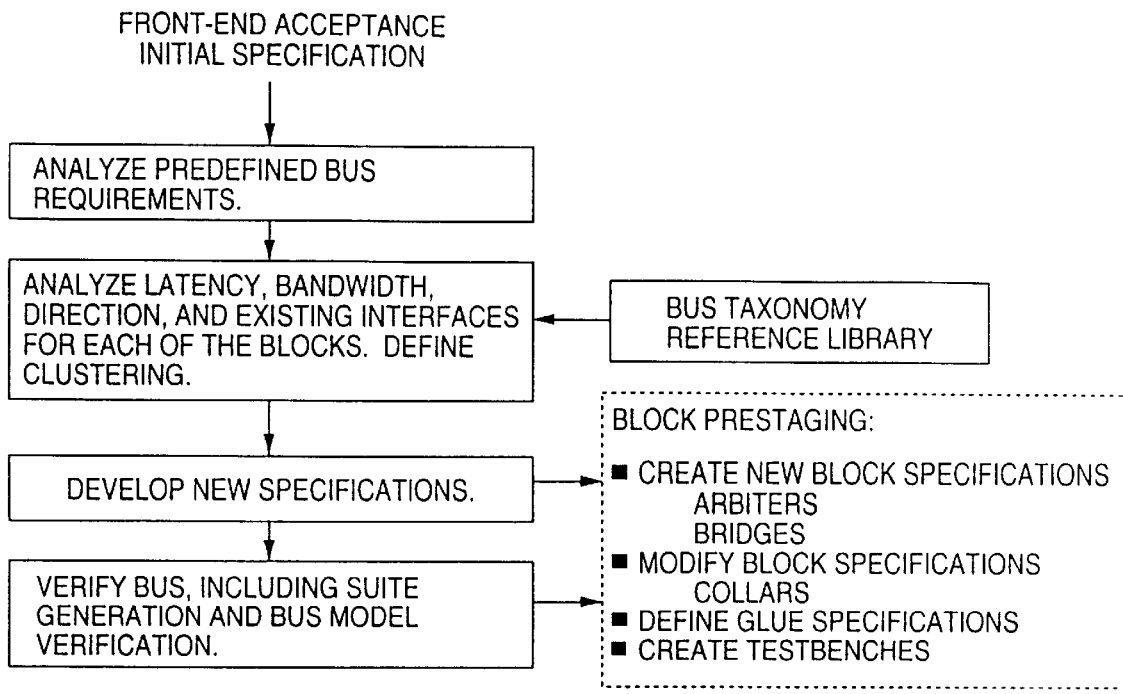
FIG. 4 illustrates a bus identification and planing module, in accordance with the present invention.

Referring to FIG. 4, there is shown the bus identification and planing module, in accordance with the present invention.

Figure 5:
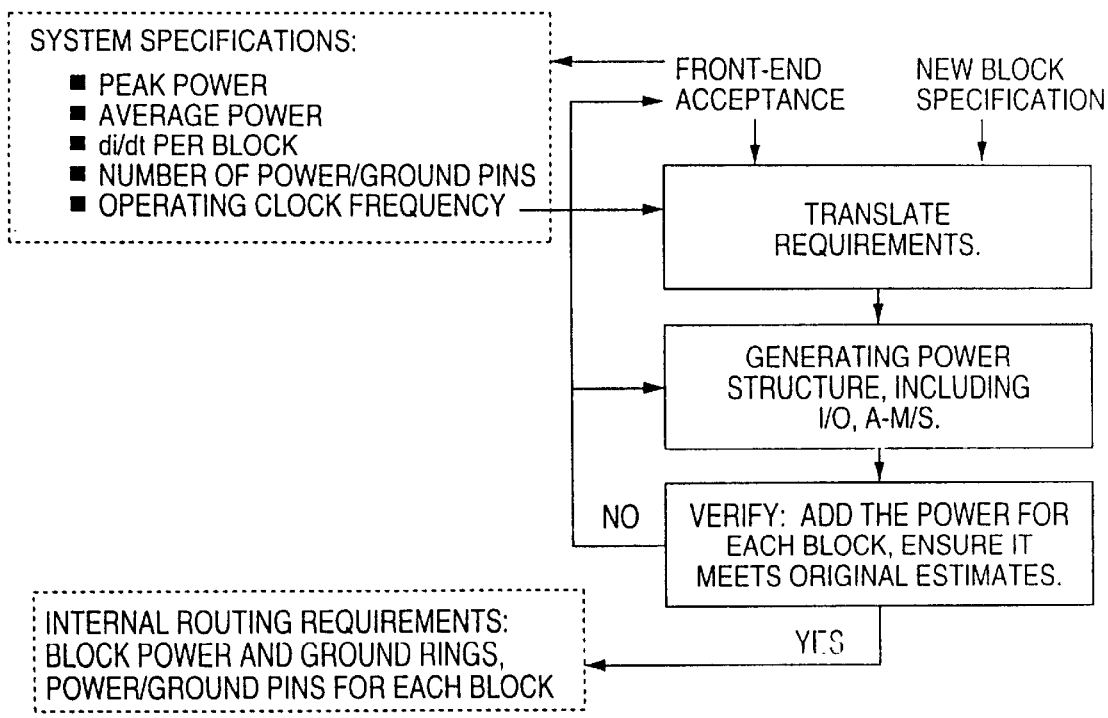
FIG. 5 illustrates a power-planning module, in accordance with the present invention.

Referring to FIG. 5, there is shown the power-planning module, in accordance with the present invention.

Figure 6:
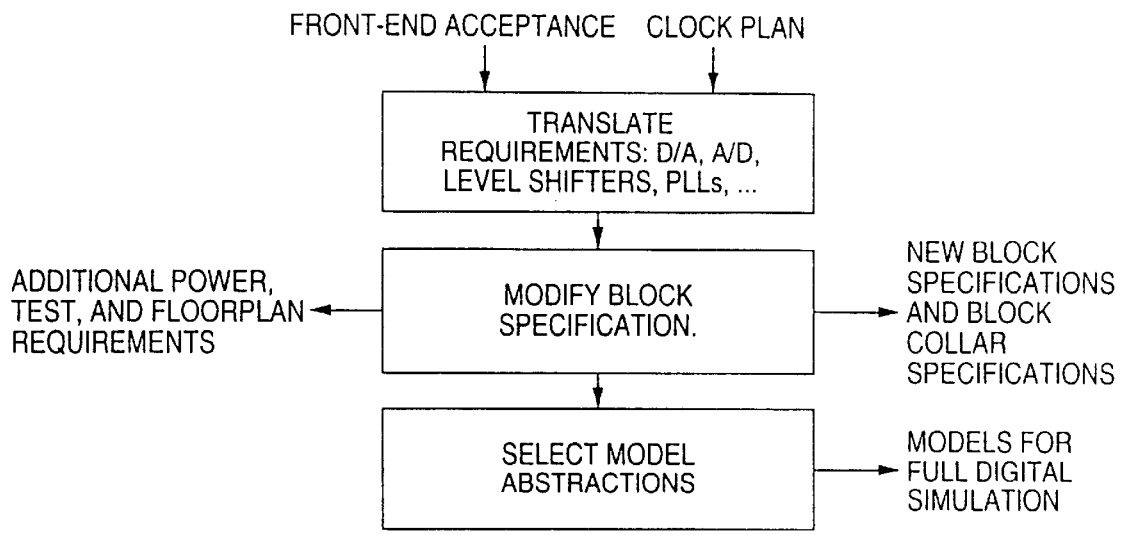
FIG. 6 illustrates the I/O and analog/mixed-signal requirements, in accordance with the present invention.

Referring to FIG. 6, there is shown the I/O and analog/mixed-signal requirements, in accordance with the present invention.

Figure 7:
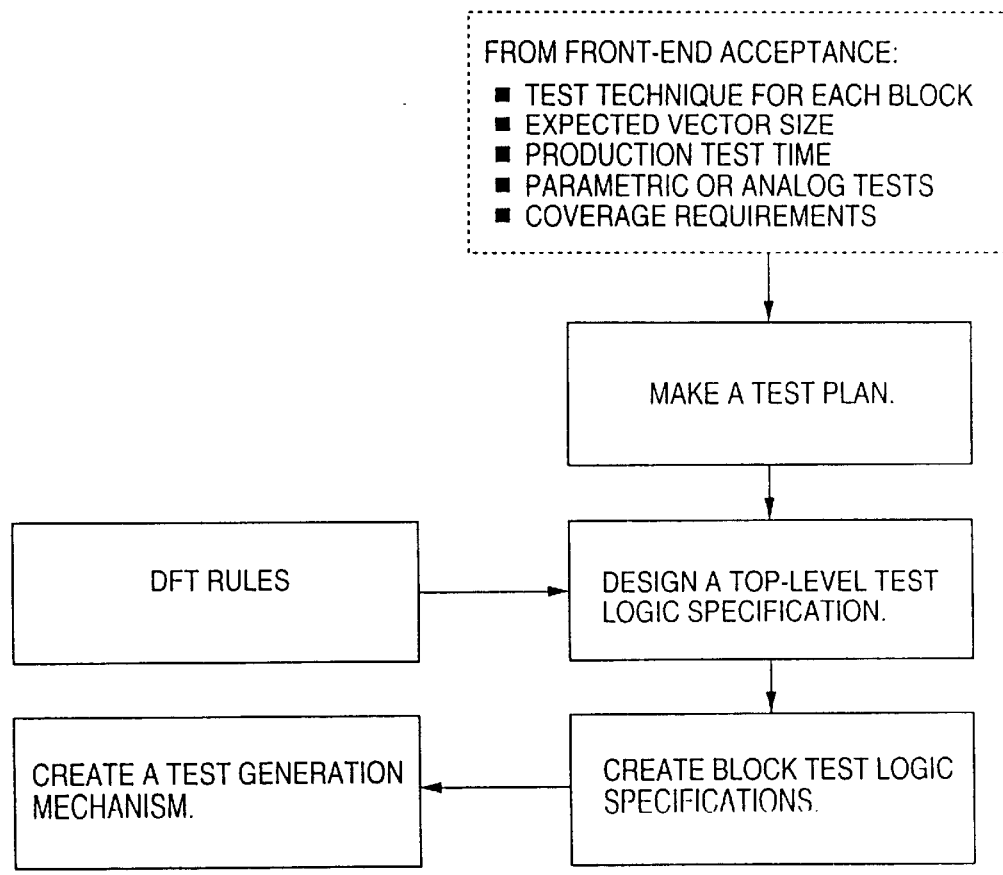
FIG. 7 illustrates a test-planning module, in accordance with the present invention.

Referring to FIG. 7, there is shown the test-planning module, in accordance with the present invention.

Figure 8:
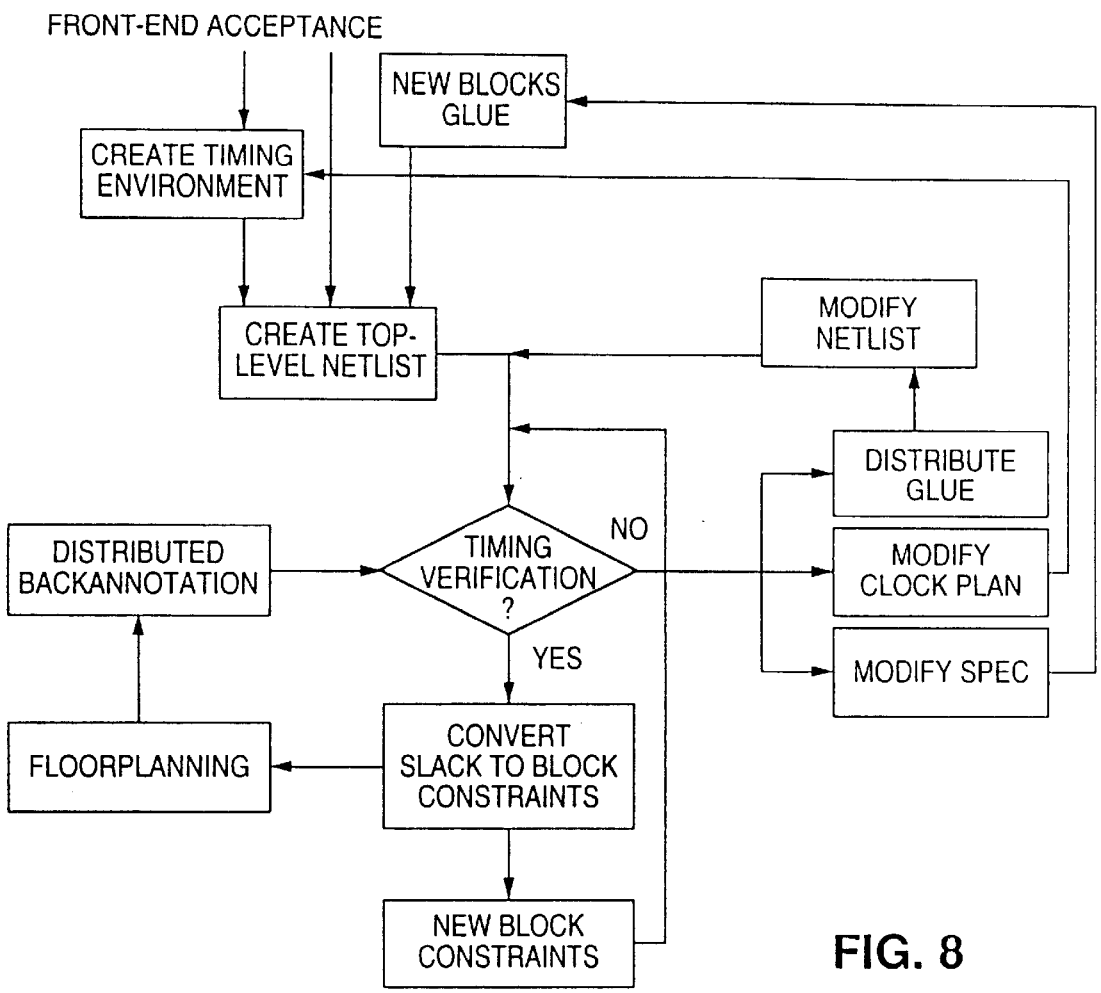
FIG. 8 illustrates a timing and floor-planning module, in accordance with the present invention.

Referring to FIG. 8, there is shown the timing and floor-planning module, in accordance with the present invention.

IV. BLOCK PLANNING 106

Figure 9:
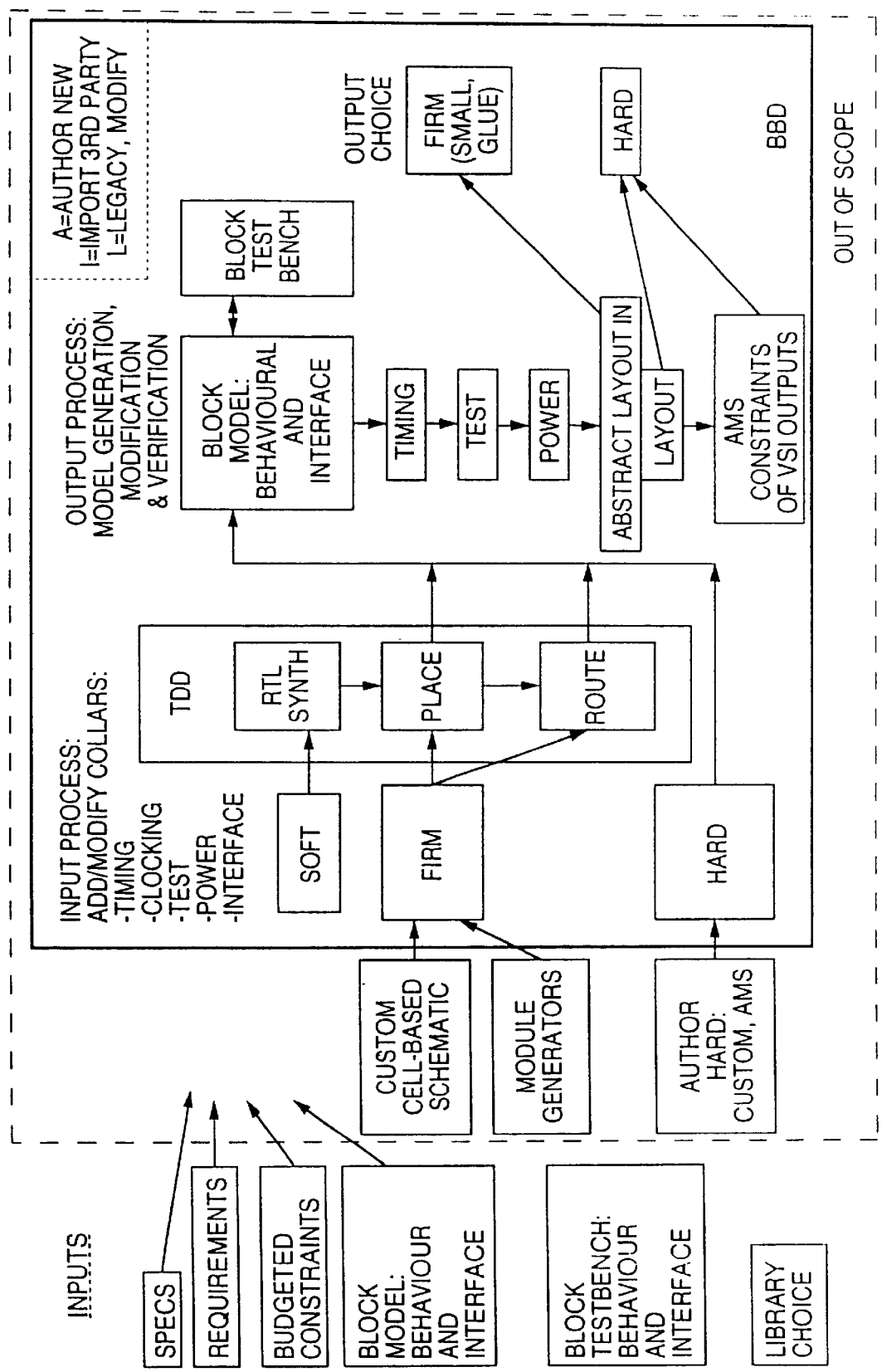
FIG. 9 shows meta flow of a block design, in accordance with the present invention.

Referring to FIG. 9, there is shown the flow of the block design stage, in accordance with the present invention.

V. CHIP ASSEMBLY 108

Figure 10:
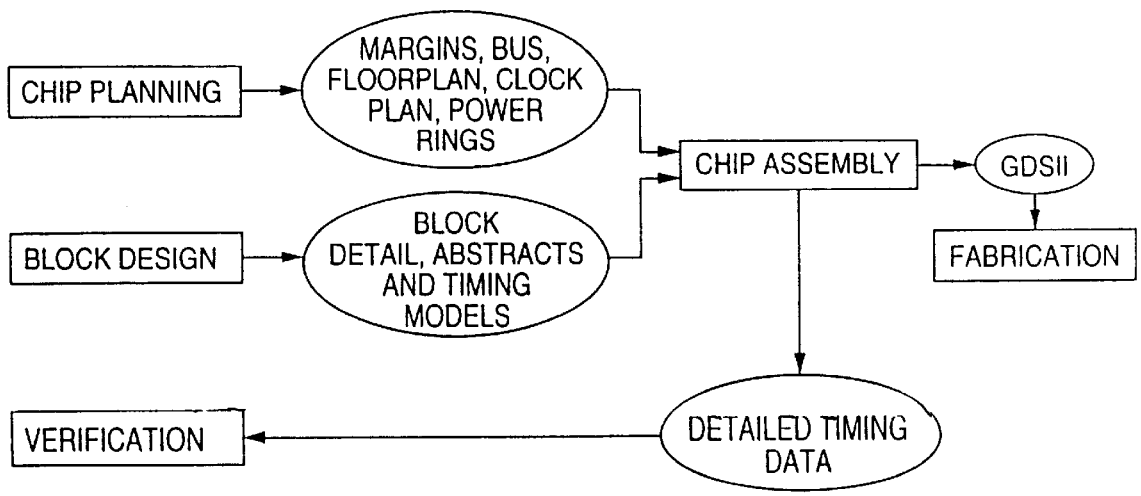
FIG. 10 illustrates data flow of a chip assembly, in accordance with the present invention.

Referring to FIG. 10, there is shown the data flow of the chip assembly design stage, in accordance with the present invention.

Figure 11:
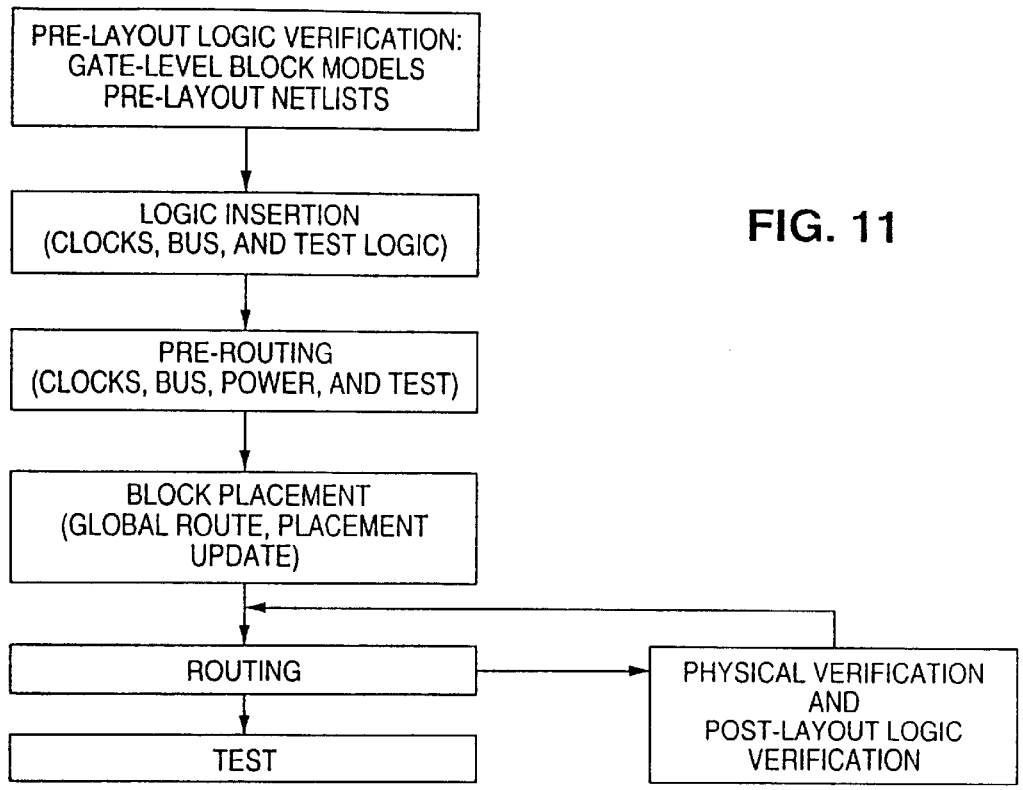
FIG. 11 illustrates task flow of a chip assembly, in accordance with the present invention.

Referring to FIG. 11, there is shown the task flow of the chip assembly design stage, in accordance with the present invention.

VI. VERIFICATION 110

Referring to FIGS. 12, 13, 14, and 15, there is shown the functional verification flow for the verification design stage of the present invention.

SCALABLE METHODOLOGY FOR FEASIBILITY ASSESSMENT

Turning first to front-end assessment, FIG. 16 illustrates the inventive methodology to assess feasibility of a circuit design using a plurality of pre-designed circuit blocks, in accordance with the present invention.

In FIG. 16, the inputs for the methodology are originally designed to use field of use data as inputs. However, in assessing a new design project, new types of inputs 1, 2, and 3 need to be used to assess the feasibility of the new design project. To accommodate the methodology, the new types of inputs are processed so that the methodology can use the new types of inputs to perform feasibility assessment for the new design project.

FIG. 17 shows the feasibility assessment result using the methodology shown in FIG. 16, in accordance with the present invention. FIG. 17 indicates risk on the vertical axis and time/cost along the horizontal axis. According to the risk indicator, the risk of using these three types of new data increases slightly compared with the risk presented when only using the field of use data. Also from FIG. 17, it can be seen that a type 3 input has the greatest impact on risk. However, according to the time/cost indicator, by using these three types of new data, the time/cost increases greatly compared with the risk created by using only field of use data. By considering the ramifications of the inventive risk v. time/cost calculus indicated in FIG. 17, the pre-staged blocks are pre-designed and qualified for proper use in the design methodology. The pre-staged design plan is preferably a section of an existing methodology, for example, a block-authoring piece.

Figures 18, 19:
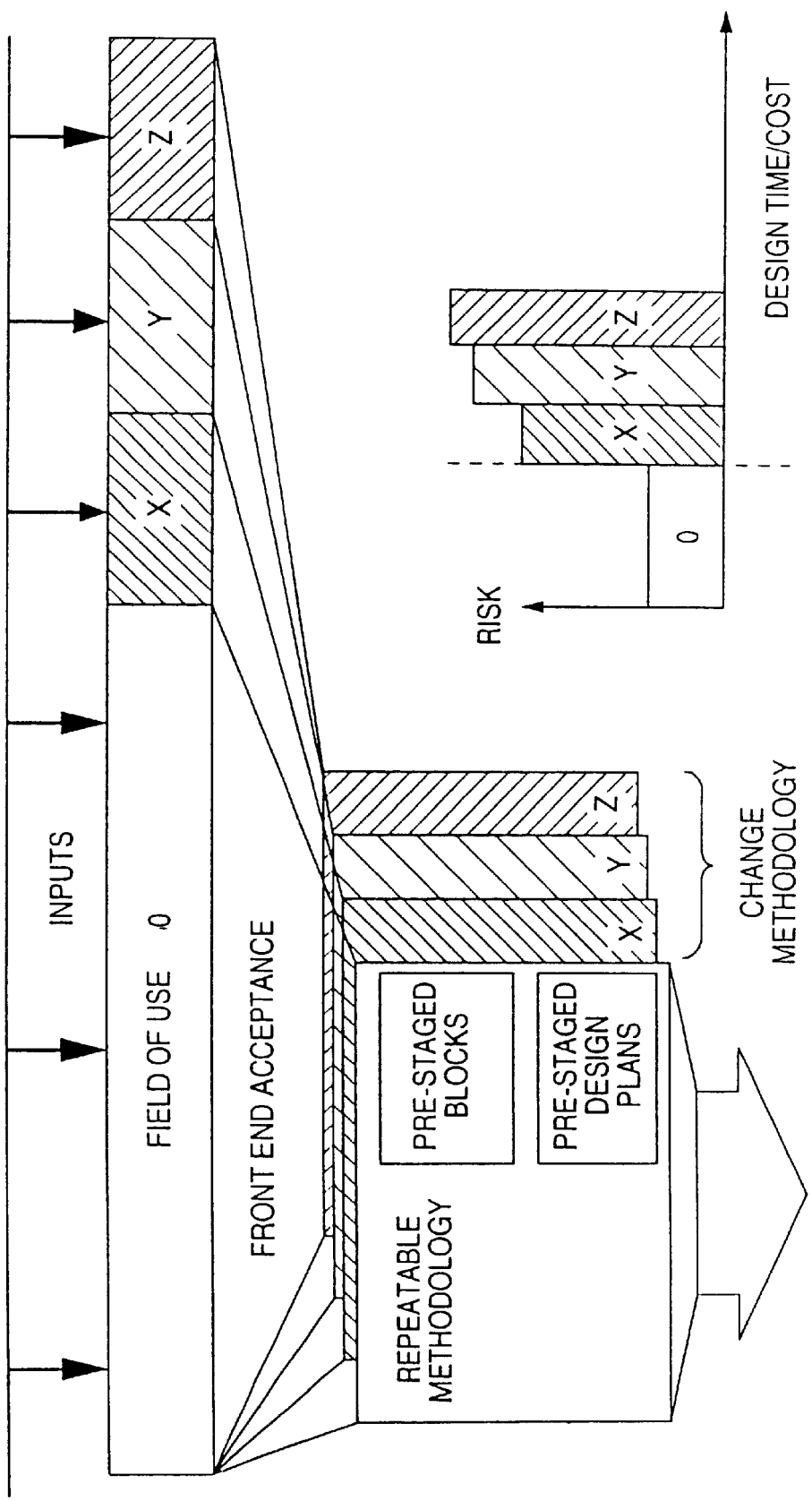
FIG. 18 shows a methodology to assess feasibility of a circuit design using a plurality of pre-designed circuit blocks, in accordance with the present invention.
FIG. 19 illustrates a feasibility assessment result using the methodology shown in FIG. 18, in accordance with the present invention.

FIG. 18 shows a methodology to assess the feasibility of a circuit design using a plurality of pre-designed circuit blocks, in accordance with the present invention. In FIG. 18, the inputs for the methodology are originally designed to use field of use data as inputs. However, in assessing a new design project, new types of inputs X, Y, Z need to be used to assess the feasibility of the new design project. To accommodate the new input types, the methodology is modified so that the new inputs can be used to perform feasibility assessment for the new design project.

FIG. 19 illustrates the assessed feasibility obtained using the inventive methodology shown in FIG. 18, in accordance with the present invention. FIG. 19 indicates risk along the vertical axis and time/cost along the horizontal axis. According to the risk indicator, the risk provided when using the three new input types increases greatly in comparison with the risk provided when only using field of use data. Also from FIG. 19, we can see that a type Z input has the greatest impact on risk. However, according to the time/cost indicator, the time/cost provided by additionally using these three types of new inputs increases moderately comparing with the time/cost by only using the field of use data.

The new types of inputs can be estimation data or implementation data for the pre-designed circuits. Based on the results shown in FIGS. 16–19, a system integrator can make tradeoff decisions.

FEASIBILITY ASSESSMENT IN THE FRONT END ACCEPTANCE

The front-end acceptance (FEA) design stage 102 in FIG. 1 involves feasibility and risk assessment of a proposed design. A design is feasible if the assessed criteria are within allowable risk tolerance.

In a sense, the FEA is a process of design refinement to a point at which the system integrator can assume the risk of accepting a proposed design. As such, it is the process of reduction of lack-of-knowledge and, therefore, error in the requested design's final outcome. As a starting point, the FEA process receives a set of design requirements delivered by a customer, the integrator's risk profile for accepting a design, a set of pre-designed blocks, and the integrator's previous knowledge of and experience with the pre-designed blocks. The pre-designed blocks can be at various levels of resolution (hard, soft or firm). The resolution, previous experience and understanding of a block give rise to a large range of error-bounds in the prediction of area, power, performance, etc., across the blocks.

For each of the blocks, the design refinement may be presented in three levels of resolution:

(1) integrator's field of experience (FOE),
(2) estimation using actual models and tools to execute those models, and
(3) dip by taking a block into a higher level of design resolution than that at which it was received.

It should be noted that three levels of design resolution are arranged in ascending order as: soft, firm, and hard. Efficiency is achieved by providing a mechanism to conduct feasibility assessment without needlessly refining all block and interconnect criteria predictions.

Figure 20:
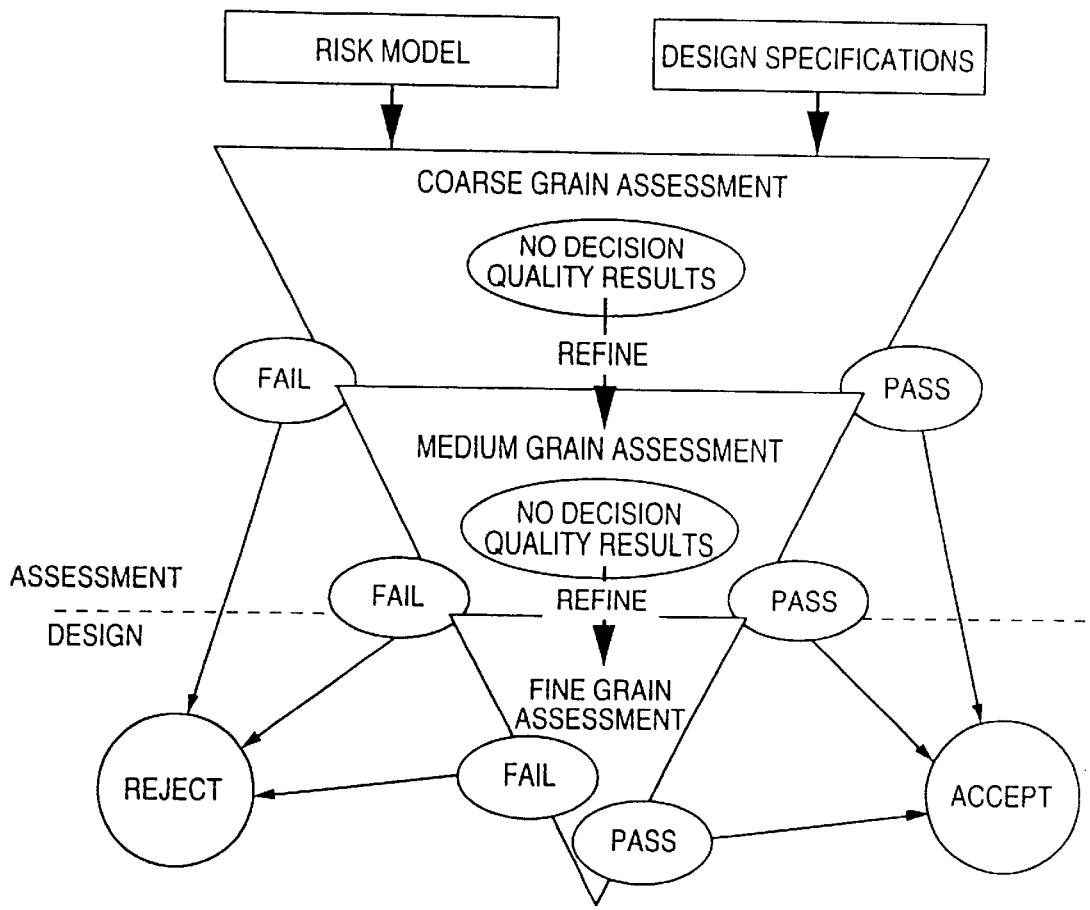
FIG. 20 shows an front-end acceptance ("FEA") process, in accordance with the present invention.

FIG. 20 shows a flow diagram for an FEA process in accordance with the present invention.

In FIG. 20, the FEA process includes three phases of feasibility assessment, reflecting the three levels of design refinement discussed above. These three phases are: coarse-grained assessment, medium-grained assessment, and fine-grained assessment.

Coarse-grained assessment is a field of experience dominated assessment based upon the design integrator's previous experience with similar designs. Coarse-grained assessment is especially suited to ten's of blocks and system design options, and to situations where design estimation-error tolerance is on the order of fifty percent or more. Coarse analysis can be used to make a cursory examination of blocks being considered, where the estimation of interaction between blocks is non-critical. At this phase, it is most likely that not all blocks being considered are used in the final design.

Medium-grained assessment is an estimation-dominated assessment, to estimate by analytic formulation of behavior through equation or simulation. It is suitable for from two to ten system design options, and to a situation where acceptable design estimation-error tolerance is on the order of 20%, and the integrator has an understanding of how the blocks interact. It can be used to examine the interaction between blocks critical to operational sufficiency of the design. In this phase, all blocks in consideration have a high probability of being used in the final design.

Most refined (fine-grained) assessment is a design-dip-dominated assessment to make measurements from a refinement of block design. Dipping is a process in which a new block is transformed into a soft block, a pre-designed soft block into a firm block, and a pre-defined firm block into a hard block. Results are generated from either simulation, emulation or prototyping. Fine-grained assessment is suitable to all or part of a single-option chip design where acceptable design estimation-error tolerance is less than 5%, such as during final resolution of critical issues for which existing design refinement is insufficient. It can be used to examine a subset of chip behaviors or block-interactions which need to be studied in detail to guarantee sufficiency or to guarantee that resolution provided by any existing simulation model for the block is sufficient. It can also be used to examine the failure of the block to meet design requirements, which will strongly impact final design feasibility. In this phase, not every block in consideration will be dipped; instead, substantially only those blocks that have critical impact on the FEA decision process are dipped.

In FIG. 20, the width of each triangle represents the error in prediction of the system FEA criteria. At each level of the assessment, the key is to refine as little as possible the FEA criteria while reducing the designer's error so that an FEA decision can be made quickly. At each phase of the FEA process, the basic intent and strategy is the same, as listed below:

(1) Gather available information about the blocks under consideration;

(2) Identify and refine locally those blocks most likely to impact system-estimate error;

(3) Assess whether the design meets the FEA constraints. If so, stop the FEA process; and if not, (4) Refine globally the block-estimates in the system if FEA constraints are not met.

A key part of the FEA process illustrated in FIG. 20 is how to calculate the acceptable global error (or overall error) in the prediction of system criteria, and identify which few blocks require estimate refinement to bring the global error to within acceptable bounds. This calculation process requires three parameters:

(1) Estimate of the acceptable global error for making a decision;

(2) Estimate of the global error which will result from current system analysis; and (3) The sensitivity of the global error to the error in estimating a particular block in the design (also referred to as the block-error impact).

Figure 21:
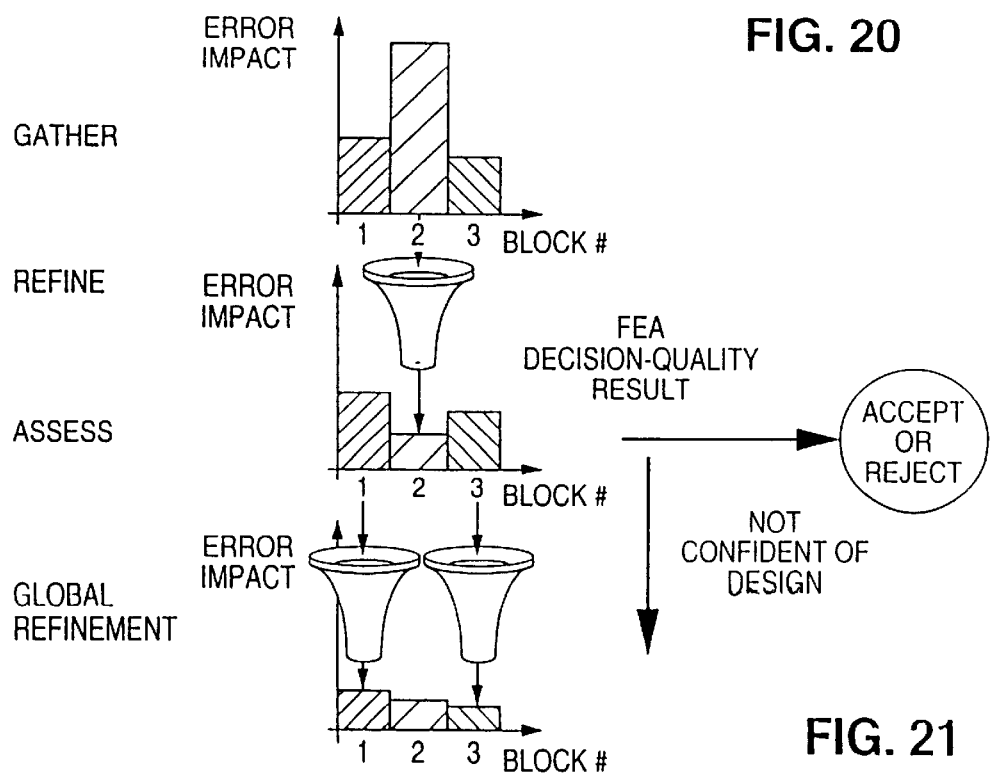
FIG. 21 illustrates a refinement process, in accordance with the present invention.

The first parameter is defined by the risk-profile of the system integrator, the constraints supplied by the customer, and a good prediction of the global error, which will result from basing a system prediction upon the current state of data. The second and third parameters are all derived from building accurate Error Impact Curves. Referring to FIG. 21, there is illustrated the driving of the refinement process, given the error impact curves, in accordance with the present invention.

To further define the FEA process, the present invention uses four basic assessment techniques:

1. FEA Decision Process: Defining Data-In, Data-Out and the Decision Process based upon Data-Out. (i.e., How is Data-Out related to the assessment of acceptable risk?);

2. FEA Data Extraction Process: Moving from a complete set of Data-In for the abstraction level being considered to the generation of Data-Out;

3. FEA Block-Refinement Identification: Defining a common mechanism for establishing the System-Estimation Impact, given the Estimation-Error and Block Criticality within a system design. (i.e., Highest potential impact blocks are refined further if the acceptance criteria for the Decision Process are not met); and 4. FEA Assessment-Axes Metrics: Defining the actual metrics to be used for each of the axes-of-acceptance associated with FEA. (i.e., defining how the criticality of a block within a system is defined).

In the method and system of the present invention, a set of estimate correctness curves are used to validate the FEA process. Each of the estimate correctness curves is presented over an FEA axes, which visually provides the elements and criteria for validating the FEA process. To better explain the function of an estimate correctness curve, the following elements and criteria are defined. Collectively, these elements and criteria are referred to as the FEA Axes of Acceptance. These definitions apply to both blocks and the overall system.

| | |
|---|---|
| Power | per mode of operation (e.g., mW) |
| Performance | intra-cycle delay (e.g., ps/ns/us) |
| | latency (e.g., ns/us/ms) |
| | throughput (objects/second-e.g., 50 kB/sec) |
| Area | area including: gates, routing, perimeters, unused white-space (e.g., mils) |
| Cost | Non-recurrent engineering cost (e.g., U.S. $) |
| | Cost per Unit (e.g., U.S. $) |
| Schedule | Resource allocation (e.g., man-years) |
| | Deliverable timelines (time) |
| Risk | Possibility of error (%) |
| | Impact of errors (U.S. $, and/or time) |

Before conducting the FEA process, the customer provides the system integrator with as much of the following information as possible:

(1) A set of circuit blocks which are either in soft, firm, or hard format;

(2) A set of simulators (estimators) or previous-experience estimates for the blocks, along with error-tolerances for the estimates;

(3) A set of specifications describing the overall chip functionality and performance requirements; and (4) A set of stipulations regarding acceptable schedule, cost, and risk for the project.

The customer may also provide:

(5) Behavioral definitions for any new blocks to be incorporated into the chip; end (6) Identification of known critical issues.

Before conducting the FEA process, the system integrator should:

(1) Determine a risk profile by which design suitability is assessed, including:

a. Guard-Bands—The integrator's over-design margin for each of the FEA axes;

b. Acceptance Risk—Certainty that design will satisfy requirements prior to accepting a customer request. This is simply expressed as a standard-deviation measure—the Aσ design-acceptance risk; and c. Rejection Risk—Certainty that specified design is unable to be assembled and fabricated with available blocks. Note that rejection is actually a risky behavior for the system integrator: the risk being taken is that the rejected design was actually feasible even though initial assessment made it appear doubtful. This is also expressed as a standard-deviation measure—the Rσ design-rejection risk.

(2) Verify that the submitted blocks, in combination with any new or third party blocks, are sufficient to meet the project constraints within acceptable limits of risk.

Figure 22:
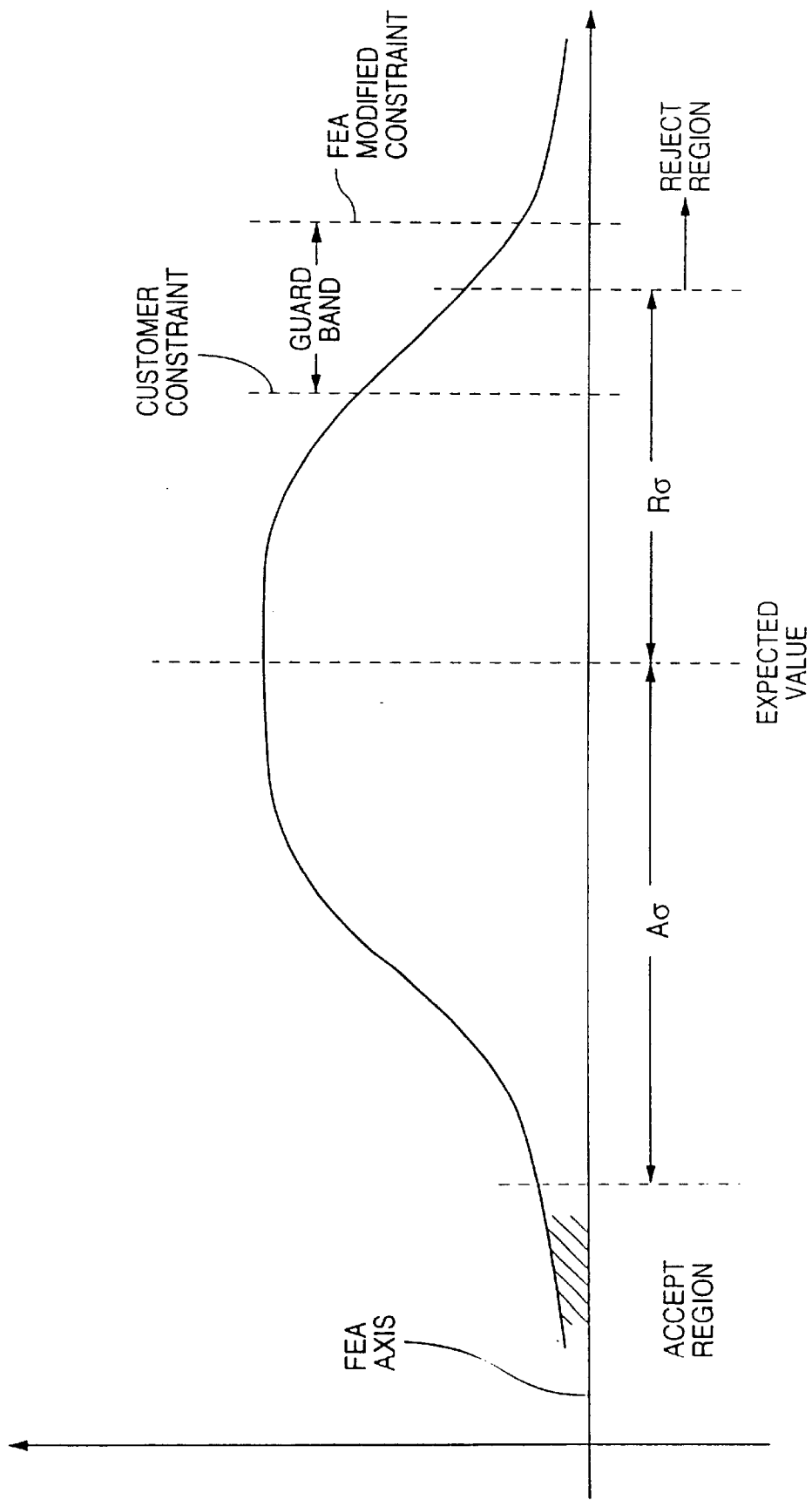
FIG. 22 shows an exemplary estimate correctness curve, in accordance with the present invention.

Referring to FIG. 22, an exemplary correctness curve estimate is shown, in accordance with the present invention. The horizontal axis is an FEA axis, which can represent any customer constraints or the overall constraint for the system. To facilitate explanation, assume that the FEA axis represents power. The vertical axis represents estimate correctness. According to FIG. 22, the guardband of the power constraint is between the constraint-initially specified by the customer and the constraint modified by the FEA process.

Note that, in the example given, the design is rejected because the power constraint modified by the guardband lies within the rejection region. This is true even though the power constraint initially specified is not in the rejection region.

If the modified power constraint had been between the Aσ and Rσ markers, the FEA refinement process would have proceeded. This process would continue to reduce the expected error variance (i.e., the power-error variance, in this example) until an accept or reject decision can be made based on a refined estimate correctness curve.

Figure 23:
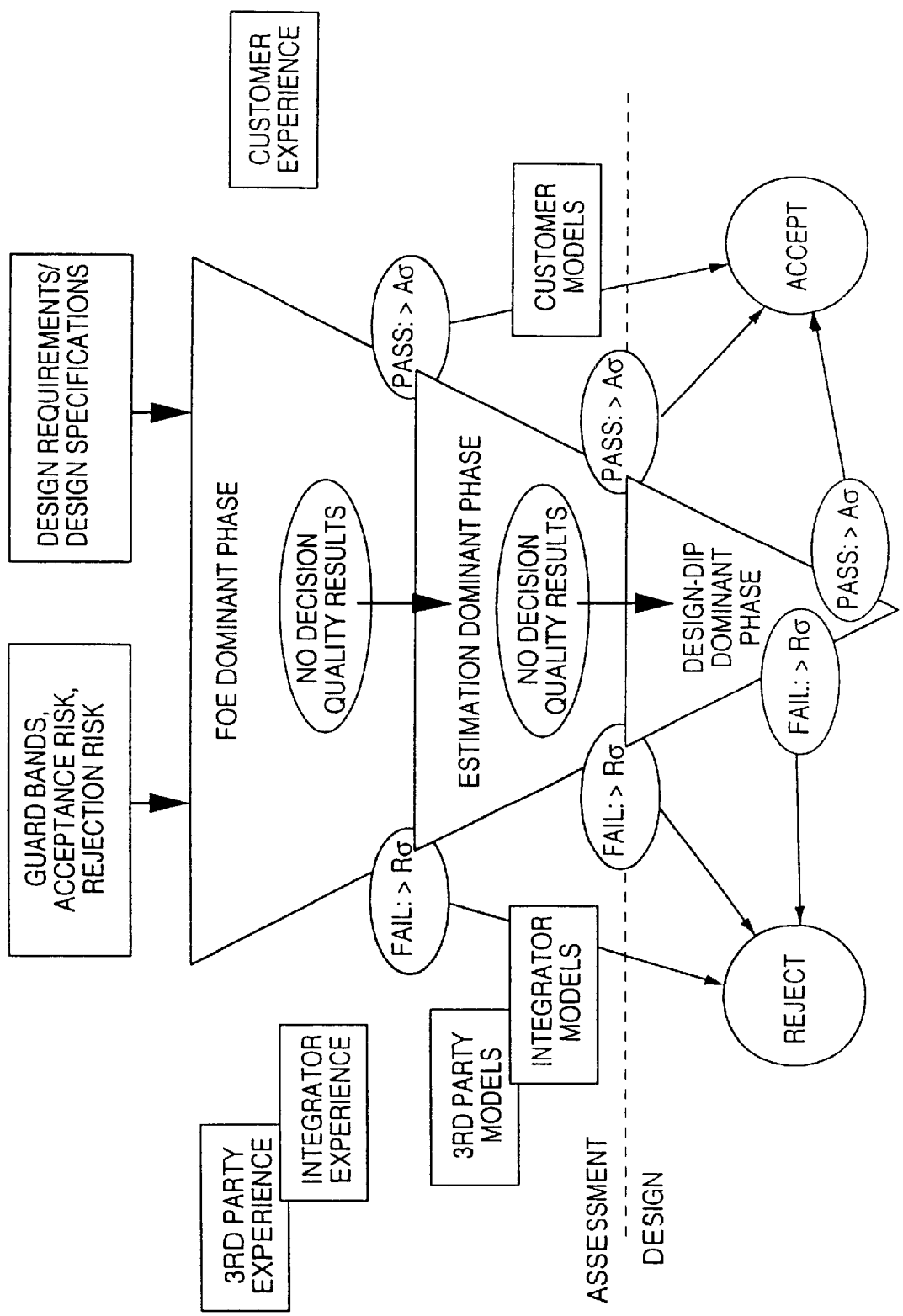
FIG. 23 shows a process of validating an FEA, in accordance the present invention.

Referring to FIG. 23, a process to validate an FEA is shown, in accordance with the present invention. The inventive FEA validation process includes four phases:

0. Pre-FOE Phase (not shown):

Obtain the customer design constraints for each of the FEA axes of acceptance. Modify each of these constraints by the required guard-band. These modified customer constraints are used only for verification of the FEA process, and are referred to simply as the design constraints.

1. FOE Dominant Phase:

The system integrator commences FEA by combining together the FOE estimates and estimate-error tolerances to determine whether the required constraints are guaranteed (confidence is higher than defined by: Aσ for a pass, or Rσ for a fail) to be met.

(a) If, despite consideration of third party blocks, constraints are still violated, then the design is not possible. The system integrator must return to the customer with a set of options and the constraints met by these configurations.

(b) If the constraints are met to within acceptable risk, the FEA process is complete.

(c) If there exists less-than-acceptable confidence of predicting the passing or failure of the design, then the estimation phase must commence. To enter the estimation phase, the set of "most-likely-to-pass" design configurations (i.e., best) must be selected.

2. Estimation Dominant Phase:

For the set of best designs derived from the FOE stage, an identification of criticality must be made; i.e., given the error tolerances on each of the blocks involved, which are statistically the most likely to validate that the design has passed constraint validation. This will be a product of both the size of the variance of the FOE specification prediction for a block, and the impact that block has upon the design constraint in question. Estimation should proceed by stubbing-out as much of the non-critical design as possible, and generating design specific estimates for that which remains.

(a) Violation: Similar to procedure 1(a) discussed above.

(b) Satisfaction:: If the level of indeterminacy is unlikely to be reduced further by increasing the accuracy of estimation (reducing the amount of stubbing will not improve the estimate in any statistically significant way, due to the fact that the error-tolerance is dominated by blocks already included in the estimation), or a full estimate of the SOC design has been built given existing block models, then the best design must pass onto the dipping phase.

3. Design-Dip Dominant Phase:

Refine the block estimate to which the global error is most sensitive, then proceed as per the estimation phase. Continue iterating this process until the FEA is confirmed or denied. The definition of statistical criticality is similar.

Figure 24:
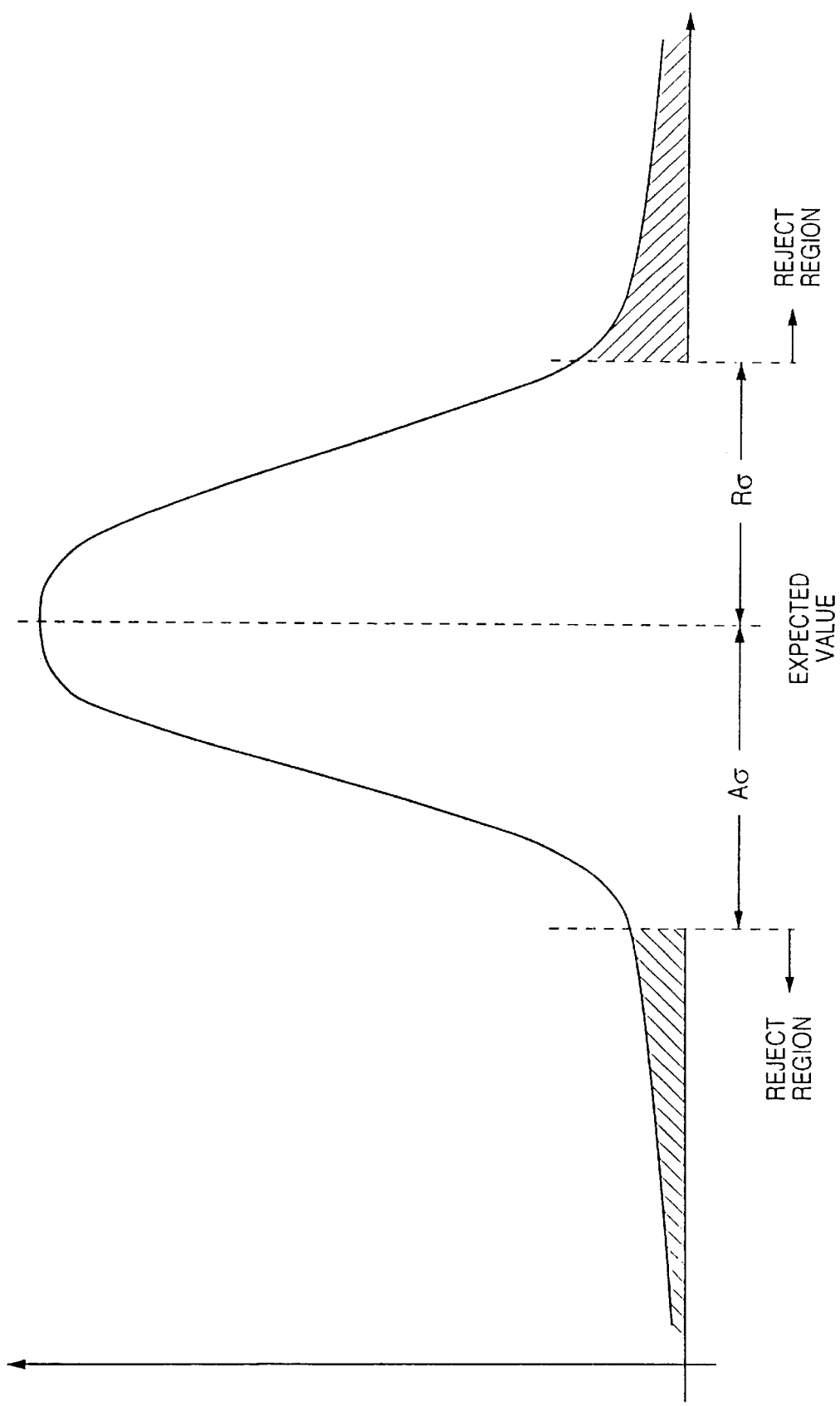
FIG. 24 shows a refined estimate correctness curve using an FEA design-property refinement process, in accordance with the present invention.

Referring to FIG. 24, a refined estimate correctness curve using the inventive FEA design-property refinement process of the present invention is shown. Through the refinement process of moving from FEA phases 0 to 3, discussed above, the expected error variance on the refined estimate correctness curve is greatly reduced compared with that of the estimate correctness curve shown in FIG. 22. Thus, a decision to accept or reject may be made based on a refined estimate correctness curve, as shown in FIG. 24, whereas such a decision may or may not be made based on the estimate correctness curve shown in FIG. 22.

If an FEA decision cannot be made based on the available information and data at one phase of validation, the present invention performs a design-property refinement process to reduce the expected error variance. Based on the refined data and information, the present invention performs the FEA validation at the next phase. The design-property refinement process comprises the following three aspects:

(1) FEA Data-Extraction Process;

(2) FEA Block-Refinement Identification; and (3) FEA assessment-Axes Metrics.

Figure 25:
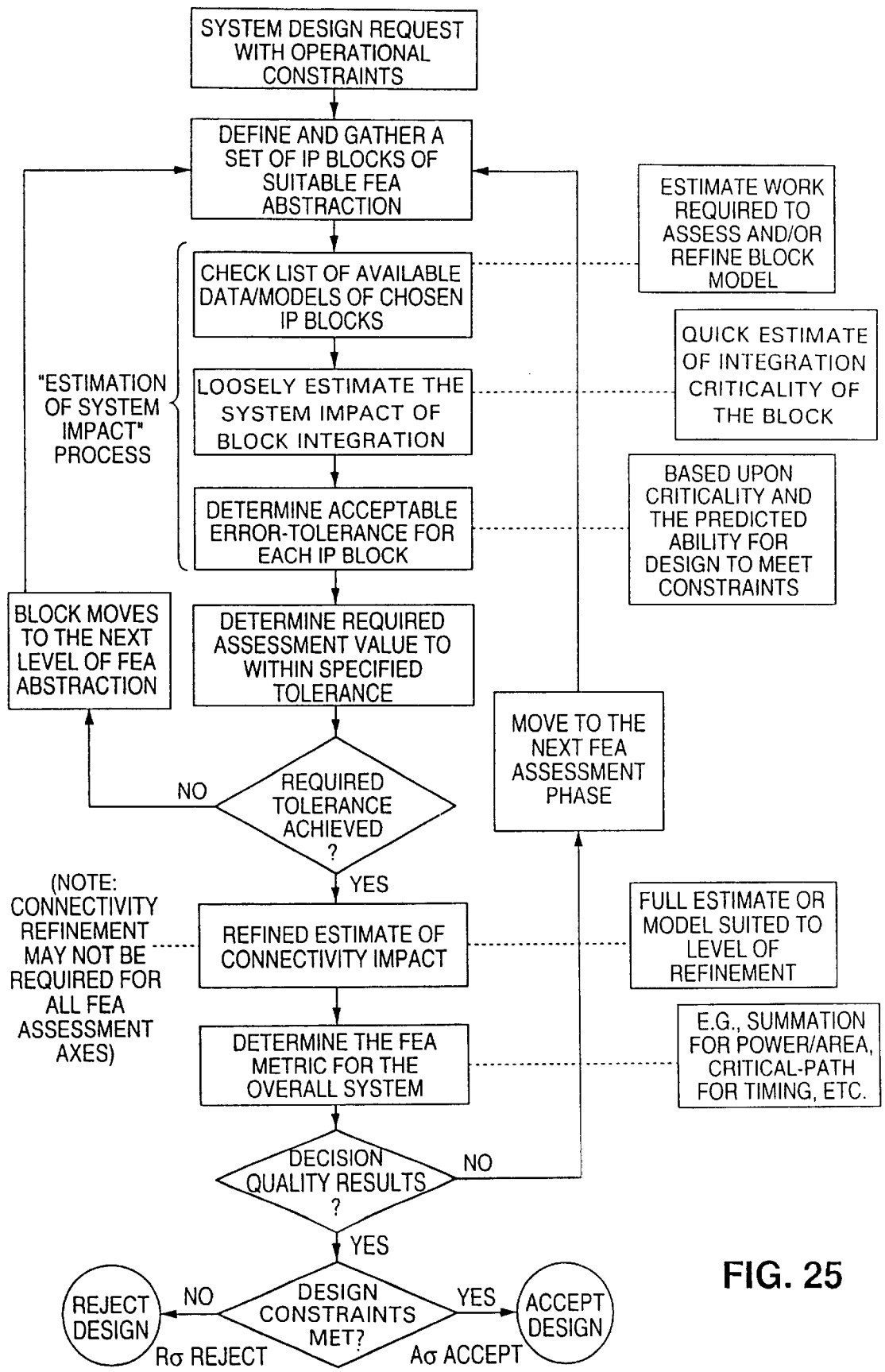
FIG. 25 shows an FEA data-extraction process, in accordance with the present invention.

Referring to FIG. 25, the FEA Data-Extraction Process is shown, in accordance with the present invention. There is a standardized mechanism, or process, for establishing an "Estimation of System Impact" for prediction error associated with each block in a system design. This mechanism, referred to as Block-Refinement Identification, enables the required error-boundary on properties (the FEA Design Criteria—e.g., power, area, performance, etc.) of any specific block to be determined for each refinement phase of FEA system-design assessment.

Let $L(\beta)$ be the limit specified by the customer, as modified by any required Design Margin, for the design to satisfy FEA Criteria $\beta$. Let the expected value of the design as measured against FEA Criteria $\beta$ be $E(\beta)$. The Design Decision Constraint, or the "maximum error tolerable", for the design to be defined as pass/fail relative to the FEA Criteria $\beta$ is given by: $DDC(\beta)=|L(\beta)-E(\beta)|$. For an expected "Pass", $E(\beta)$ itself must lie within the acceptance region for the FEA Criteria, and for an expected "Fail" $E(\beta)$ must lie within the rejection region. Effectively, in the first case for a "Pass" we require: $A\sigma_{system}<DDC$, and in the second case for a "Fail": $Rsystem<DDC$. If the inequalities are unsatisfied, then the system analysis does not produce a decision-quality result.

It should be noted that, in general, the average estimate $E(\beta)$ is the final estimate of system-criteria $\beta$ as produced by the previous phase of system-assessment. i.e., The Medium Grain Assessment stage takes as the average the final estimate of the Coarse Assessment Stage, the Fine Grain Assessment Stage takes as the average the final estimate of the Medium Grain Assessment Stage. To initiate the process, the Coarse Assessment Stage must be entered by first establishing a coarse-level expected-value estimate for each of the FEA Criteria.

For the system to be assessed relative to the Design Decision Constraint (DDC) for a particular FEA Criteria $\beta$, a relationship must be established between the errors associated with block estimates and the total estimate error for the system. Note that the error associated with a block estimate is not just the inherent error of estimating the $\beta$-criteria for the block, but also the specific influence of that block and block-error upon the difficulty of estimating integration cost. The error in estimating the block is consequently scaled by a system-criticality measure, C, which is a measure of the difficulty in integrating the block based upon its properties or lack-or-definition (error) for FEA Criteria $\beta$. The determination as to the Pass (Fail) of the system is established through the relation of the set of {$C_{block.oblock}$|block ∈ system} to $\sigma_{system}$ and the required inequalities: $A\sigma_{system}$<DDC ($R\sigma_{system}$<DDC) for each of the FEA Criteria.

It should also be noted that to keep the inclusion of the criticality measures $C_{block}$ neutral relative the system inequalities expressed above (i.e, $\sigma_{system}$ is formulated from an expression which combines the criticality scaled block errors: $C_{blocks.oblock}$), the criticality measures are normalized such that: $\Sigma_{blocks}(C_{block})^2=1$. The process for assessing this varies slightly depending upon the class of system-property being assessed. From the perspective of FEA, there are three classes of system-properties each described below:

Absolute (Block) Constraints (e.g., Intra-Cycle Delay, Throughput)

Relative (Block) Constraints (e.g., Power, Area, Latency, Cost, Schedule)

Mixed (Block) Constraints (e.g., Quality)

Figure 26:
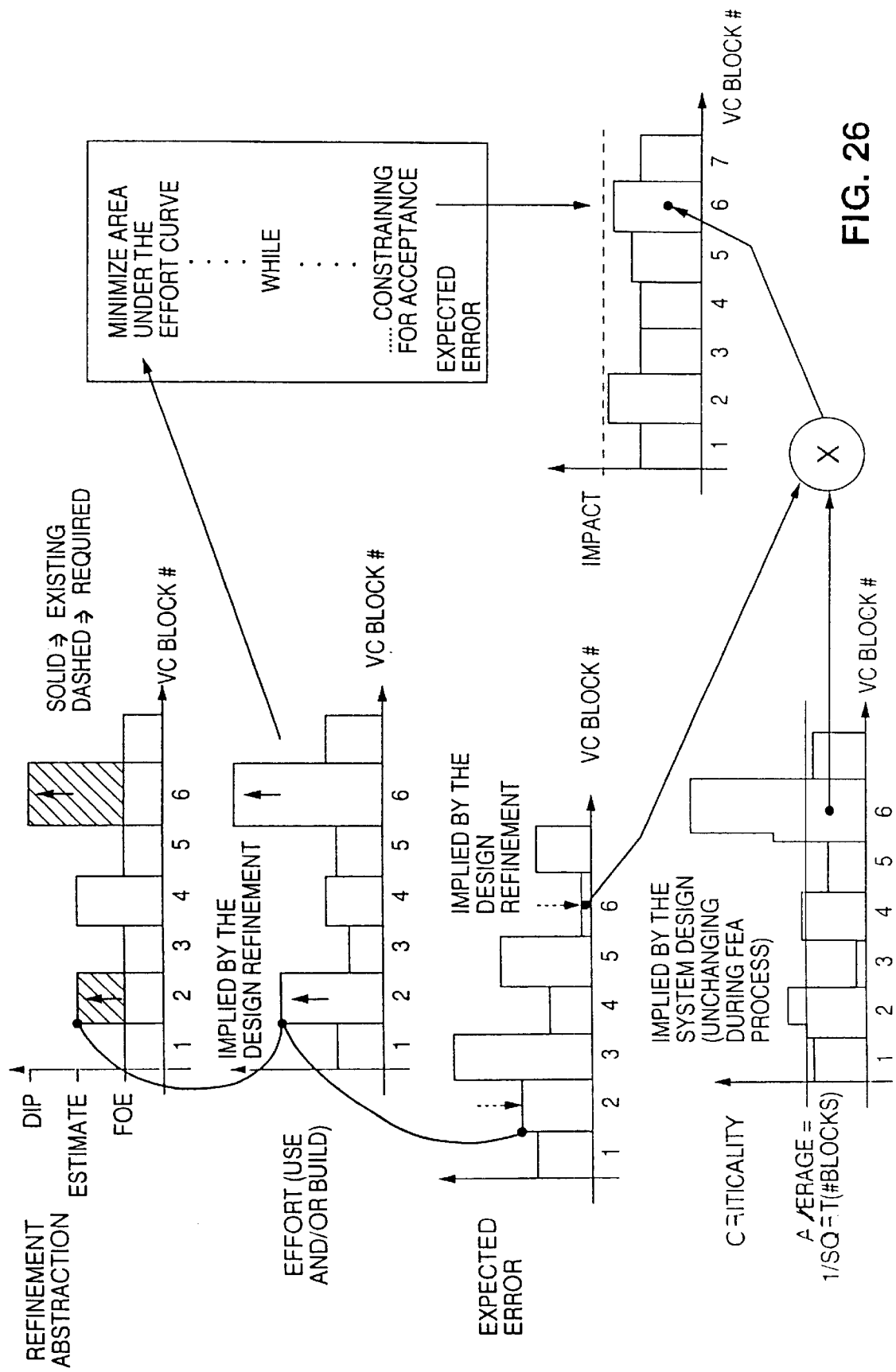
FIG. 26 illustrates a process of identifying the need for block-estimate refinement, in accordance with the present invention.

For simplicity, for an FEA Criteria β define BDC as the Block Design Constraint where: $BDC_{block}=A.C_{block.oblock}$ in the case of test for design acceptance, and $BDC_{block}=R.C_{block.oblock}$ in the case of test for design rejection. Then, for each FEA Criteria:

a. Absolute Constraint: To achieve a decision-quality result each block, or each block immersed in its immediate environment (e.g., including routing load, etc.), must pass the DDC for the Absolute Constraint. Mathematically, achievement of a decision-quality result on an Absolute Constraint implies:

For all blocks ∈ in the system, $BDC_{block}$<DDC b. Relative Constraints: A decision quality result is achieved if the square summation of block-design constraints throughout the system is less than the square of the DDC. The term relative is used as the acceptable error of assessment for this constraint has the flexibility of being partitioned amongst the blocks, which make up the entire system. Note that some assessment criteria of the Relative type may have multiple constraints. An example of this is Latency, as there may be several critical paths, which contribute to a valid assessment of the complete system. Mathematically, achievement of a decision-quality result on a Relative Constraint implies $\Sigma_{blocks}(BDC_{block})^2$<$DDC^2$, assuming that all block-errors are Gaussian-distributed, independent random-variables.

c. Mixed Constraints: A mixed constraint is a type that involves both the relative and absolute types of constraint. For example Quality is a mixed constraint. No block within a design can exceed a specified bound on its measure of quality, but the summation of all quality assessment across the system must also fall to within a specified range. In this case there is both a $DDC_{block}$ for the blocks, as well as a $DDC_{system}$ for the overall system. Mathematically, for a mixed-constraint system-property two criteria need to be satisfied:

(i) For All: block δ system, $BDC_{block}$<$DDC_{block}$ (ii) $\Sigma_{blocks}(BDC_{block})^2$<$(DDC_{system})^2$ Referring to FIG. 26, there is shown a process of identifying the need 20 for block-estimate refinement, in accordance with the present invention. As shown, there are three steps in FEA Block-Refinement Identification, including:

1: For each FEA assessment criteria of the Absolute or Mixed Constraint type, the level of work required to achieve the absolute error tolerances (CIC's) is determined. As a by-product of refining a model to satisfy the need of Absolute Constraints, some error-bounds associated with Relative Constraints may also be reduced.

2: Based upon the error predicted after the models are refined to satisfy the Absolute Constraints, and Absolute part of the Mixed Constraint Type, the remaining system-error tolerance (CIC) for the system are determined and partitioned amongst the separate IP blocks. The partitioning will be defined in such a way as to minimize the work required to build an estimate. The flexibility of this partitioning is moderated by the defined criticality of contribution for each of the blocks within the assembled system. This defines the notion of error impact. Note that this problem must simultaneously optimize necessary work against acceptable error-tolerance along each FEA axis.

3: If at any stage system suitability cannot be determined using the proposed CIC's, these need to be tightened further and the process re-iterated either:

(a) for the block, if a specific absolute constraint is insufficient, or (b) for the system, if a relative constraint for the chip is insufficient.

Referring to FIG. 27, there is shown an FEA Assessment-Axes Metric, containing a table defining the concept of Assessment-Axis Criticality (AAC), in accordance with the present invention and including, where appropriate, exemplary criticality measures. The AAC relates to Expected System-Impact (ESI) through Expected Estimation Error (EEE) based upon the following relation: ESI=AAC*EEE.

As shown in FIG. 27, the table contains five columns, as the following:

| | |
|---|---|
| (1) Assessment Axis | FEA is measured based upon these criteria |
| (2) Constraint Type | Each FEA Assessment Axis may have one or multiple constraint-types associated with it |
| (3) Constraint Class | Class as defined above |
| (4) Routing Refinement | Type of routing-refinement necessary to ensure that the impact of chip routing is of the same degree of error as the specified block and system constraints |
| (5) Criticality Measure | Standardized way of measuring the criticality of a property associated with an FEA Assessment Axis |

Some elements of the table make reference to Routing Criticality. Routing Criticality is defined for any output pin of a block or chip input pad as Pin Routing Criticality= (Expected Net Length)*(Capacitance/Unit Length). Block Routing Criticality is the sum of Pin Routing Criticality across the output pins of a block.

The symbol: α denotes an effective-routing-area scalar whereby: α*(Routing Criticality) translates units and the scale of Routing Criticality into an area-applicable number.

Power consumed as a consequence of routing requires an estimate of activity on the lines. This can be done at a block or pin level of resolution. When applied to the block, the activity estimate is derived from the average activity on the output lines of the block, denoted: $E_{block}$.

A point connection counts as any fanout point unless several fanout points are connected by use of a shared bus. A shared bus counts as a single distinct block. Routing criticality is a measure of the expected difficulty in routing connections to a pin and, therefore, it is a measure of FEA uncertainty.

Note that many of the assessment axes might be identified as mixed constraints at some level of resolution; e.g., an area may be defined as mixed after initial floor plan is defined and used to partition the SOC design chip-level constraints into block-level constraints. However, the dominant constraint type used during the rapid FEA period is listed.

The term Error used in the table refers to the bound on error as relates to the property in question.

Organizing the Field of Experience Data

Designer experience is a crucial part in the system-decision process of the BBD methodology. The BBD methodology extends the concept of experience associated with a single key designer or architect to the concept of "company design experience". This general "pool" of experience is referred to as the BBD Field of Experience (FOE) of the present invention.

It is the purpose of BBD method to propose four concepts and mechanisms for the building and use of FOE. These concepts are:

a) Data Gathering—Definition of rigorous processes for obtaining and initiating FOE data.

b) Data Classification—Information classification and mechanisms for developing relevant classifications. Such classification guarantees that gathered data may be statistically analyzed, extrapolated, and globally refined as the amount of accumulated design-knowledge increases.

c) Data Certification—Definition of a process that builds the correct assurance of "trust" in what might otherwise be referred to as "rule-of-thumb" numbers. Certifying FOE data will guarantee that estimates built from the FOE database are statistically well bounded.

d) Data Application—The mechanism for application of FOE to the design process. This is a part of Front End Acceptance for BBD.

Field of Experience Definition

In BBD, Field of Experience can be defined as compiled data from measurement of prior designs classified according to design styles, design purpose, and critical measurements of design characteristics. Critical characteristics may include: area, throughput, power and latency. The definition of Experience-Based Estimation is systematic prediction based upon experience with similar designs or design behaviors. It follows that the definition of FOE Estimation is Experience-Based Estimation using FOE data.

It should be noted that this is distinct from BBD Estimation in that it does not imply the specific analysis of the design in question, or—where the hardware design is actually known from previous exposure—specific analysis of a new behavior requested of that hardware. For example, a DSP core may have been developed within a company and an FIR-Filter embedded routine run upon it in a previous instantiation of the core. It may then be requested that feasibility of an FFT algorithm running on that same core be considered. If that first rule-of-thumb is based solely upon the previous algorithmic efficiency observed when executing the FIR operation upon the design, but without entering into the details highly specific to the FFT algorithm, then this is an FOE estimate.

Field of Experience must explicitly draw upon information derived during a set of previous design projects. FOE data must be able to be catalogued, stored and accessed through a standard database.

There are three different classes of experience-based data used in design, each form of data being associated with a specific error profile:

a) Project Data—Designer-requested estimate at project time. The designer does not draw upon the experience of others as logged in the FOE database, but more upon his own uncatalogued design experience. Error in the design estimate is given by a Designer-Error Variance, which has been observed for general designs. Designer-Error Variance is built from measuring a general history of designers' ability to accurately predict results.

b) Predicted Data—Within a design classification but without a specific project in mind, a designer is requested to give his best-guess parameter-relationships for extending existing FOE data. In this case, the FOE data being extended may consist of as little as a single design-point. Error for this is in part specified by the designer's best guess at the parameterization error, but also modified by the history of designers' ability to accurately predict results. Assuming statistical independence, these error variances would be summed.

c) Collated Data—Collected, classified and parameterized data from a set of design experiences. There is a possibility of measurement error directly associated with this data, but this is likely to be minor. The main error is defined as the difference between measured results and those predicted by the variation of data-parameters.

Note the Project Data is not a form of FOE data as it provides no mechanism to extend the current estimates to future designs. Furthermore, as Project Data is gathered at the commencement of a project, not the completion, it is not verifiable against catalogued design experience. This implies that it is not certified. Any data gathered from Final Measurement of the design may be entered into the FOE database, and the accuracy of the Project Data versus Final Measurement be used to refine Designer Error Variance for the company.

Predicted Data are referred to as FOE seed-data. Predicted Data may be immediately applied to FOE estimation on like designs.

A common classification of the types of data received must apply to both of the above sources of FOE data. Such common classification permits the quick identification and cataloging of received data. Initial classification-specification is regarded as the planning stage for FOE, and the entering/gathering of data is the building stage. As the amount of information in the FOE database grows, the refinement process is applied to reduce error tolerances to within those being observed statistically. In parallel with all three of these stages is the FOE certification process.

The parameters listed above are used to extrapolate from existing, general FOE data to derive project-specific FOE estimates. Such a relationship between extrapolated estimates and FOE data is preferably defined for each design classification. Each parameter FOE relationship may be defined by a designer's personal experience (see Predicted Data above), or may be empirically specified through curve-fitting the FOE data if sufficient information is available. Parameters might include such technical variables as pipeline depth, degree of parallelism, bit-width, and clocking-speed.

It should be noted that FOE applies not only to design blocks, but also to the interconnect between the blocks. In such cases, FOE may be specified as the cost of routing between blocks of one classification and blocks of another. Like the application to blocks, FOE estimates for interconnect may also be parameterized.

Figure 28:
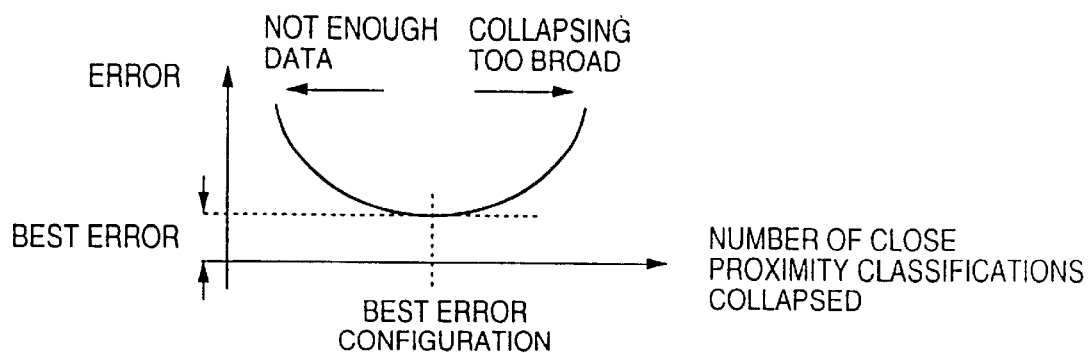
FIG. 28 shows a classification collapse curve, in accordance with the present invention.

Estimating with Maximum Accuracy:

A key aspect of FOE is the generation of estimates of maximum accuracy given the data provided. This is a twofold process:

a) Refinement—As mentioned above, refinement is the process of reducing the error-of-estimate to within that being observed statistically. That is, when the amount of FOE data in a specific category is small, the error tolerance for the data is large. This is not due to an inherent error, but rather to the unknown (or untested) applicability of the parameterized data to other specific designs. As the number of examined designs increases, the statistical spread of data can be measured directly against parameterized predictions. When a large number of cases are catalogued for a specific classification of design, then the accuracy of the parameterization method will be well established. Identification of large correlated error (as opposed to random spread of data) could motivate the rethinking of the parameter relationships.

b) Classification Collapse—The different classifications of designs may be related-by proximity to one another. For example, the Butterfly FFT implementation may be one classification of design, but all FFT blocks may be regarded as closely proximal to this design. If the number of data associated with a particular classification of interest is too small to be statistically significant, then close proximity FOE data may be collapsed together to reduce the overall estimation error. The collapsing of classifications together will itself induce an error due to the slight difference in design types, but the statistical improvement in terms of number of designs considered may overwhelm this difference-error. It is preferable to compute a curve such as that shown in FIG. 28, and from that pick the configuration of best error.

The process/use model for FOE is therefore as follows:

I. Choose Block Classifications applicable to block being assessed

II. Does enough data exist for that classification? (i.e., is the Expected Error sufficient?)
   Yes—Return the best FOE estimate and END
   No—Proceed III. Collapse categories of close proximity until estimate error ceases to improve IV. Is the Expected Error sufficient for FOE estimation?
   Yes—Return the best FOE estimate and END
   No—Proceed V. Ask the designer to generate his best guess for the design. (This may be a dip into the Estimation Phase of BBD.)

FOE Certifying

Certification of FOE is the process by which the FOE information gathered is shown to be reliable. This certification process will establish the error of estimation during the Building and Refinement stages.

There are two aspects of certification:

a) Certification of Completeness—all FEA metrics must be measurable through the parameterization schemes provided.

b) Certification of Accuracy—including experience measures for designer, and the definition of process to ensure accuracy of collected data.

Glue Logic

The present invention further discloses an improved glue logic distribution and reduction methodology. The combination of three alternative glue logic distribution mechanisms comprises a preferred embodiment of the present invention. First, glue logic that is not incorporated into predesigned blocks can be duplicated into multiple copies for distribution to the existing blocks. Second, logic that has no affinity to a block at the top level can be left as small blocks, optimally placed to minimize effective gate monopolization, wiring congestion, and floorplanning impact. Third, where the number of blocks exceeds the block place and route limitations, glue logic may be clustered into glue cluster blocks until the block count is reduced to an acceptable level.

Figure 29:
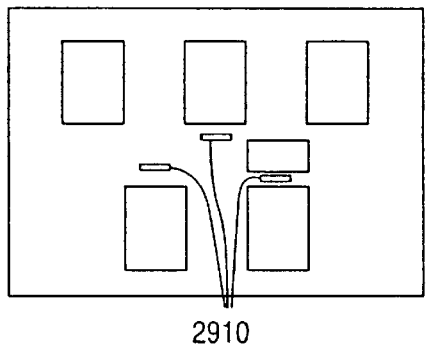
FIG. 29 shows a plurality of design blocks in a circuit design, wherein glue logic interferes with optimal design block placement.

Referring to FIG. 29, there is illustrated a circuit design view wherein glue logic 2910 resides disadvantageously between interconnected blocks, thereby rendering inefficient the use of significant areas of silicon real estate and creating significant wiring congestion.

Figure 30:
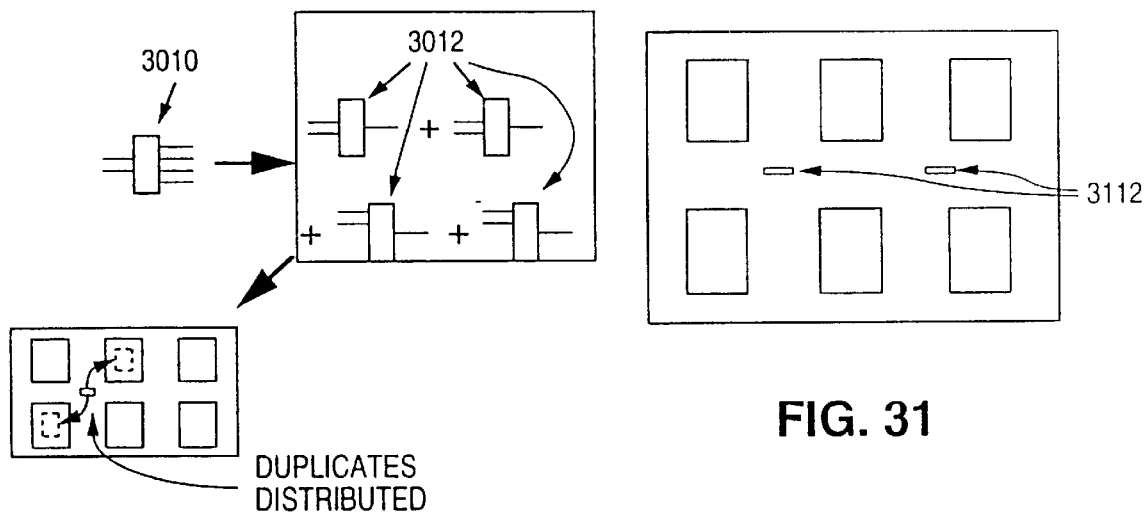
FIG. 30 illustrates a first type of glue logic distribution, in accordance with the present invention.

Referring to FIG. 30, we will begin with a description of the present method for creating multiple copies of glue logic for distribution to larger top-level blocks. If an element 3010 has output nets driving multiple loads, the element is split into multiple elements 3012, each having only a single load on the output. In turn, each input "cone" (not shown) driving the duplicated element is copied as well, until all block outputs are reached. Similarly, large input gates are reduced to trees of non-inverting two-input gates, with a two-input gate of the original function at the top of the tree. In this way, substantially more logic is dedicated to the previously much smaller glue logic function. However, by removing glue logic from the areas between the larger blocks, the larger blocks can be more efficiently placed, resulting in a net efficiency increase.

Any glue logic element that cannot be effectively duplicated for distribution is then preferably merged into a larger block having the closest affinity to the placed element. Glue logic merger is executed in a manner based on a number of criteria, the most significant of which is whether the merger reduces the number of top-level pin-outs. Thus, when multiple copies are created, since most of the resulting logic is comprised of two-input gates, merging such gates into blocks wherein one pin is connected to the block reduces the pin count by two. When two or more blocks are equal candidates for merger, the block having the lowest pin density is preferably chosen. Finally, the lowest priority preferably goes to timing considerations.

Figure 31:
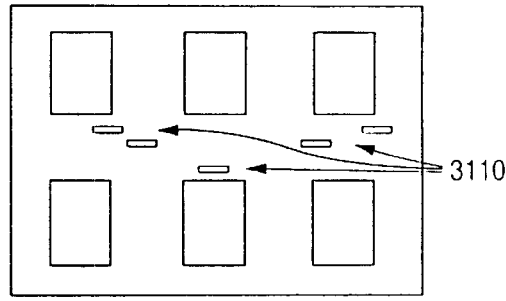
FIG. 31 illustrates second and third types of glue logic distribution, in accordance with the present invention.

Next, referring to FIG. 31, gates and small blocks 3110 that cannot be merged are clustered into clusters 3112. Gates that cannot be merged most likely have multiple loads on both their input and output nets. By recombining gates with inputs having similar function, gate count can be reduced.

The present invention further discloses a method to convert pre-designed circuit blocks into circuits having standardized interfaces.

The tasks performed in the block design stage 106 in FIG. 1 include: (1) creating any missing abstracts for the selected circuit blocks, (2) embedding the circuit blocks into their respective standardized interfaces known as collars, and (3) creating a complete set of abstracts for the collared circuit blocks.

Figure 32:
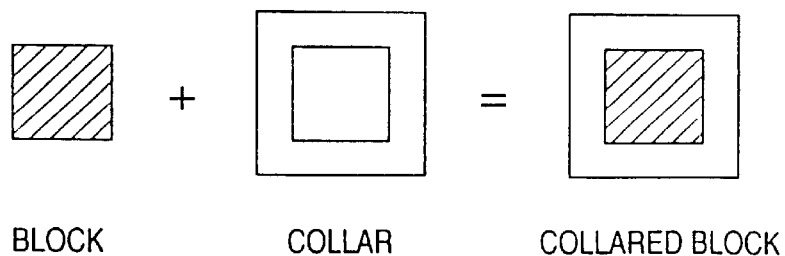
FIG. 32 shows a collaring process of embedding a circuit block into a collar, in accordance with the present invention.

Referring to FIG. 32, a collaring process of embedding a circuit block into a collar is shown, in accordance with the present invention.

Figure 33:
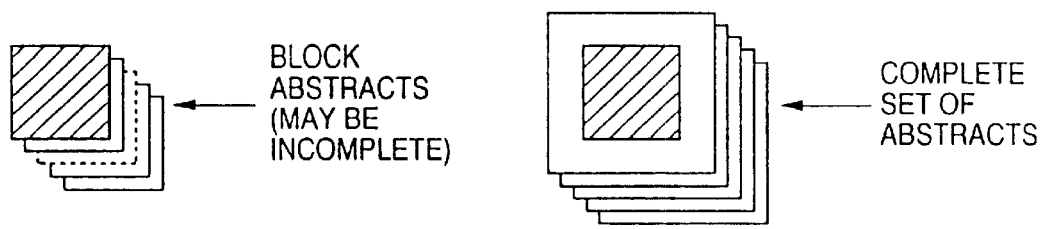
FIG. 33 illustrates creating a complete set of abstracts for a block, to be used in a design in accordance with the present invention.
Figure 34:
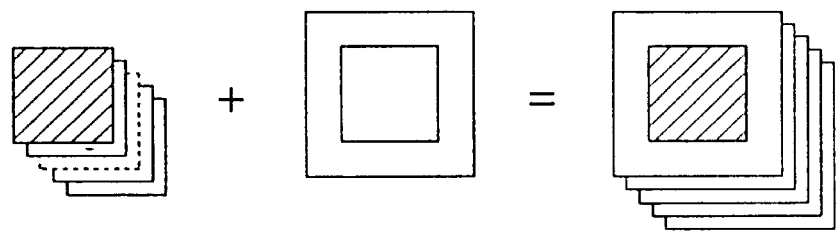
FIG. 34 is a flowchart illustrating the collaring process, in accordance with the present invention.

In the BBD methodology, selected circuit blocks are the primary input components at the chip-level. The collaring process places a collar around each of the circuit blocks to create a standard interface around the boundary of the circuit block. To successfully integrate collared blocks into the chip-level, a complete set of abstracts has to be created for the collared blocks. Before creating the complete set of abstracts for the collared blocks, the system of the present invention first forms any missing abstracts for the selected blocks, where abstracts are models or views of the block, or collared block designs required by chip-level assembly or planning tools. Exemplary abstracts include (1) Static Timing Abstraction—TLF
(2) Layout Blockage File—LEF
(3) Models for Verification—Bolted-Bus-Block model
(4) Block layout constraints to the system Referring to FIG. 33, creating a complete set of abstracts of a circuit block is illustrated, in accordance with the present invention, while FIG. 34 illustrates a combination of the features illustrated in FIGS. 32 and 33.

We will move next to a description of the collaring process, wherein it is assumed that a standard interface has been defined for each type of the blocks to be used in design.

At a first step, the process checks whether each of the blocks has a completed block abstraction. If any of the blocks does not have a complete block abstraction, the process forms a complete block abstraction for the block.

Next, the process identifies a block type for each of the blocks. Specifically, a block can be: a memory type, a processor type, a power type, or an analog/mixed signal type. However, a type of circuit blocks from different sources may have different interfaces that require different designs to connect other circuit blocks. For example, the processors designed by different vendors may have different interfaces and bus structure.

Next, the process associates the identified block with its respective interface standard.

Thereafter, the process creates a first collar portion containing the components connectable to the specific interface of the identified block.

At a next step, the process creates a second collar portion in compliance with the standard interface associated with the identified circuit block.

The process then creates a third collar portion containing the components for converting the specific interface into a format connectable to the standard interface and connecting the first collar portion with the second collar portion.

Figure 35:
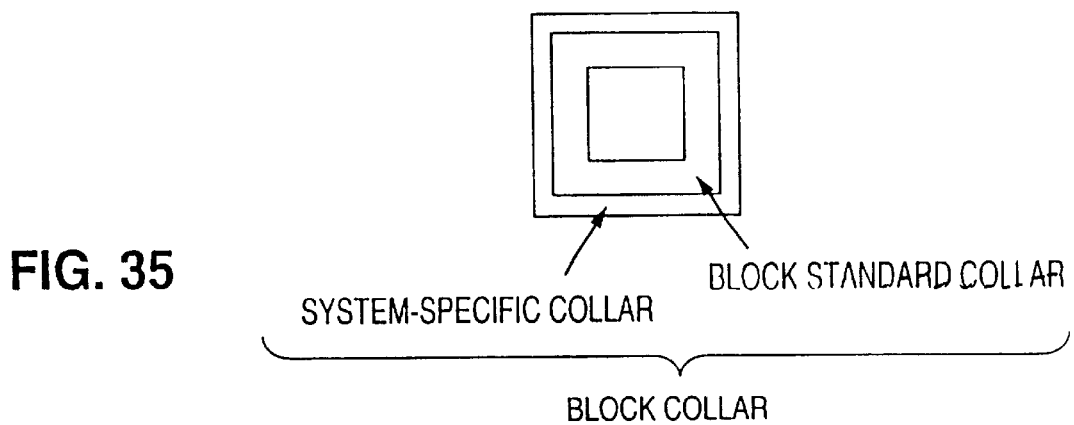
FIG. 35 shows a collar having two layers, in accordance with the present invention.

A block collar can be comprised of multiple layers. Currently, two collar layers (a block standard collar and a system-specific collar) have been defined for BBD and SOC, respectively. Referring to FIG. 35, a collar containing two layers is shown, one collar being standard for a particular block, and the other being specific to the particular system in which the block is to be deployed. The block standard collar contains those interface components that can be defined without the knowledge of the specific system or the specific context in which it is being integrated. For example, in the context of BBD, a particular design group may decide that a JTAG-standard test interface is required in a design. Thus, for all blocks to be used in any of the systems being designed, a JTAG test interface is a standard and, thus, belongs in the block standard collar. The system-specific collar (or adaptation collar) contains interface components which belongs to the block, but are system or context specific. For example, the standard set for data lines may not require a parity bit, but for a particular system being designed a parity bit is required on all data lines. The logic to generate the parity bit is associated with the block during chip planning and should reside in the system-specific collar.

Another distinction between the two collar layers in BBD is that the block standard collar can be put on prior to front end acceptance and chip planning (chip planning may require that an initial collar is designed as part of a dipping process to better perform the chip planning functions required), but the system-specific collar can only be added after chip planning.

A more subtle difference between the two collar types is that the standards set for the block standard collar may be much narrower in scope than the standards set in SOC. For example, a certain power interface can be a standard for BBD, but only for a particular company, and the other companies do not need to conform to that standard power interface for the block. Consequently, the blocks from outside of the company need a system-specific collar, which converts the standard power interface to the company one. This is contrasted with SOC, where an industry-wide power interface standard exists and resides in the block standard collar. The ultimate goal in SOC is to create a standard collar that is an industry-wide standard. A block that has such a collar can be called a socketized block. In the future, if all the aspects of the collar are industry-wide, there will be no need for an additional layering of system-specific collar, thus bringing the block closer to the ideal of plug-and-play.

Another dimension to the system-specific collar is that, although it is intended to be designed after chip planning, one can speed up the chip integration process by making a system-specific collar in chip planning, wherein the parameters for capturing the ranges that the system-specific collar will have to be targeted. This speeds up the integration process since, after chip planning, only the parameters need to be varied while the system-specific collar does not have to be re-designed from scratch.

The collars and blocks can be in various combinations of soft, firm, and hard. Just as there are advantages and disadvantages as to the hardness of a block, there are advantages and disadvantages to combinations of softness, firmness, and hardness of the collars. For example, if the block itself is soft, it may be suitable to leave the block standard collar soft so that when the system-specific collar is added, the entire block can be synthesized, placed and routed flat for the final conversion to layout. Whereas if a block is hard, it may be suitable to use a hard block standard collar to handle predominately physical interface issues with only a small amount of standard functional changes, since a soft system-specific collar to handle the system-specific issues mostly involves functional changes.

A collar transforms a block-specific interface into a standard interface in the following ways:

(1) transforming the physical configurations specific to the block into standard physical configurations, including pin layer, pin location, and pin separation;
(2) transforming the power supply specific to the block into a standard power supply, including power loading and power physical location;
(3) transforming the test process specific to the block into a standard test process, including test access port (TAP) controller and test protocol;
(4) transforming the timing specific to the block into a standard timing, including setup and hold time, flip-flop, or latch;
(5) transforming the clock ports specific to the block into standard clock ports, including the loading of each of the clock ports;
(6) transforming data/control signals specific to the block into standard data/control signals, including standardizing signal positive/negative assertion; and
(7) transforming the bus interface specific to the block into a standard bus interface, by adding registers for blocks expecting valid input on all cycles, big-endian or little-endian (a big-endian has the 0 bit on the left end of the data unit; a little-endian's is on the right), and converting bit width.

In addition, a collar may contain components (glue logic, as described above) for performing extra functions for a collared block. Glue can exist in three levels: (1) the glue deployed into a collar, (2) the glue combined at chip-level, and (3) the glue deployed in one or more mini-blocks at chip-level. Specifically, glue logic can include anything from simple functional translators (e.g., NAND gates along each of the bit lines) to more complicated functions (e.g., registers, accumulators, etc.). Although glue-logic can be of arbitrary size, if the glue size becomes significant relative to the block, estimates made during front-end assembly and chip planning may become inaccurate because glue size was not considered. A constraint may need to put on the relative size of the glue to the block.

A set of assumptions are used in the collaring process, as follows:

(1) The decision of whether or not to add glue logic is made in chip planning;

(2) Of the three types of glue logic (glue put into collars; combination glue at chip level; glue put in mini-blocks at chip level), the collaring process preferably only addresses glue put into collars;

(3) Aspect ratio issues are handled during synthesis (not in block collaring); and (4) For BBD, the output of a collared block is layout.

Figure 36:
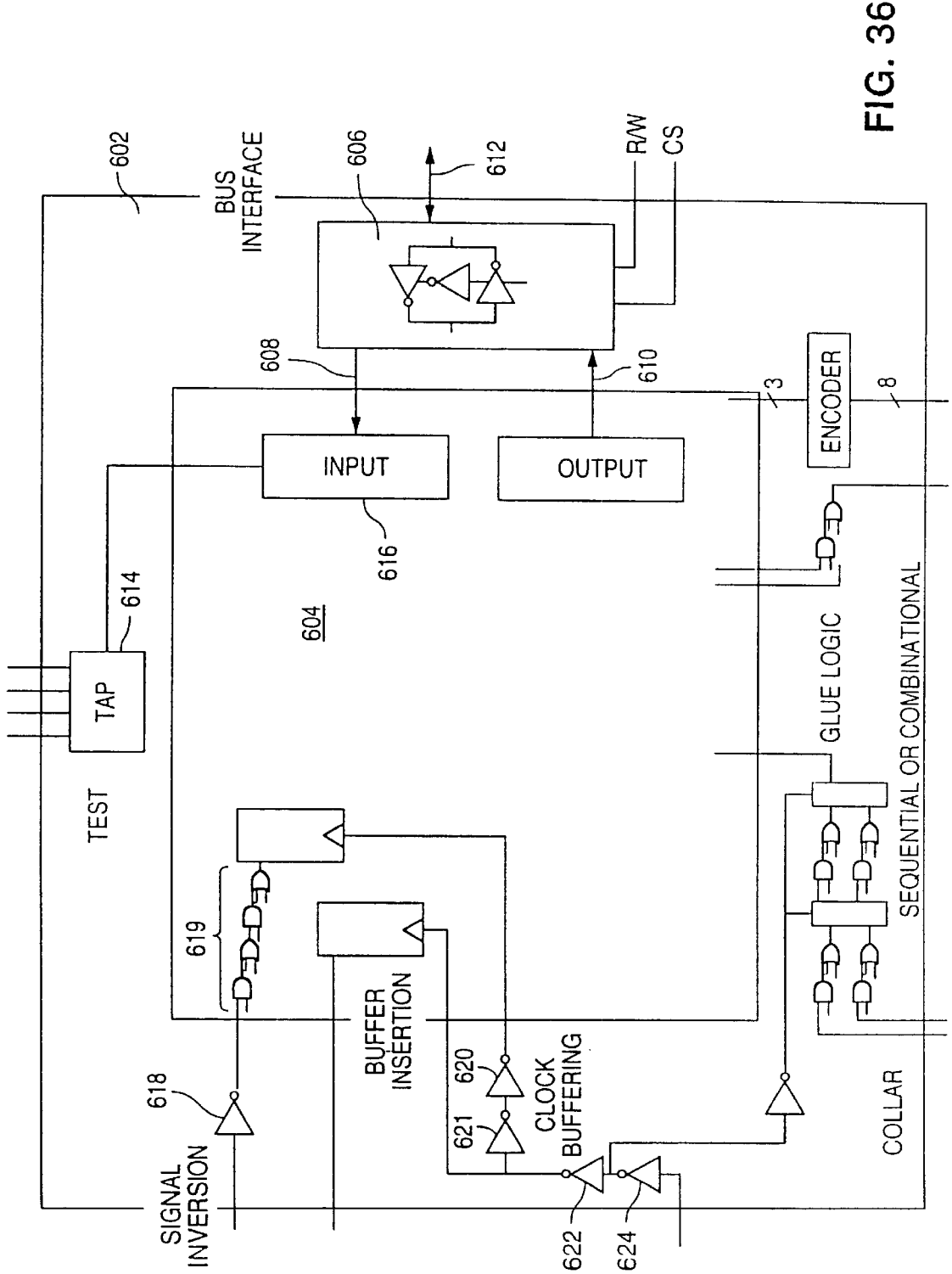
FIG. 36 illustrates the logic view between a collar and a circuit block, in accordance with the present invention.

Referring to FIG. 36, a logic view between a collar 602 and a block 604 is shown, illustrating some exemplary functions of a collar discussed above in accordance with the present invention.

As shown in FIG. 36, the collar 602 includes three portions performing three different functions. The first portion contains components that is connectable to the specific interface around the boundary of the block 604. The second portion contains the input output components in compliance with a standard, and the third portion contains components to convert the outputs from block 604 into the standard.

Specifically, in collar 602, the bus interface 606 combines two one-directional buses 608 and 610 into a bi-directional bus 612. Test Access Port 614 is connected to input 616 to collect the information from and perform testing on block 604. The gate 618 inverts the incoming signal to a format suitable for block 604, as received by gates 619, and gates 620–624 perform clock buffering.

Figure 37:
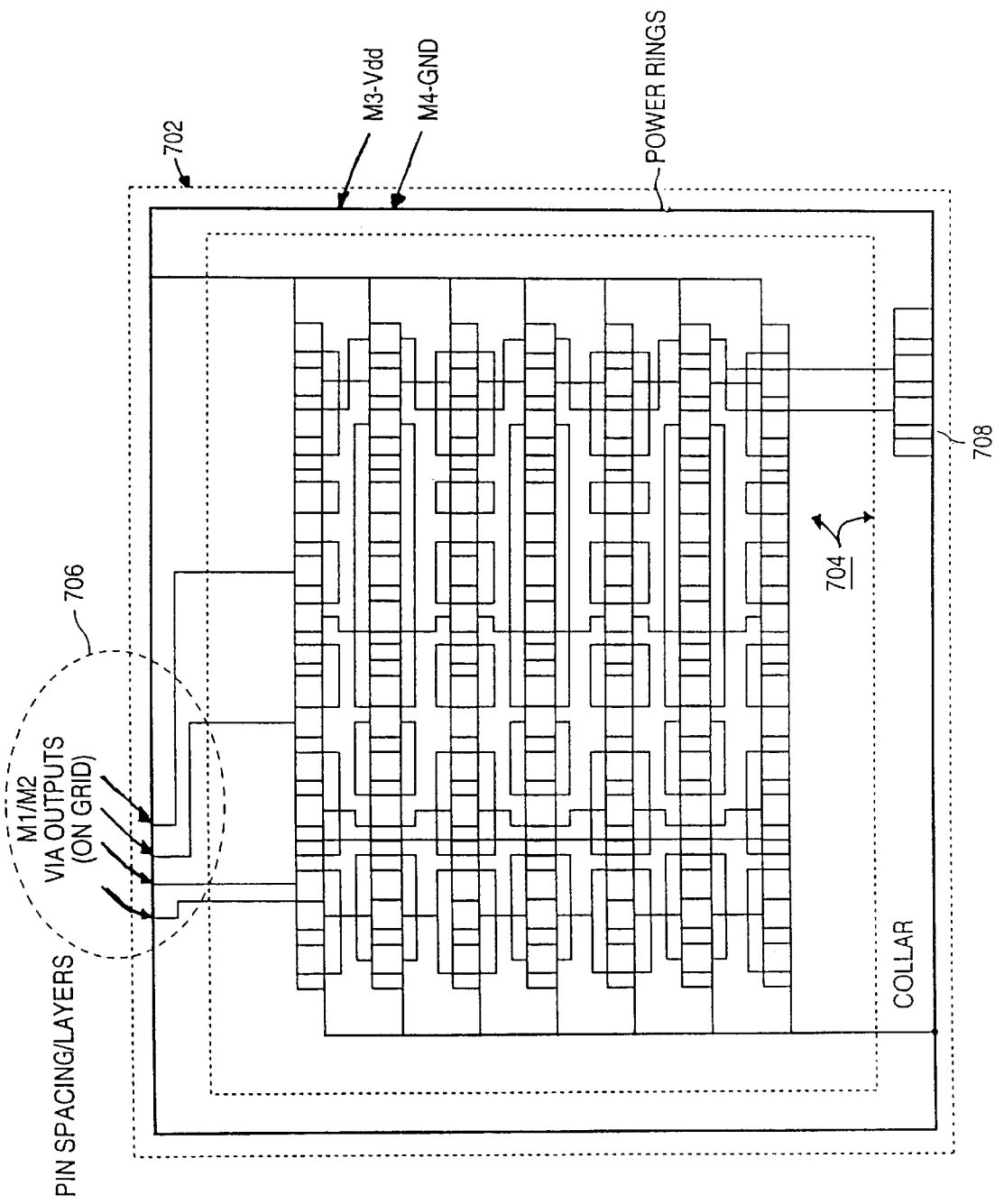
FIG. 37 illustrates the physical view between a collar and a circuit block, in accordance with the present invention.

Referring to FIG. 37, a physical view between a collar 702 and a block 704 is shown, illustrating some exemplary functions of a collar discussed above in accordance with the present invention. In FIG. 37, collar 702 and block 704 both contain multiple metal layers. A power standard exists for deploying the Vdd voltage on metal layer 3 (M3) and GND on metal layer 4 (M4). If block 704 does not comply with the power standard, collar 702 converts the power to comply. The region 706 sets a pin spacing/layer standard. If block 704 does not comply with the pin spacing/layer standard, collar 702 converts it to comply with the pin spacing/layer standard. Collar 702 also contains glue 708 in a hard state.

Referring next to FIG. 39, a system design 800 is shown without using the collaring process of the present invention. As shown in FIG. 38, the system design 800 is composed of four circuit blocks A, B, C, and D. Each arrow line connected to a block represents a constraint to design an interface for that block. Thus, if a system is composed of n circuit blocks (n=4 in this example), the interface for any particular block may need to satisfy up to n-1 sets of constraints. Therefore, the total number of constraints that need to be satisfied for all blocks is O(n2).

Referring to FIG. 40, a system design 900 is shown using the collaring process of the present invention. System design 900 is composed of four circuit blocks A, B, C, and D. Each arrow line connected to a block represents a constraint to design an interface for that block. Using the collaring process of the present invention, each block needs only to satisfy one set of constraints defined by the collaring interface. Thus, if a system is composed of n circuit blocks (n=4 in this example), the total number of constraints that need to be satisfied for all blocks is O(n).

Referring to FIG. 38, a computer system 1000 for performing the steps for collaring and the other inventive BBD processes discussed herein is shown in accordance with the present invention. The computer system 1000 includes a system bus 1001, a processing unit 1002, a memory device 1004, a disk drive interface 1006, a hard disk 1008, a display interface 1010, a display monitor 1012, a serial bus interface 1014, a mouse 1016, and a keyboard 1018.

The hard disk 1008 is coupled to the disk drive interface 1006; the monitor display 1012 is coupled to the display interface 1010; and the mouse 1016 and keyboard 1018 are coupled to the serial bus interface 1014. Coupled to the system bus 1001 are the processing unit 1002, the memory device 1004, the disk drive interface 1006, and the display interface 1010.

Memory device 1004 stores data and programs. Operating together with the disk drive interface 1006, the hard disk 1008 also stores data and programs. However, memory device 1004 has faster access speed than hard disk 1008, while the hard disk 1008 normally has higher capacity than memory device 1004.

Operating together with the display interface 1010, the display monitor 1012 provides visual interfaces between the programs executed and users, and displays the outputs generated by the programs. Operating together with the serial bus interface 1014, the mouse 1016 and keyboard 1018 provide inputs to the computer system 1000.

The processing unit 1002, which may include more than one processor, controls the operations of the computer system 1000 by executing the programs stored in the memory device 1004 and hard disk 1008. The processing unit also controls the transmissions of data and programs between the memory device 1004 and the hard disk 1008.

In the present invention, the programs for performing the steps discussed herein can be stored in memory device 1004 or hard disk 1008, and executed by the processing unit 1002, as will be understood by those skilled in the art to which the present invention pertains.

Bus Identification and Planning

The methodology of the present invention also provides for meeting the performance requirements of the overall design of the system desired by the end user or design team, as defined during front end acceptance (described above). While performance dictates the primary consideration for the design methodology of the present invention, a secondary consideration is reducing the gate count during bus type selection, since bus size can vary between available bus types such that a large, simple bus consumes more logic than a smaller, more complex one.

Figure 41:
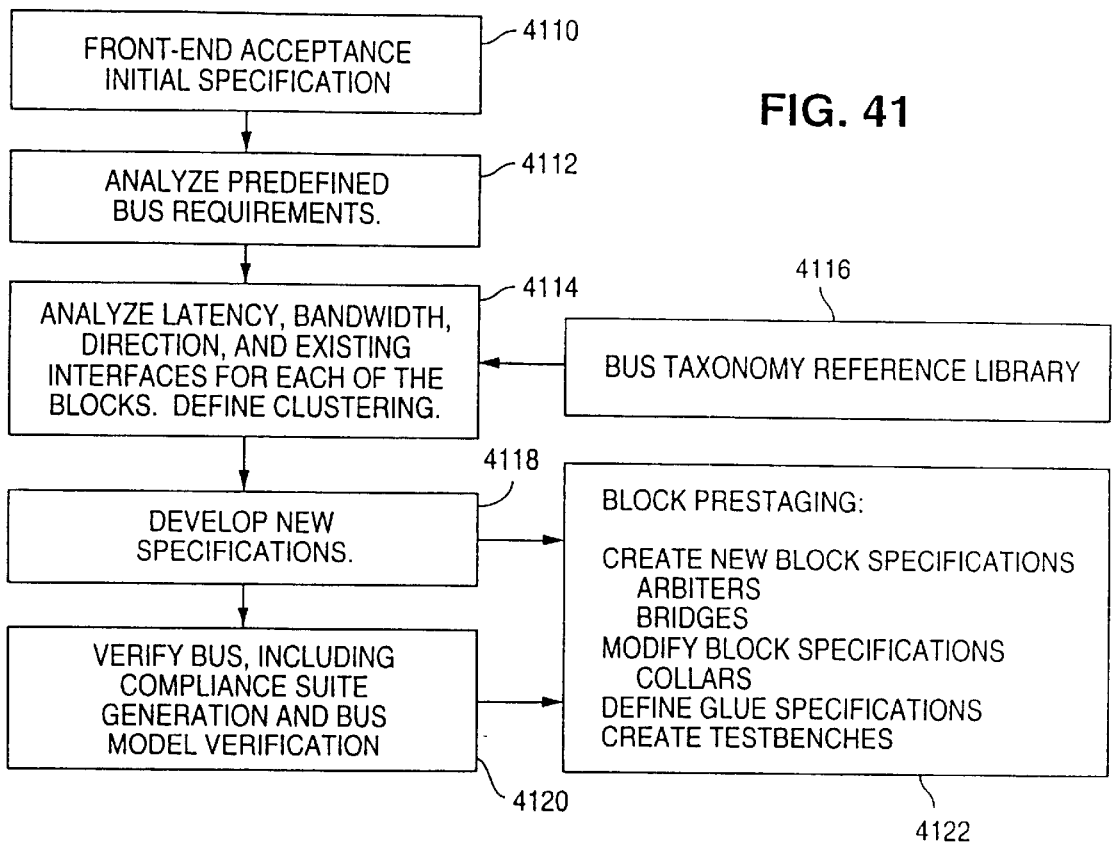
FIG. 41 illustrates a series of steps comprising the bus identification and planning scheme of the present invention.

Turning first to FIG. 41, there is illustrated a series of steps comprising the method of the present invention. At step 4110, Front-End Acceptance of the customer's initial specification is completed. This step has been described in detail above. Next, at step 4112, predefined bus requirements are analyzed, as explained below. At step 4114, bus clustering is planned while variables including latency, bandwidth, direction, and existing interfaces for each of the blocks are analyzed as well, making reference at step 4116 to a bus taxonomy reference library. Next, at step 4118, new bus specifications are developed and at step 4120 the new specifications are verified, including generation of a compliance suite and bus model verification substep. Steps 4118 and 4120 are performed with reference to block prestaging step 4122, wherein new block specifications covering arbiters and bridges are created, block specifications, including collars, are modified, glue specifications are defined and testbenches are created.

We will begin with a discussion of bus planning, including translating front-end specifications into top-level bus specifications. In the available art, system designers start with a high-level functional model or specification of the system being designed. Using system expertise and knowledge of similar systems, the designer constructs a high-level diagram of the bus structure for the design. The designer usually has a rough idea of the traffic on each of the buses, and can estimate how many buses and of what complexity are needed. Buses are designed to meet required system performance while minimizing interface logic and design effort. Designers then use this architecture to create a bus functional model to verify that the design operates as defined in the specification. This traditional process has been difficult to quantify because results vary with the expertise and past experience of the designer. The tasks defined herein apply a formal structure to the process of defining bus structures in chip design. However, these tasks require at least the average level of skill in the relevant bus and system development arts to achieve the best results.

Bus Protocols

Buses provide the preferred communication medium between circuit blocks in a design. A bus, in its simplest form, can be a collection of point-to-point connections that require little logic but many wires. A simple bus transfers data between blocks at every clock cycle. While some blocks might require this type of information transfer, most blocks in a system need information from other blocks only occasionally. And since chip pins are very expensive in large system designs, buses are normally used to reduce the number of chip pins needed and to allow periodic communication between many different blocks in a system with little loss in performance. To do this, designers must add logic to each of the blocks to keep track of data transfer scheduling issues, such as: which block can use the bus wires; what block the data is being sent to; when the sender sends the data; and whether the receiver gets the data. These issues are handled by control signals on the bus and the establishment of a procedure for controlling communication between blocks (the bus protocol).

Two examples of bus protocol are the peripheral bus and the packet network. In a simple peripheral bus protocol, one device controls the bus. All information and data flows through this device, which decides, one case at a time, which block will send or receive data. Although peripheral bus processing requires relatively little logic, it does not use bus wires efficiently, and is not very flexible. Packet network protocols are relatively complex. All the information about which block sent the data and which block must receive it is stored with the data in a packet. Packet protocols let any block send data to any other block at any time. This protocol is very flexible and uses the bus wires efficiently, but each block needs a lot of logic to know when to send packets and decipher the packets it receives. Other bus protocols have different levels of flexibility, utilization, and latency (initial delay in transferring information from one block to another on the bus). A taxonomy for different bus types and their protocols is provided in FIG. 59.

The BBD bus design methodology of the present invention preferably uses defined bus types. The designer is not expected to develop buses from scratch unless they are part of an authored block. Also, the designer preferably logically connects blocks to existing, well-defined bus types rather than creating complex buses. The BBD methodology of the present invention therefore treats buses as signal connections between blocks. The logic for the bus is preferably distributed among the blocks in the design, as is the glue logic for allowing the buses to communicate outside the buses, as described herein above in the glue logic section.

All logical interconnect is treated as either simple or complex buses. Simple forms of interconnection are defined by the bus connection rules, but a specific protocol for complex buses is preferably not defined. The BBD methodology of the present invention preferably supports buses that: have hierarchy; are completely contained within blocks; have wires external to blocks; are completely contained within one level of logical hierarchy; are completely contained within one level of physical hierarchy; are compliant with VSI's on-chip bus (OCB) attributes specification; and are verified with compliance transaction vectors. Also, many of the out-of-scope conditions for BBD are preferably supported in SOC methodologies under the present invention.

Buses are preferably either completely contained within blocks or defined as interconnect at the top hierarchy level. Buses that are defined at the top level are created at that level, allowing bus components to be distributed among and within the blocks.

To define buses for a BBD chip, the following steps are executed, each of which will be described in detail below:

Extract Bus Requirements

Define Buses Based on Clustering

Select Buses

Specify the Bus Design

Reference the Bus Taxonomy

Verify Bus Selection

Block Design Assumptions

In the BBD methodology, when the designer specifies the bus design, he or she must connect to block structures. This task assumes that if a firm or hard block contains a specific bus interface, that interface is soft, as defined above with reference to collars. It also assumes that blocks of all types contain a simplified interface between the bus interface logic and the actual function of the block. This is not an unreasonable assumption for peripheral blocks because many third-party block providers have created their own simple interface so users can add bus interface logic. Blocks that are tailored to multiple designs have separate internal functions and bus interface logic. The internal interface allows one to reuse these blocks with different buses. When a hard block has specific bus interface logic that cannot be separated from its internal function, a more complex bus protocol translation must be added to the block. In either case, the resulting bus interface logic becomes part of the soft collar created during block design.

Extracting Bus Requirements

Data received from the front-end acceptance task includes the bus nets, signal nets, and pins on each of the blocks. There are four categories of signal nets: 1) predefined bus signals, which are block pins and nets comprising a bus, such as a PCI or AMBA bus, required by certain blocks such as processors; 2) bus signals, which are block pins and nets that must be buses, such as Read and Write signals; 3) possible bus signals, which are block pins and nets that might be wires or buses; and 4) signals, which are wire nets and are not dealt with by buses When the designer has determined the signal types, data received from the front-end acceptance task is organized according to these four types of signal nets. For type 1 and 2 nets, the data necessary to create a bus must either be provided by the customer or otherwise available. The required data is further defined in VSI's On-Chip Bus (OCB) Attributes Specification OCB1 1.0, which is incorporated herein by reference.

In additional, each bus that is specified or might be used in the design must have: a complete user's guide sufficient to create the bus; an implementation guide that defines the physical requirements for the bus; a complete set of simulation tools to test and verify the bus; and a list of technical attributes and how the bus compares with the list. Also, to create buses that comply with the VSI's On-Chip Bus Attributes Specification, vendors must provide the documentation and models described below.

User's Guide and Simulation Tools

The user's guide and simulation tools are used in bus design to build and test bus components. The set of simulation tools includes models written in behavioral Verilog and/or VHDL for the following elements: bus master; bus slave; bus support functions (arbiter, address decoder); and standard bus bridges. These are used to verify the bus, as described herein in the section related to bus verification.

Implementation Guide

The implementation guide is used in block design, chip assembly, and subsequent tasks in chip design planning to describe the attributes of the buses. The following information is passed to block design as part of the block specifications: special cells required; physical properties of the cells; bus multiplexing or steering options; memory map; power distribution; and timing guidelines. Timing and maximum loading guidelines are also used in subsequent steps in chip design planning. Timing guidelines, maximum loading, and restrictions on bus layout or wiring are passed to the chip assembly task for use in bus implementation.

Technical Attributes List

The technical attributes must be translated into a form that can be maintained as bus attributes in the bus taxonomy reference library. The bus taxonomy reference and the bus type table are therefore used by the designer to choose the bus types. For predefined bus signals, the designer checks to insure that the required connections can meet the maximum loading and timing guidelines, and that bus layout and wiring restrictions can be met during chip assembly. If not, the design is sent back to the front-end acceptance task to be modified by the customer.

Defining Buses Based on Clustering

To define buses based on clustering, the designer uses the interconnect bandwidths and latencies received at front-end acceptance. This step determines, for each of the clusters and blocks within the clusters, the latency, bandwidth, existing bus interface types, and direction of data flow. This information is then passed to the next step, selecting buses.

A bus hierarchy is defined by clustering the highest bandwidth and lowest latency bus interconnect. Possible bus signals that are point-to-point nets can be eliminated from this and subsequent bus analysis and design, since these signals are provided directly to the chip assembly task for routing.

Create the Communication Manager Behavioral Model

The behavioral model of the chip as verified contains behavioral models and an abstract model of the interconnect between blocks. Typically, this interconnect is a software mechanism that transfers data among the test bench and blocks. Ideally, it is a form of communication manager, possibly a scheduler, to which all the blocks are connected. At the other extreme, the interconnect may also be a directly connected point-to-point interface in the behavioral model.

The communication manager or, as referred to hereafter, the scheduler, is usually at the top level of the simulation module. Pseudocode for such a scheduler might look like this:

While queue is not empty Do;
Get next transaction from queue;
Get target block from transaction;
Call Target Block (transaction);
End;

In this pseudocode example, each block does the following:
Target Block (transaction);
Do block's function;
Add new transactions to the queue;
End;

At this code level, neither timing or bus size are defined. All communication is done in transactions or by transferring information packets of any size. The transactions might include possible bus signals and non-bus wires so that all communication between blocks goes through the scheduler.

Alternatively, the designer may modify the block pseudocode to send and read the non-bus signals asynchronously. In this case, each block does the following:
Target Block (transaction);
Get non-bus signal values from top level;
Do block's function;
Add new transactions to the queue;
Apply new non-bus signal values to top level;
End It should be noted that, for the sake of simplicity, these examples do not include non-bus signals. However, the designer can make similar adjustments to the examples that follow to include non-bus signals.

A pattern set is a collection of vectors in a test bench that force one block to communicate with another block. The test bench must include enough pattern sets to execute the functionality of the entire chip. The designer must assign target performance levels to each of the pattern sets at a coarse level. For example, if there is frame data for an MPEG decoder in one pattern set, the designer must be able to define how long the target hardware takes to process the frames in that set. If the designer knows that the output rate must be about 30 frames per second, the processing rate must exceed that number. These performance targets are used in the subsequent stages of this process to define the required bus bandwidths.

The blocks selected for the chip must have some cycle-approximate performance specifications. If the behavioral models do not already have these specifications, they should be incorporated into the model in this step.

Figure 42:
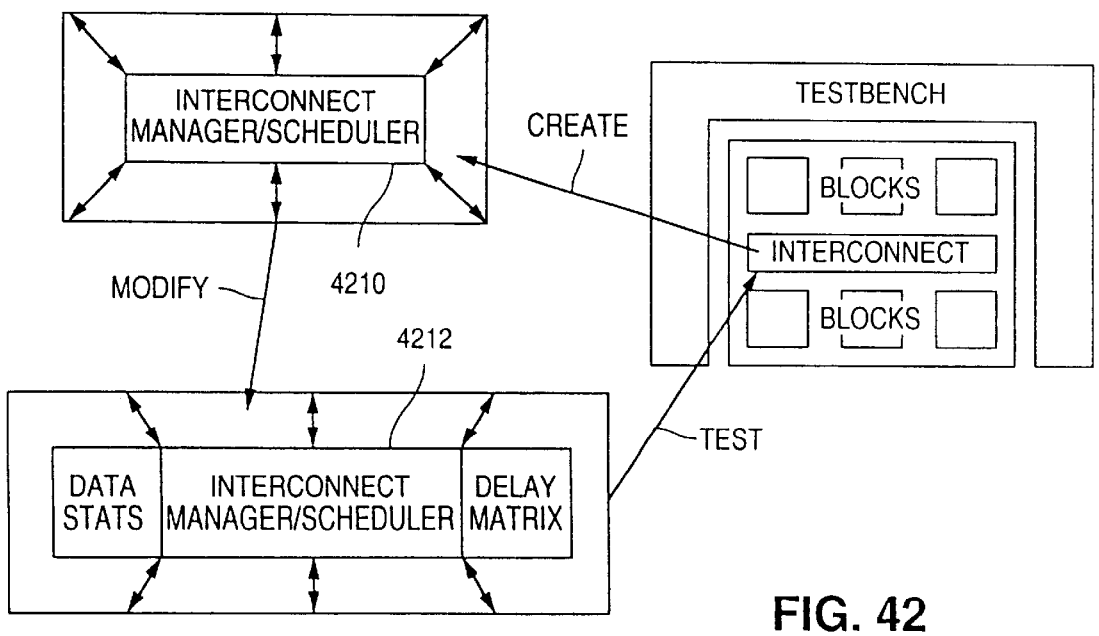
FIG. 42 illustrates the internal structure of an interconnection section of a behavioral model constructed according to method of the present invention.

FIG. 42 illustrates the internal structure of the interconnect section of the behavioral model. First, the test bench and requirements are received. Next, the preliminary scheduler is created. Interconnect manager/scheduler 4210 transfers information between the blocks in the design and schedules their execution. Interconnect 4210 is then modified, and modified interconnect manager 4212 includes statistics gathering and a delay matrix that is added as the model is adjusted to cycle-approximate operation. Finally, the test bench is again utilized for testing and design iteration. The details of these modifications are described in the sections that follow.

Modify the Model to Account for Latency

Some designs have no specific latency requirement. Other designs, such as hubs and switches, are sensitive to data latency (the length of time it takes the first unit of data to go from the sender to the receiver). Most network devices, especially asynchronous transfer mode (ATM) devices, have specific latency requirements for information transfer, which translates into tight latency requirements for the components within the networks and for the buses. Once the designer knows the latency requirements for the design, he or she adjusts the interconnect model as follows. First two matrixes are created for each pattern set that specify 1) the amount of data to be transferred between blocks, and 2) the number of transactions executed. Second, a matrix is created for each pattern set that specifies cycle count approximations. This second step is not necessary for designs with no latency requirements.

Data Transfer Matrix

To create a data transfer matrix, the designer first adds the amount of data that is being transferred from one block to another to the communications manager model. Next, using a spreadsheet tool, the designer accumulate this data in a table for each pattern set.

For example, the table for a chip with three blocks and a test bench would be a 4×4 from/to table with the sum of all data transferred, in bytes, in each entry in the table. The diagonal would be all zeros. It should be noted that a more practical model takes into consideration the buses going into and out of the chip, so the test bench would probably have more than one entry on each axis.

An example of a data transfer matrix is illustrated in the table of FIG. 43. The design behind this matrix has three blocks and three ports for the test bench: an interface to external memory, a PCI interface, and a parallel I/O interface. As shown in the table, the data transferred from Block 1 to Block 2 is 10,000 bytes, and the data transferred from Block 2 to Block 1 is 8,000 bytes.

Thus, the first step in creating a data transfer matrix is to create a table, with a count of all transactions, as illustrated in FIG. 44, showing transactions for exemplary Pattern Set X.

To create the tables illustrated in FIGS. 43 and 44, the designer may modify the scheduler pseudocode as follows:

While queue is not empty Do;
Get next transaction from queue;
Get sender block from transactions;
Get target block from transaction;
Get Transaction byte count;
Transactions Matrix (sender,target)=Transactions Matrix (sender,target)+1;
Transactions Matrix (sender,target)=Transactions Matrix (sender,target)+Transaction byte count;
Call Target Block (transaction);
End;

Because non-bus block-to-block wires have some delay (typically, at least one clock cycle), these are preferably added as separate transactions in the timing queue, in addition to the bus transactions.

Latency Matrix

Since the clock cycle time for each block has already been defined at front-end acceptance, the designer can then translate raw performance into cycle counts as follows:

1. To reflect the cycle-approximate operation defined in their specifications, the designer adds the estimated clock cycles for each block to its existing behavioral model. This step is preferably executed before sending the block to the block design task, but after verification.

2. The designer integrates the blocks back into the chip model. The chip model will then have cycle-approximate blocks with no time defined in the interconnect.

3. The designer uses a spreadsheet to set up a table similar to that illustrated in FIGS. 43 and 44. Instead of the number of bytes transferred, the designer specifies the number of cycles each transfer takes, from the time the data is available to the time the data arrives at the next block or test bench (latency).

4. The designer modifies the interconnect model to use the performance values illustrated in the new table.

FIG. 45 illustrates an exemplary latency matrix. A pseudo code example of these modifications is shown below:

While queue is not empty Do;
Get next transaction from queue;
Get time from transaction;
Get target block from transaction;
Call Target Block (transaction, time);
End;
Where each block does the following:
Target Block (transaction,time);
Do block's function;
Set Transaction times to time+delay+Latency (this block, target);
Sort new transactions to the queue;
End It should be noted that the entries that read "0" in FIG. 44 indicate that no data is transferred and as such are not applicable to the latency matrix.

5. The designer modifies the test bench to include the chip latency requirements with estimated interconnect cycle count delays using knowledge of the design data flow.

6. The designer simulates the design to see if it meets the cycle requirements.

7. The designer modifies the latency matrix, and repeats the verification process until the cycle requirements of the chip are met.

To create a table with the maximum cycle counts available for each type of bus transfer, the designer should use large cycle counts to begin with and reduce them until the specifications are met, since tighter latency requirements translate into more gate-intensive bus interconnect schemes.

Determine the Cluster Measure

Next, to reflect the natural clustering of the data, the designer reorganizes the data transfer matrix by moving the largest counts closest to the center diagonal. There are a number of ways to perform this process; the preferred method is referred to herein as pivoting. The purpose of pivoting is to cluster blocks with the highest transfer rates to minimize the number of pins required. The designer may set up a spreadsheet to do the calculations automatically.

To measure how effective clustering is, each site in the data transfer matrix must be accurately weighted. This example uses a distance matrix, illustrated in FIG. 46, to weight the sites. In the table of FIG. 46, each cell contains the square of the distance that cell is from the diagonal. Other measures to weight the data transfer matrix sites may be used, however, the square of the distance is preferred since it has been shown, in placement algorithms, to converge quickly while allowing some mobility of elements in the system, which higher-order measures restrict.

Next, the designer multiplies each cell in the data transfer matrix by its corresponding cell in the distance matrix and adds all the values for all the cells together. The result is the cluster measure. The cluster measure of the matrix in the table of FIG. 43 is 428,200. The lower the cluster measure, the more effective the bus clustering.

Pivot Blocks

To try to get a lower cluster measure, the designer should pivot the data transfer matrix by swapping rows one by one and recalculating the cluster measure after every swap to see if the cluster measure improves. One can swap rows by performing a sort, where the sites are elements in a list to be sorted, as illustrated in pseudocode below:

```
Get Current cluster measure of matrix;
Do for Current site=site 1 to n-1 in the matrix;
Do for Next site=Current site+1 to n in the matrix;
    Swap Next site with Current site;
    Get Next cluster measure of matrix;
    If Next cluster measure>Current cluster measure
        Then Swap Next site with Current site back to
            original location.
        Else
            Current cluster measure=Next cluster measure;
End
End;
```

This sort is similar to a quadratic placement algorithm, although the interconnect is bandwidth instead of connections. The designer can use other methods that provide similar results instead of this one.

Figures 47, 48, 49, 50:
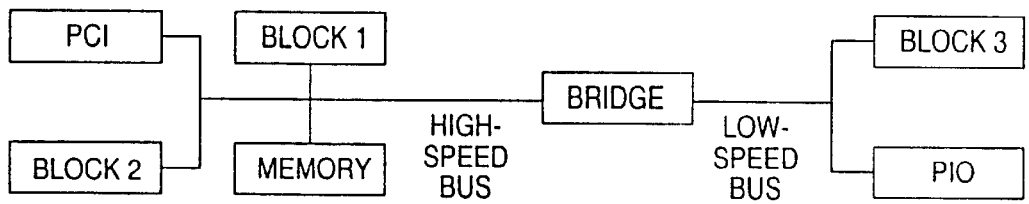

Pivoting as illustrated above preferably produces, for example, the matrix of FIG. 47, with an improved cluster measure of 117,000. It should be noted that, in this idealized example, components do not create information. Components write what they read, so the column and row totals match, except for block 3 and the PIO. This may not be the case for use in the field.

The designer can then use a table like that illustrated in FIG. 47 to define the bus clusters. This example shows a high rate of data transfer between block 1, block 2, the PCI, and memory. These components must therefore be on a high-speed bus. Because there is a low data transfer rate between block 3 and the PIO, these design elements can be on a low-speed bus.

The PIO is output-only, but all the other components are bidirectional. Because the components inside and outside the clusters must communicate, the designer must create a bridge between the two buses, as illustrated in FIG. 48.

Defining Buses Based on Clustering

Initial clustering preferably must include all predefined bus signal nets. The designer can pivot within the clusters to show the natural internal subclusters, but, unless more than one bus type is defined for these signals, they should be treated as one cluster in the next task.

Where a processor's system and peripheral buses are defined, the clusters are broken into a system bus and a peripheral bus or buses, based on the clustering information. For example if the bus matrix in the table of FIG. 47 is composed of predefined bus signal nets, the initial clustering contains the whole matrix. If more than one bus is defined, the blocks that need to be on a high-speed bus form one bus and the rest form another bus. This partition is then passed to the next task.

If there are no predefined bus connections, buses are defined in a manner based upon the cluster information. The pivoted matrix usually has groups of adjacent blocks with relatively high levels of communication between them compared to other adjacent blocks. The table in FIG. 49 illustrates this kind of clustering, similar to the previous pivoted matrix. FIG. 49 is based upon a different example from those previously shown, to make the clustering process clearer. It should be noted that "##" represents a large number.

In this example, blocks A, B, and C form one independent bus cluster because there is a high rate of communication among the three blocks and there is no communication between these blocks and blocks D through H. Blocks D, E, and F form another cluster because there is a high rate of communication between all three. Also, blocks D, E, and F could form two separate buses: a point-to-point bus between D and E, and another between E and F. Blocks G and H form a third cluster. There are lower-bandwidth connections between the EF pair and the GH pair. Depending on the amount of data transfer, E, F, G, and H might be on one bus or on-two separate EF and GH buses with a bidirectional bridge between them for lower-level communication.

To choose from a number of different clustering options, the following guidelines are followed:

1. Identify the cut points between blocks to determine possible clusters. A cut point a high communication area from a relatively low communication area. A cut between C and D in the matrix in FIG. 49 produces the diagram illustrated in FIG. 50. To determine the amount of communication between the ABC and DEFGH groups, the cells in the lower left and upper right groups are summed. If this sum is 0, which is the case in this example, the two groups have no communication between them. These groups form completely separate buses. Cut the pivoted matrix where the resulting communication across the cut is 0.

2. Within each of the identified groups, find the significant cuts. The communication between the resulting groups should be much less than within each group. In FIG. 50, one cut appears in the D–H group and no cuts appear in the A–C group, as shown in FIG. 51. The data transfer rate between the GH groups is 22, but the data transfer rate within the other groups is a very large number (##). These clusters can form two buses with a bridge between them.

3. If the communication between clusters or within clusters does not involve all blocks, you might need to optimize the clustering. It is only important to optimize if the latency matrix has very different requirements for communication between certain blocks. For example, FIG. 51 shows that the GH cluster does not communicate with DE. DE and EF communicate but D and F do not. If the latency requirements for DE are very tight, the designer should therefore split out the DE communication from the rest of the bus. From FIG. 52, we can see the resulting matrix. This example splits E into E and E' so it appears to be two separate blocks, because separate interfaces will be created on E for the two buses. If a block has two or more bus interfaces, this technique may be used to make effective use of the separate interfaces.

If this technique is used on the original example of FIG. 43, the clusters illustrated in FIG. 53 are created, comprising two buses with a bridge between them. One bus transfers a significant amount of data while the other transfers very little. Another cut between Block 3 and PIO would result in even lower communication between the clusters. However, this is not a significant cut because it leaves only one block in a cluster, so it is not made.

4. When all the cuts are made, the resulting cluster information is passed on to the next task.

This clustering technique requires system knowledge to generate a bus structure for the chip. The designer must consider data timing and implementation details such as existing block bus interfaces, additional processor requirements, and the number of masters on the bus. These factors might suggest that deviating from the structure obtained using this clustering method creates a bus structure with better performance or lower gate count than the one obtained by purely following the procedure. If so, the designer might want to repeat this task to modify the clustering results.

Selecting Buses

Once the designer has defined buses using the clustering method, bus types and performance hierarchy must be selected. Bus hierarchy is the order of buses that are interconnected from the highest-performance bus down to the lowest. For example, if a design contains a high-speed system bus and two lower-speed peripheral buses, the hierarchy is from the system bus to the two peripheral buses.

The bus attributes and sizes from the bus taxonomy reference library are preferably used to define the bus type for each bus. The library lists a set of bus attributes for each of the available bus types. To select the appropriate bus, the designer analyzes each block in the cluster for existing bus interfaces. If there are none or few, the bus type in the bus taxonomy reference that has the most similar attributes is selected. The result of this selection process is a defined set of buses and hierarchy that is used in the next task, specifying the bus design.

Buses should be selected as follows, checking the parameters in the bus taxonomy reference library and the interfaces of the blocks in the design:

1. Eliminate buses that do not meet the cluster's bandwidth and latency requirements;
2. If the bus is already defined, use that bus, but otherwise;
3. If a processor is present, use the system bus to which it already connects, otherwise;
4. Select a bus to which most blocks already connect;
5. Use a bus that can handle the endian-ness (a big-endian has the 0 bit on the left end of the data unit; a little-endian's is on the right) of most blocks to which it is connected;
6. If the loading on the bus is excessive, use multiple buses;
7. Separate lower bandwidth devices onto a peripheral bus or buses;
8. Use a peripheral bus with an existing bridge to the selected system bus;
9. If there is more than one choice after the selection process is complete, choose the bus type that best meets the OCB attributes list, since it will have the most tool and model support.

Calculate the Bus Size

The bus latency table are used as the starting point for this step. Once specific bus configurations are identified using clustering, the information must be translated into a form usable to determine the size of the buses. In the matrix from the previous task's example, the first four entries are clustered in one group and the last two are clustered into a second group.

Calculating the bus sizes requires determining the bandwidth needed for the amount of data being transferred and calculating bandwidth, substituting different bus width values until the target bandwidth is approached as closely as possible.

Determine the Target Bandwidth

Figures 55, 56:
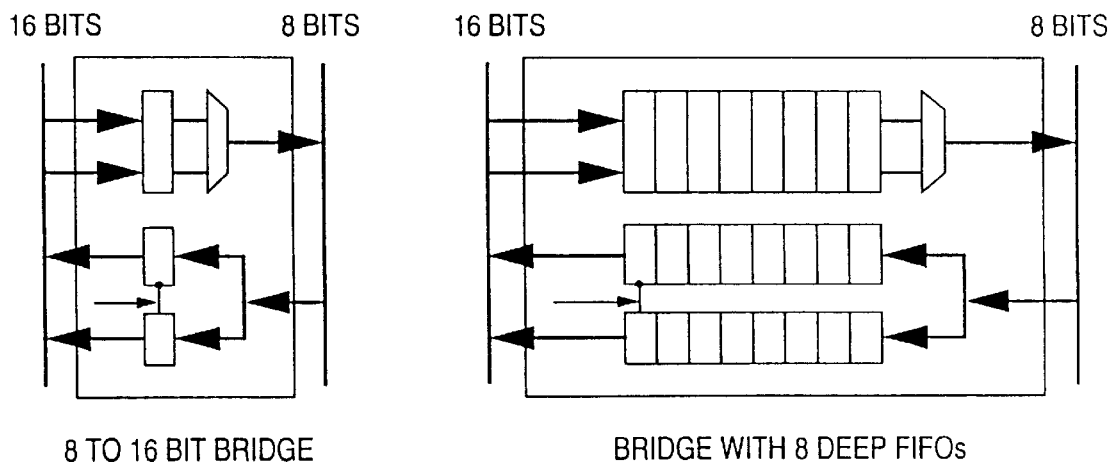

Determining the target bandwidth needed for the buses in a pattern set requires the following steps:

1. Add all the transactions that occur in each cluster in the pivoted data transfer matrix. Continuing with the same example, there are 62,600 in the large cluster, 100 in the small cluster, and 1,200 between the clusters. The matrix in FIG. 55 is therefore created by adding the entries in each of the four groups of FIG. 54.

2. Determine the time this pattern set is expected to take. The front-end acceptance task provides this information. For this example, the pattern set must be transferred in one millisecond, that is, the fast cluster must transfer 63,800 bytes of data—1,200 bytes to the bridge and 62,600 bytes internal to the bus—in 1 ms. Bandwidth is defined as the amount of data, in bits, that can be transferred in one second. In this example, we can transfer 510 Kbits in 1 ms, and the bandwidth is approximately 510 MHz.

Calculate the Bus Width

Bandwidth is comprised of the number of wires in the bus (bus width) times the clock frequency at which the data is being transferred.

The calculation is as follows:

(util/clock_cycle)×bus_width=bandwidth where:

util
is the minimum bus utilization percentage for the bus type selected (see FIG. 59);
clock_cycle is the clock cycle for the design; and
bus_width is the number of wires in the bus. This value must be a power of 2;

To calculate, we start at $2^1$ for the bus_width and keep substituting higher values ($2^2$, $2^3$, ...) until the resulting bandwidth value is greater than the target bandwidth. For example, if the clock cycle is 20 ns and the bus utilization is 25%, the number of wires rounded to the nearest power of 2 is 64 bits, where (25%/20 ns)*26=800 MHz>510 MHz.

In this example, if one selected a type 4 or 5 bus from the table in FIG. 59 one would need at least 64 bits in the bus for the fast cluster. Similarly, a 20 ns cycle time would need only 8 bits for the slower cluster.

The latency information is partially a function of the utilization, since increased utilization of a bus increases latency. To keep the example simple, such complexity is not included; it is partially accounted for in the utilization numbers. In general, however, if one uses the minimum bus utilization numbers for the bandwidth calculation, the latency tends toward the minimum as well. To account for this effect, the designer should select the worst-case (smallest) latency requirement from the cluster.

The designer can therefore derive the latency of the entire transaction from the latency matrix used in simulation, but the table of FIG. 59 shows the bus latency data and transfer values as separate numbers. FIG. 59 shows a maximum transfer latency of 10 for a type 4 bus. The minimum data latency is closer to the number of cycles required for the data alone. The designer therefore needs to calculate what the net transfer latency is by subtracting the data transfer time from the numbers in the latency matrix, illustrated below:

data_transfer$_{time=min}$_cycles/num_words*avg_trans where:

min_cycles is the minimum number of data latency cycles for this bus type;

num_words is the number of words in the bus; and avg_trans is the average transaction size: the number of bytes of data from the data transfer matrix (FIG. 43) divided by the number of transactions in the transaction matrix (FIG. 44).

To compare the latency from the table, the designer must create a new latency matrix that uses the latency values from the simulation matrix minus the transaction's data latency. In the example above this table would be as illustrated in FIG.

56. Each element in this matrix is calculated as follows: [Resulting Latency(x,y)—Min Bus Latency data (type)]* (Data Transfer(x,y)/[Transaction(x,y)*bus size])

The smallest number in the system bus cluster is 25. This value must be larger than the largest transfer latency for the type of bus needed because of bandwidth. That number is 10 in the table of FIG. 59 for transfer latency for bus type 4, so the designer can choose bus type 4 or better for the fast cluster.

Create the Bus Hierarchy

Once the designer has identified the buses and their loads, the bus performance hierarchy must be identified, comprising determining which are high-speed buses, which are low-speed buses, and what bridges and arbiters are required. If two buses are connected in the reduced bus matrix (their from/to cells have non-zero values), then we create a bridge between them. Using the example in FIG. 54, we create the following bus model from the pivoted data matrix and the reduced bus matrix:

A system bus (type 4 or 5) of 64 bits connected to:
  Block 1 (RNV)
  Block 2 (RNV)
  Memory (RNV)
  PCI (RNV)
A bridge (RNV) to a peripheral bus (type 3 or better) of 8 bits connected to:
  Block 3 (R/W)
  PIO (Write only)
    Note: The PIO is write-only because there is no data coming from it. The bridge is read/write because both diagonals between bus 1 and 2 are non-zero.

This map is then passed to the next task, specifying the bus design.

Specify the Bus Design

To specify the bus design, the designer expands the created buses into a set of interface specifications for the original blocks, a set of new blocks, such as bridges and arbiters, and a set of glue logic. The original and new block specifications are passed to the block design task. The glue logic, as mini-blocks, are transferred through block design to the chip assembly task. If a bus meets the OCB attributes specification, it has models for master and slave devices, as well as other bus objects such as arbiters and bridges. Using the map defined selecting buses, the designer then creates the detailed bus structure.

Detailed Bus Structure

To create the detailed bus structure, the designer should then:

1. Optimize the bus by eliminating all buses with a single load and a bridge. The load should be placed on the other side of the bridge, since it is slower and more costly in terms of gates to translate between the protocol of the system bus and the peripheral bus for only one load. While the designer may not be able to entirely eliminate the bridge logic, tristate interface can be eliminated since the bus reduces to a point-to-point communication. Also, 8 bits can be turned into 16 without much penalty, since the two ends can be placed together.

2. Assign bus master and slaves to the various loads. The designer should start with the bridge. It is a master on the slower side and a slave on the faster side. All devices on peripheral buses are slave devices. On the system bus, master and slave are defined by which devices need to control the bus. Knowledge of the design can help with this decision. If a processor is connected to the bus, its interface is a master. Otherwise, if there are no obvious masters, the external interface, such as the PCI, is a master. The memory interface is almost always a slave interface. To determine which block requires a master interface, the designer should refer to the interconnect requirements for the bus.

3. If a processor or other block is connected to a bus that also has a memory interface, and the block specifically requires it, the designer should include one or more direct memory access (DMA) devices on the bus. These devices act as bus masters.

4. Finally, if two or more devices on a bus are bus masters, add an arbiter.

Detailed Bus Design

When the bus structure has been defined, the block bus interface is checked. If blocks already have bus interfaces, the interfaces must be in a soft, firm, or parameterized form for tailoring to the bus. If this is the case, the existing bus interface logic should be used, otherwise the models provided with the bus are acceptable. If there is a different bus interface on the blocks, it should be eliminated if possible.

The bus logic should be modified to interface with the bus as follows:

1. Assign address spaces for each of the interfaces. The address space is usually designed to match the upper bits of the transaction address to determine if this block is being addressed. Also, one should ensure that each block has sufficient address space for the internal storage or operational codes used in the block.

2. Eliminate write or read buffers if only one function is used. Most existing bus interfaces are designed to both read and write. The designer can significantly reduce the logic if only one of these functions is needed. For example, if the bus takes more than one clock cycle, read and write data are usually buffered separately. If only one function is needed, the designer can eliminate half the register bits.

3. Expand or contract the design to meet the defined bus size. Most bus interfaces are designed for the standard 32- or 64-bit bus, but other alternatives are available. If the designer needs a non-standard bus interface, he or she must modify the logic to eliminate or add registers and signal lines. Similarly, the address is usually the same size as the data, but this might not be the case. For busses that interleave the address and data onto the same bus signals, a mismatch in data and address size only eliminates the upper-order address decode or data register logic, not the signals.

4. Add buffers to the bridges if necessary. Such modifications should be made for both sides of the bridge as in Step 3.

5. Modify the bridge size mapping between the buses. For a read/write interface, bridges need at least one register for each function, equal to the larger of the buses on both sides. In addition to the data buffer for each function, bursts of data can be transferred more efficiently if the data is accepted by the bridge before being transferred to the next bus, using, for example, the bridge illustrated in FIG. 57. This might require a FIFO for each function to store a burst and forward it to the next bus, as illustrated in the bridge of FIG. 58.

6. Define the priority of the bus masters and the type of arbitration. If there is more than one master on a bus, there must be some kind of arbitration between the masters. There are many types of arbitration, ranging from a strict ordered priority to round-robin arbitration. If the masters both handle the same amount of data with a similar number of transactions and required latency, they should have equal priority. On the other hand, if there is a clear ranking in the importance of the masters, with an equivalent order in the amount of data, transactions, and latency, arbitration should be serialized, putting the most critical master first.

7. Create and connect the arbiter based on the definitions in Step 5. Arbitration schemes can be distributed or centralized, depending on the bus. Arbitration logic should be as distributed as possible, to enabled it to be distributed into the blocks with the glue logic.

8. Map the bus to the interface logic as required by the device's endian-ness. Most buses are little-endian, but some devices are big-endian. When there is a mismatch between the end types, the designer must decide how to swap the bytes of data from the bus. This decision is generally context-dependent. If all transactions to and from the bus are of the same type of data, the designer may use fixed byte-swapping, otherwise the bus masters must do the swapping.

9. Tailor the DMA devices to the bus. Direct memory access devices are controllers that transfer data from one block to another. They should be modified to the size of the address bus as one would any other device.

10. Add testability ports and interfaces if necessary. The lowest level of test is the ability to test the bus itself. The standard chip test logic can also use the bus. These test features might require additional signals to differentiate test from the normal operation mode.

11. Add initialization parameters if necessary. Some buses such as PCI have configuration registers. These registers might be hardcoded for configurations that do not change.

12. Add optional bus capabilities if required by the devices on the bus. Some buses have advanced capabilities such as threads, split transactions, and error retry, which may not need to be implemented if the devices connected to the bus do not need them. Some of the additional capabilities, such as DMA devices, non-contiguous burst transfers, and error recovery control, might require more signals than are defined in the standard bus. These signals should be added to the bus if necessary.

When these modifications are complete, the bus interface logic is connected to the resulting interface of the block.

Bus Taxonomy Reference

The bus taxonomy reference is a library that lists the bus attributes and their relationship to bandwidth, latency, and data direction for the buses that are available in a cell library. The taxonomy library is a relatively fixed collection of information. The person in charge of this library might need to update the bus attributes when a new bus becomes available.

Bus Type Reference

Bus types can be categorized by latency and bandwidth utilization. Pure bandwidth is a function of the number of wires in the bus times the clock frequency at which the data is being transferred, but bandwidth utilization is a function of architecture.

FIG. 59 shows a list of specific bus attributes from lowest bandwidth utilization and longest latency to the highest bandwidth utilization and shortest latency. Typically the cost in logic and wires is smallest with the first and largest with the last. Each bus in the library must have a bus type assigned from this table. Each bus type can have a range of latency in cycles and bus bandwidth in utilization percentage. Each bus might have a different clock cycle time and size, so the utilization percentage is the effective throughput over the product of the cycle time times the size of the bus. A bus utilization value of 100% means that every cycle is fully utilized. The Data Latency column gives the number of cycles it takes for a bus to transfer a word of data. The Transfer Latency column is the average number of cycles it takes to begin a bus transaction. The table in FIG. 59 gives a rough estimate of the bus utilization and latency values. A designer's group can specify values based on experience and the type of its designs.

Bus Taxonomy Reference

Over a number of projects, a design group accumulates a library of buses. Each bus contains a set of information that includes the type of bus from the reference library noted in FIG. 41, and the list of bus attributes from the VSI OCB Attributes Specification and the Bus Taxonomy Reference found in "Block-Based Design Methodology Documentation" Version 1.2, May 21, 1999 (the entirety of which is incorporated herein by reference), at section B.2, pages B-5 to B-10. This information should be used as described for determining which bus to use.

Design for Test

As described in the background, ease of testing is among the most important attributes of an SOC design. Thus, design for test ("DFT") has become the standard. For a given customer specification, the DFT knowledge base derived using the method and system of the present invention can be searched and extracted to present the customer with a Question & Answer (Q&A) form. Through this device, the test objectives can be negotiated and test issues resolved in the Statement Of Work (SOW) negotiated during front end acceptance.

The test planning phase is followed by test budgeting, test scheduling and test management, resulting in a set of specifications and a test plan to further break test development into separate, independent subtasks for a clearly defined goal with a set of known resources and procedures.

Each test block is concurrently developed according to a prescribed recipe, which can be tested with the best available techniques.

Once the test blocks are readied for test integration, they can be mapped to the unconstrained SOC boundary where no I/O restriction is applied, thereby allowing each layer to become a "test-readied" template for the unconstrained SOC to be transformed into a design block. The unconstrained SOC is then constrained to a specific I/O packaging with additional I/O level test. This enables a test scheduling process to take place and fulfill the SOC level test objective.

Making a DFT Test Plan

After acquisition of the customer's plan during FEA, the inventive test plan development scheme of the present invention preferably begins with an assessment of each block to see if it is test-mergeable (whether the test may be performed simultaneously on a plurality of blocks). Next, the designer determines how "testable" each of the non-mergeable blocks is. Third, a chip-level test specification including test types such as JTAG boundary scan, DC tests, and PLL tests are developed. Finally, test fault coverages are specified for test-mergeable blocks at the overall chip level, for non-mergeable blocks at the block level, and for interconnect. The results of this four-pronged initial analysis provide the DFT objectives for the overall system design of the present invention.

Using DFT Rules

DFT architectural rules, which are specific, test-related constraints, are used to maintain consistent test development flow and cohesive test data management. These rules guide the application of test attributes to each non-mergeable block for placement in a virtual socket at the top level, guide the execution of trade-offs to get the simplest and most adaptive test strategy, shape the creation of a top-level test specification for the design, and enable the derivation of a test plan to detail the test implementation process.

DFT Glossary

The listed DFT terms, as used and claimed herein, have the following definitions:

| | |
|---|---|
| Authorization | A conversion process that makes it possible to integrate a pre-designed block. |
| BIST | Built-in self test |
| BSR | Boundary scan register(s) |
| CAP | Chip access port |
| CTAP | Core test access port |
| DAP | Design access port |
| DFT | Design for test |
| Fault coverage | Stuck-at fault coverage of a test |
| ICTAP | Integrated circuit test access port |
| IP | Intellectual property |
| JTAG | Joint Test Action Group (iEEE-i 149.1) |
| Legacy block | A predesigned gate-level block that cannot be modified or reverse-engineered for reusability without risking unknown consequences |
| Mergeable | The test requirements for a mergeable component can be combined with those of one or more other components, so they can be tested as a unit, saving test time and costs |
| MISIR | Multiple input signature generator |
| Mux | Multiplexer |
| Non-mergeable | Cannot be merged with other blocks for parallel testing |
| PRPG | Pseudo-random pattern generator |
| SAP | Socket access port |
| Socketization | An adaptation process to specify and add a test collar to a pre-designed block that permits testing within a design |
| TAP | Test access port |
| TBA | Test bus architecture |
| Test collar | A collection of test ports and logic surrounding a predesigned block that provide test access and control |
| Test-mergeable | A block that can be merged with at least one other block, the two or more blocks being tested by a single test protocol |
| Timeset | Cyclized tester time formats: RZ (return to zero), NRZ (nonreturn to zero), RTO (return to one), DRNZ (delayed nonreturn to zero) |
| UDL | User-defined logic |
| VC | Virtual component |
| Virtual socket | A placeholder for a predesigned block that includes its test interface |
| VSIA | Virtual Socket Interface Alliance |

Making a Test Plan

The process of creating an overall DFT test plan begins with the test designer receiving, from the FEA-generated input, test techniques for each block, expected test vector specifications, test time requirements for production, and special parametric or analog tests supplied by the I/O and analog/mixed-signal ("AMS") requirements module (xref). Creating a complete DFT plan therefore comprises effective organization and use of this data.

Test Requirements for Non-Mergeable Blocks

A chip-level test requirement includes the non-mergeable block test requirements, which, in turn, comprise four components: test models, test control logic such as dedicated test ports and test modes, test isolation logic such as safe-outs, and test validation components such as test benches and test vectors. When non-mergeable blocks are delivered to the customer, they specify: test access and control data (such as test modes, activation, and deactivation), test protocols, test data, tester format, and test application/setup time.

Test Requirements for Mergeable Blocks

The chip-level test requirement also contains test information for all test-mergeable blocks, which, in turn, comprise test method, test control logic, interconnect implementation mechanism, and test validation components.

Chip-Level Test Requirements

The chip-level test requirement also includes DC test requirements, AC test requirements, lddq test requirements such as power distribution, and analog test requirements, Chip-Level Test controller Test controls at the chip level can be the test interface, JTAG, PRPG, and MISR.

Component Attributes Matrix

The designer may use a matrix to plan the test development environment for components in the BBD design. This matrix documents issues, recommends or evaluates possible resolutions, and notes where additional information is required. The matrix also identifies areas of conflict where there are difficulties and incompatibilities in the test design.

Using DFT Rules

Once the designer has filtered and classified the chip-level test requirements by using the matrix, he or she can process these requirements with a set of DFT architectural rules. Using architectural rules allows for the establishment of common access, test control, test clocks, and asynchronous attributes, and trade-offs based on available DFT architectures to enable the creation of a unique hybridized DFT architecture for the chip being designed.

Adaptability is a key feature of the BBD DFT strategy of the present invention. To ensure proper test integration, the designer assigns a virtual socket to each non-mergeable block based on the constraints and test information received at the end of front-end acceptance. The DFT architecture completes the specification by integrating these virtual sockets into the rest of the chip-level test requirements. Each virtual socket has a socket access port (SAP) mapped to the chip access port (CAP) to effect such a transformation of the test data.

Before the designer can make a test plan and start preparing the design for test, he or she must check the group's DFT architecture rules for consistency and cohesion.

Consistency

Consistency is the degree to which test development coverage for each component is complete, in four operating modes: normal, test, isolation, and boundary (co-test). The designer may use a checklist for each component to ensure that its model, controller design, isolation, and test validation values are consistent between each block and the chip-level description.

For example, in a design with three non-mergeable blocks, A, B, and C, the test controller design can test block A only if blocks B and C are isolated. The test controller specification must specifically enable a block A test access only when both B and C are isolated. If block B and block C are to be tested concurrently, the test controller specification must enable test access to both blocks with a test validation scheme that synchronizes their test data in a single simulation environment.

For this example, the table of FIG. 60 illustrates an exemplary block A consistency check.

Cohesion

Cohesion is the degree to which test methods in a flow are related to one another. There are five closely-related test method parameters; each can modify the others. For example, the test access method defines the activation condition of a test protocol, the test protocol defines how test data is sequenced, and test data is broken down to a set of patterns having a specific tester timeset. And since test access to an embedded block is sensitive to chip I/O restrictions and controller design, the cohesion of these parameters requires a unique verification style to maintain test data integrity. The five test method parameters are therefore test access, test protocol, test data, tester timeset, and test time.

Architecture Rules

Figure 61:
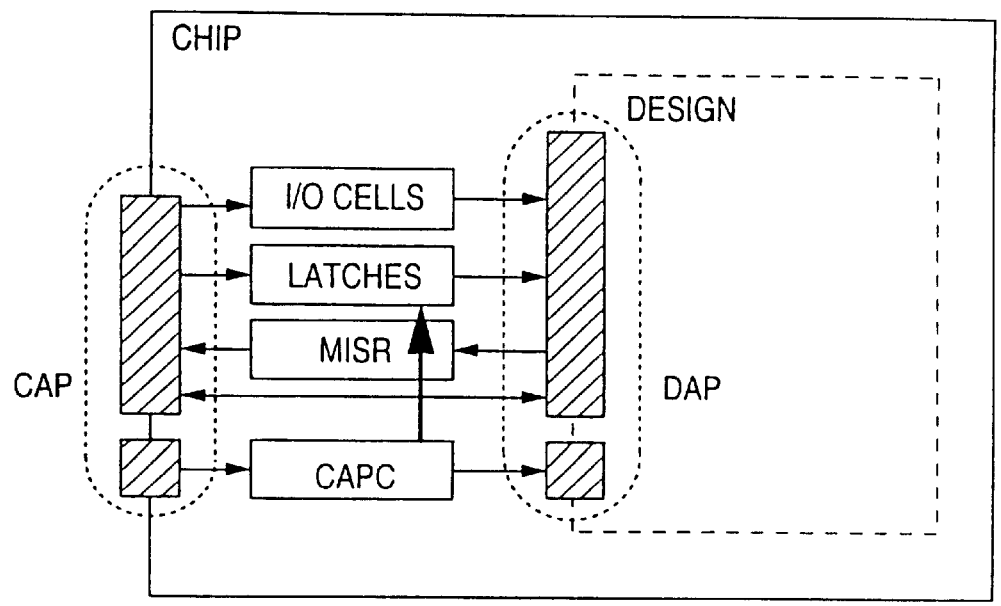
FIG. 61 illustrates the top-level hierarchy of a chip from the DFT perspective using the method of the present invention.
Figure 62:
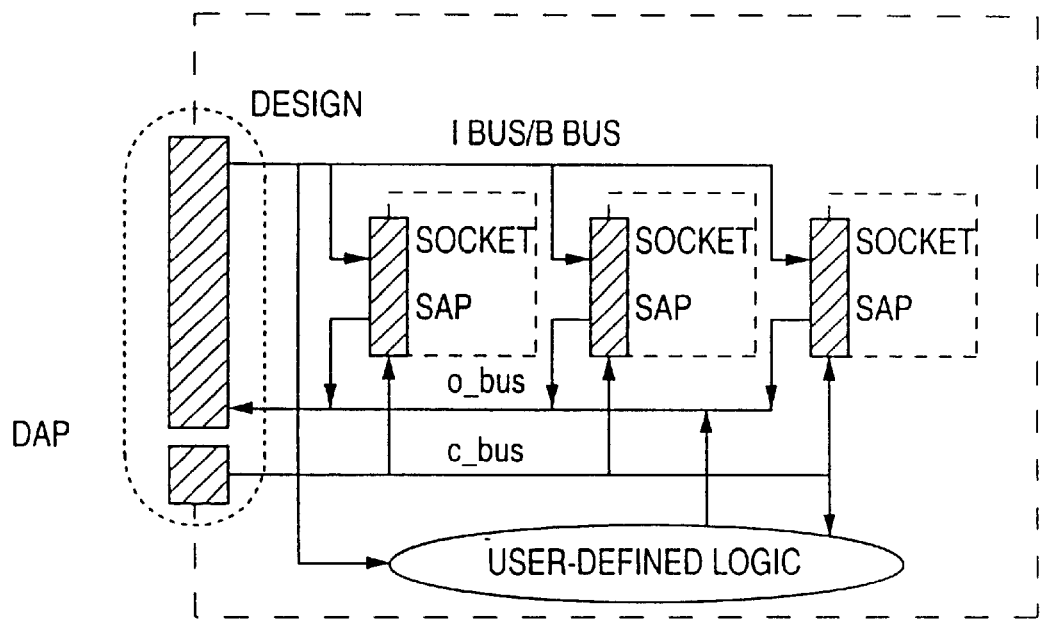
FIG. 62 illustrates a design made up of functional blocks and socket access ports ("SAPs").

FIG. 61 illustrates the top-level hierarchy of a chip from the DFT perspective. Before the designer begins the DFT process, the designer should visualize the chip as shown in FIG. 61, rather than as a collection of functional blocks. FIG. 62 shows the design made up of functional blocks, with the SAPs and a DAP where non-mergeable blocks are socketed.

In practice, functional blocks in the design can be described in behavioral, RTL, gate, or mixed-level HDL. The HDL files are organized in a directory structure. The preferred way to organize test files is to create a directory hierarchy as described in the following architecture rules, then put links in the test directories to the data files in the design hierarchy. In this way, the chip can be built with different configurations using HDL directives.

Because the chip-level DFT architecture has only a single level, all attributes are at the top level. It is therefore intended that the designer should use the following architectural rules in accordance with the method of the present invention to put attributes in extractable comment form in the top-level design file:

1. Describe the DFT architecture hierarchically.
2. Create a single chip access port (CAP) at the highest level of hierarchy. The CAP specification should preferably:
   a. Map all test control and test data pins to the package-level pin to consistently maintain design and test data.
   b. Separate the test control pins from the test data pins.
   c. Set the test control pin attribute to either dedicated or selectable:
      i. dedicated if it should preferably be exclusively deactivated in normal mode; a dedicated pin cannot be shared with a functional pin.
      ii. selectable if it can be set to a test constant a logical value—throughout a test; a selectable pin can be shared with a functional pin.
   d. Set the test data pin attribute to:
      test_clock if it is used as a clock during test; a test_clock pin can only be shared with an external functional clock pin.
      test_async if it is used asynchronously during test for reset; a test_async pin can be dedicated or shared if it does not cause any conflicts with other tests, test modes, or isolation modes.
      test_group (i) where (ii) is the test_clock with which the test_group pin is synchronized during a test.
   e. Describe the following for each test mode:
      i. The test setup needed to gain access to the device under test if it requires an accessing sequence. Describe the protocol, such as JTAG instruction, test clock, or test reset.
      ii. The test execution needed to perform the actual test. Describe the test sequence in phases down to the task level, the iteration counts, the cycle time, the test length, and the test results.
      iii. The test postprocessing needed to close out the test and put the chip back in the default condition (normal mode).
3. Create a CAP controller specification that describes the test setup and test processing sequences for each test mode. The specification should preferably be implementable (synthesizable) and verifiable (via test benches and test sequences).
4. The designer may optionally specify a set of staging latches to fold the internal test data bus into the available test data pins. The staging action should preferably not alter the subsequent test result. The staging should preferably be
   a. Free from state-altering, time-sensitive signals. Use test_async signals or follow the persistent order of occurrence relative to the test_clock to resolve it.
   b. If it is not free from state-altering, time-sensitive signals, it should have extra test pins. This rule should preferably be used judiciously to avoid test packaging problems.
5. The designer may optionally specify a test data signature analysis capability such as MISR to compress the test data, which minimizes the physical I/O constraint. The signature analysis should preferably be deterministic for each cycle of operation and should preferably:
   a. be free from X-value propagation by avoiding it at the MISR inputs.
   b. if step a. fails, suppress the affected MISR cycle. This rule should be followed judiciously to avoid the loss of fault coverage.
6. The designer may optionally create a set of other test mechanisms at the chip periphery to perform the following special tests: DC and AC parametric tests such as boundary scan tests; frequency tests such as PLL tests; and mixed-signal tests such as ADO and DAC tests. The control pins for these tests should preferably be included in the table of all test_control pins. The designer might also want to include them in the CAP controller specification to avoid conflicting interactions.
7. Specify a single device access port (DAP) at the next level of hierarchy, the level without I/Os or I/O-related cells, unrestricted to the physical I/O.
8. The DAP should preferably be a hybridized test port that can be formed by concatenating, merging, resizing, and multiplexing generic ports, such as TAP-based ports.
9. The designer should preferably be able to configure the DAP directly from the CAP controller. Partition each configuration into test control, test data, or test isolation ports. In each configuration:
   a. Set the test control port attribute to
      test_con f(k) if it should preferably be used to set the targeted configuration k.
      test_select if it can be set to a test constant.
   b. Set the test data port attribute to
      test_clock if it Is used as a clock during test.
      test_async if it is used asynchronously during test.
      test_group (i) where (I) indicates the test clock to which the ports are synchronized.
      test_direction if it is used to indicate the test data direction. The test direction can only be a 1 or 0 value.
   c. Set the test isolation port attribute to safe_state if it should preferably be isolated during test with a safe state logic value of 0, 1, or Z, and to dont_care if it can be set to a non-floating logic value of 0 or 1.
10. Specify the interconnection of the CAP, the CAP controller, the staging latches, the MISR, the DAP, and the other test mechanisms
11. Specify the CAP controller, the staging latches, the MISR, the design body, and the other test mechanisms in a dedicated section.

12. Specify detail on the DAP the sockets, the UDL, and the test interconnect for the design body architecture only.
13. The design body architecture should preferably be described hierarchically.
14. There should preferably be multiple SAPs at the next level of hierarchy, the socket level.
15. Each SAP should preferably be a recursive image of the DAP with one or many applicable configurations available to the DAP. All configurations of the SAP should preferably be supported by the DAR.

Socketization Rules

Once a non-mergeable block or VC is placed in a design, its I/O ports are no longer accessible from the chip I/O. Its test data, which is created at the I/O ports, is no longer usable either.

In general, recreating test data at the chip level is difficult and unpredictable because design block test values must propagate through other logic blocks. The preferred approach, therefore, is to add accessibility to the design block itself by creating a virtual socket for the design block. The virtual socket includes test access, isolation, and boundary test functionalities accessible from the chip I/O.

The designer can use the virtual socket as a placeholder for the design block in the design, or can also use the socket to put test constraints on the design block itself. A design block is socketized when constraints are mapped to it in a design using I/O mapping and restrictions. The constraints are design-sensitive and conditional, but they let the designer divide each design block socketization task cohesively while keeping track of the design blocks during design integration.

The socketized design block might need extra I/O ports and a logic or test collar to match the chip-level test constraints while maintaining the functional interface. Because the interface timing might be changed slightly, it is best to write the test collar in RTL code, to be characterized or rebudgeted in synthesis for each socketized design block. Adding the test collar at the gate level after synthesizing the whole design might cause timing problems.

The design block socketization rules are as follows:
1. The socket can be described hierarchically but the top level should preferably contain all the test attributes.
2. There c-an be only one SAP per socket.
3. The SAP Is the only reference for test information about how to isolate, test, diagnose, and debug every element in the socket.
4. Each SAP should preferably be constructed or synthesized according to the higher level specification.
5. The designer should preferably be able to verify, at the higher level of construction and context, that each SAP can activate and deactivate normal, test, isolation, and boundary modes. This means the designer should verify the external test information structure of the socket.
   a. The external test information structure should preferably conform to the standardized description language specified in the VSIA compliance rules.
   b. If a standardized description language is not available, the test information structure should conform to the chip-level design test attributes at the virtual socket.
6. Each SAP should preferably be validated at the socket level with the reformatted test data to ensure that it properly performs the test setup, test execution, and test postprocessing sequences. This means the designer should verify the internal test information structure of the socket.
   a. The internal test information structure should preferably include all design block test models, all functional blocks, and all other logic bounded by the socket.
   b. The internal test information structure should preferably be co-simulated and interoperable with the chip-level simulation environment.
7. In normal mode, all test logic associated with the SAP should preferably be deactivated simultaneously and directly, not sequentially, from the SAP interface. Normal mode should be activated by a single test control port.
8. In isolation (rest) mode, all test logic associated with the SAP should be deactivated and assigned to safe-state values without intermediate conflicts. No functional states may be implied in the isolation sequence.
9. In test mode, all test logic associated with the SAP should preferably be enabled by a single activating sequence, then optionally by a configuring sequence, before beginning a test sequence. To minimize test time, successive test sequences of the same configuration should be bundled.
10. All of the socket's peripheral logic should be testable in boundary (co-test) mode, including the test logic associated with the SAP.

Designing a Top-Level Test Logic Specification

When the designer designs a top-level test logic specification to meet coverage and time requirements, he or she will need to make tradeoffs that increase the parallel nature of the test logic. The major decision is how serial or parallel to make the individual block tests.

The test constraints are used for each virtual socket with the socketization rules to establish test requirements for constructing the test collar. From the test access perspective, the SAP is complete and adequate for test integration purposes. To avoid design changes that can cause design and test conflicts, the SAP should not share or use functional elements of the block. This separation makes even more sense when different block types—soft, firm, or hard blocks—are utilized, making it possible to avoid unpredictability during test integration.

In general, each architecture aims at a unique set of solutions or a specific set of tools, and targets a specific range of test applications. Many architectures originate in specific design environments that span almost every role of a design. Therefore, a development flow is needed that does the following:
1. Characterizes and categorizes test problems in the design context;
2. Addresses the trade-offs for each architecture;
3. Provides additional alterations for each targeted design.
4. Until the advent of the present invention, BBD test problems were evident in the following areas:
   Test data reusability
   Test socket design and socket information
   UDL and chip-level interconnect testing
   Test packaging
   Test validation
   Test protocols
   Diagnostics and debugging These issues are related to the assumptions made during BBD design planning. However, the design plan requires many specific processes to package a design block with reusable test data, such as: creating the BBD design for test, customizing the design block test interface, designing and validating the test access and control mechanism, and packaging the test with the chip I/O and within the test budget.

DFT Taxonomy

DFT architectures are classified by their test methods, their test interfaces, and the types of blocks with which they can be used. There are four different generic DFT architectures, but they rarely have similar test interfaces. For example, most chips have embedded RAM that uses a memory BIST interface while the rest of the chip might use a scan method. The table in FIG. 63 lists the typical choices in a design scenario.

Procedure for Creating a Top-Level DFT Architecture

Figure 64:
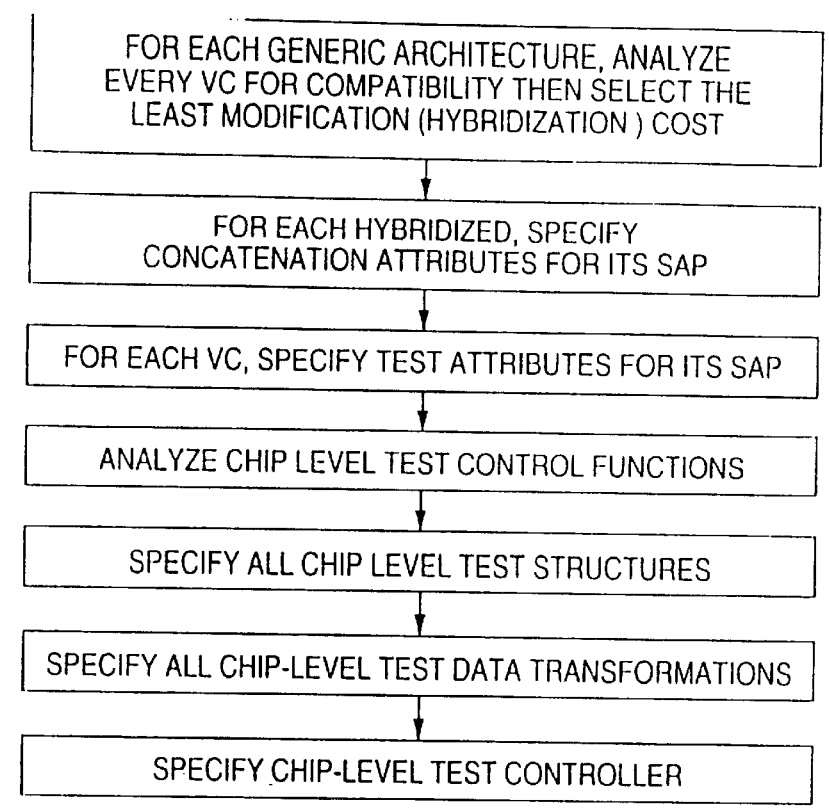
FIG. 64 is a flowchart illustrating the top-level architecture specification procedure for the method and system of the present invention.

The flowchart of FIG. 64 illustrates the procedure used to create the top-level architecture specification and specify chip-level test structures. The DFT plan should preferably specify the block-level test logic for every block on the chip. Blocks with test logic should receive interfaces to the top level. Blocks without test logic should receive test logic requirements. Transfer both of these design requirements to the block design task, preferably creating both the top-level test logic and the access mechanism.

Figure 65:
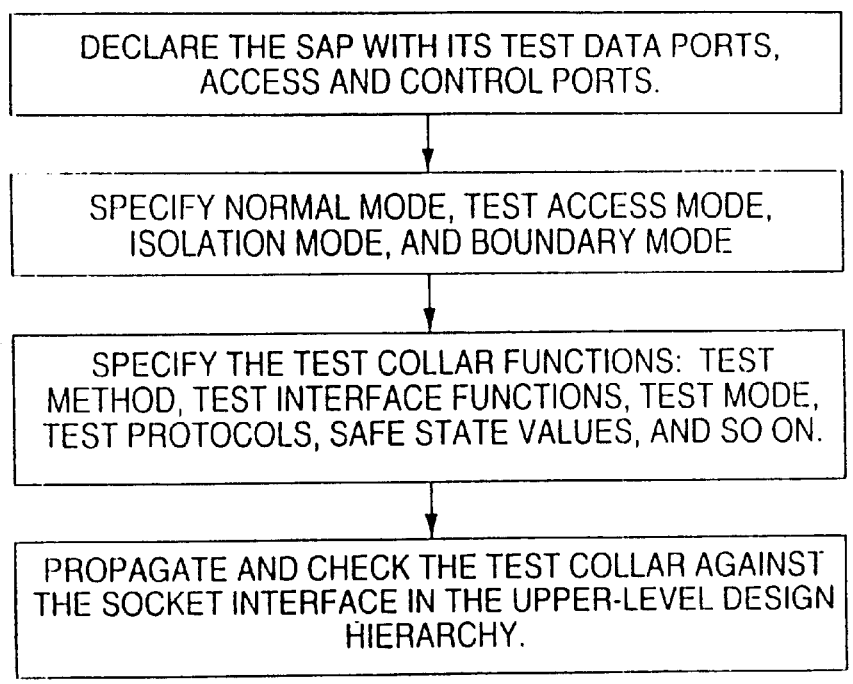
FIG. 65 illustrates a socketization procedure of the method and system of the present invention.

The flowchart in FIG. 65 illustrates the socketization procedure used to create the block test logic specification. For each socket in the design, specify the test collar for each design block to conform with the DFT architecture as illustrated.

Creating a Test Generation Mechanism

The BBD strategy for test generation can comprise manual vectors, ATPG, or mixed. The translation and concatenation mechanisms should be defined to match the top-level test logic and the individual blocks' test mechanisms. In BBD, test development comprises two independent processes.

1. Block-level test development for each virtual socket. In most cases, this process consists of the following tasks:
    a. SAP declaration: Add the SAP to the behavioral model interface and re-instantiate the block with its virtual socket.
        i. Test logic insertion: Add test access, isolation, interconnect test, and test control logic to form the test collar around the targeted block. For best results, describe the test collar in synthesizable RTL format.
        ii. Test data transformation: Expand and map test data into SAP ports. One should modify the block-level test bench to accept the new test data format. To streamline the test flow, one might alter the tester timing on some blocks to minimize test setup time per socket and concurrently run multiple block tests.
        iii. Test verification: Modify the block-level test bench to verify the test logic. Verify the target block with a subset of the complete block-level test vector set to ensure test data integrity before and after the previous steps
2. Chip-level test development for all test-mergeable blocks and chip-level tests such as DC tests and analog tests. This process comprises the following tasks:
    a. Test logic insertion: Add the test controller, dedicated test pins, DC test logic, analog test logic, and, it necessary, clock muxes and test clocks for all tests. This task also involves scan insertion for test mergeable blocks and UDL if necessary.
    b. Test generation: Use ATPG tools to generate test data for the test-mergeable blocks and UDL, or capture cyclic functional test data. It is important to meet fault coverage objectives with the targeted manufacturing test data.
    c. Test verification: Modify the chip-level test bench to verify the test controller and perform DC tests, analog tests, tests for all virtual socket in the design, and the UDL test. These tests might need pre- and post-test sequences such as JTAG requires.
    d. Test data formatting: Take the simulation results and put them in a test data description language such as WGL.

We turn next to the application of DFT at the block level in a BBD DFT methodology context. The final product of an intellectual property core or design block is a "test-readied" block with a standardized or generic test interface and a test data set that can be reused at the chip level. The design block socketization scheme is employed to transform a design block into an integral part of the chip level tests while reusing most of the test procedure and apparatus generated during the designing of each block. The inventive BBD DFT mix-and-match strategy provides a flexible approach to integrate a variety of pre-designed blocks with different test methods and test interfaces by sorting out non-mergeable blocks in contrasting to the most popular scan based test methodology. The reason to make scan design methodology the basis for test mergeable selection is simply the ease of automation purpose.

Figure 68:
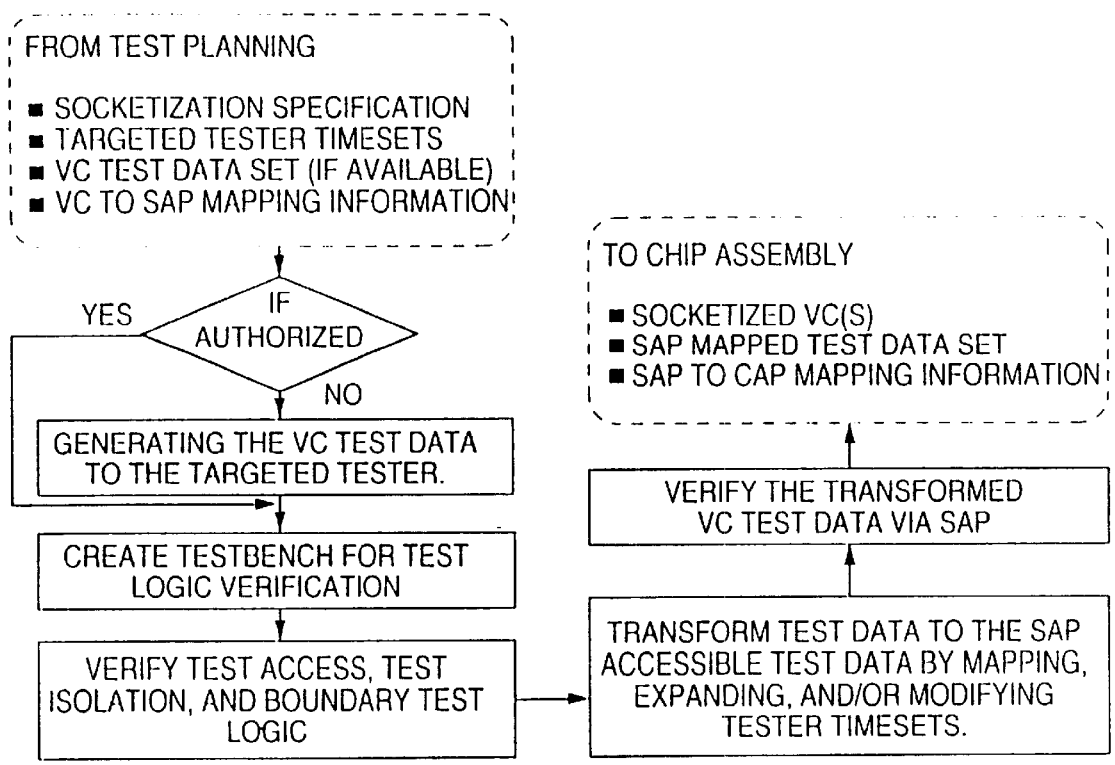
FIG. 68 illustrates a test flow from planning to chip assembly according to the method and system of the present invention.

The block design plan involved in many specific processes to package a design block with re-usable test data is based on a standardized or customized design block test interface, taking into account certain assumption about accessibility of block I/Os. However, once embedded, the block I/Os can be placed in different contexts and potentially become inaccessible. To ensure the ease of integration, the test interface should be separate from the functional interface to provide some orthogonalities from the chip design perspective. In BBD, one attempts to mix and match the design block interfaces and unify them at the chip level (as illustrated in FIG. 68). Therefore, the flexibility and modifiability of the test interface should be provided to design and validate the test access and control mechanism, and to package the test with the chip I/O and within the block level test budget. As understood by one skilled in the art to which the present invention pertains, though possible, the use of an On Chip Bus (OCB) as part of the test bus is contemplated by the present invention but beyond the scope of this description.

Non Mergeable Blocks

DFT logic and test vector verification functions let the designer run shorter, production ready tests earlier in the production cycle. DFT scan paths provide access to chip and system states that are otherwise unavailable. Memory BIST uses algorithmic test vectors to cover different embedded memory fault classes. Logic BIST takes advantage of random testable structure of scan based design to reduce test access and test data bottlenecks. However, each predesigned block may become non-mergeable for a number of reasons. In general, non-mergeable blocks are:

Synthesizable RTL soft blocks that may not be compatible with common test methods due to lack of internal test accessibility (e.g. gated-clock, latch-based, data paths), or lack of fault coverage (e.g. asynchronous).

Gate-level soft blocks that may not be compatible with common test methods such as scan methodologies (i.e. synchronous), scan styles (e.g. mux-scan, clock-scan, LSSD).

Compiled blocks that are generally array-based. For example, embedded RAMs, ROMs, DRAM, FLASH, etc. do not have the same fault models as combinational logic. These blocks require large algorithmic test patterns.

Hard blocks that are created with a specific test method but does not have the infrastructure available for test integration. Generally, these blocks should preferably be delivered with a specific block level test data set with or without a specific test interface.

Legacy blocks that are created with or without a specific test method but does have the infrastructure for integration. Generally, these block may not be modified to avoid unknown consequences.

Test Collars

Figure 66:
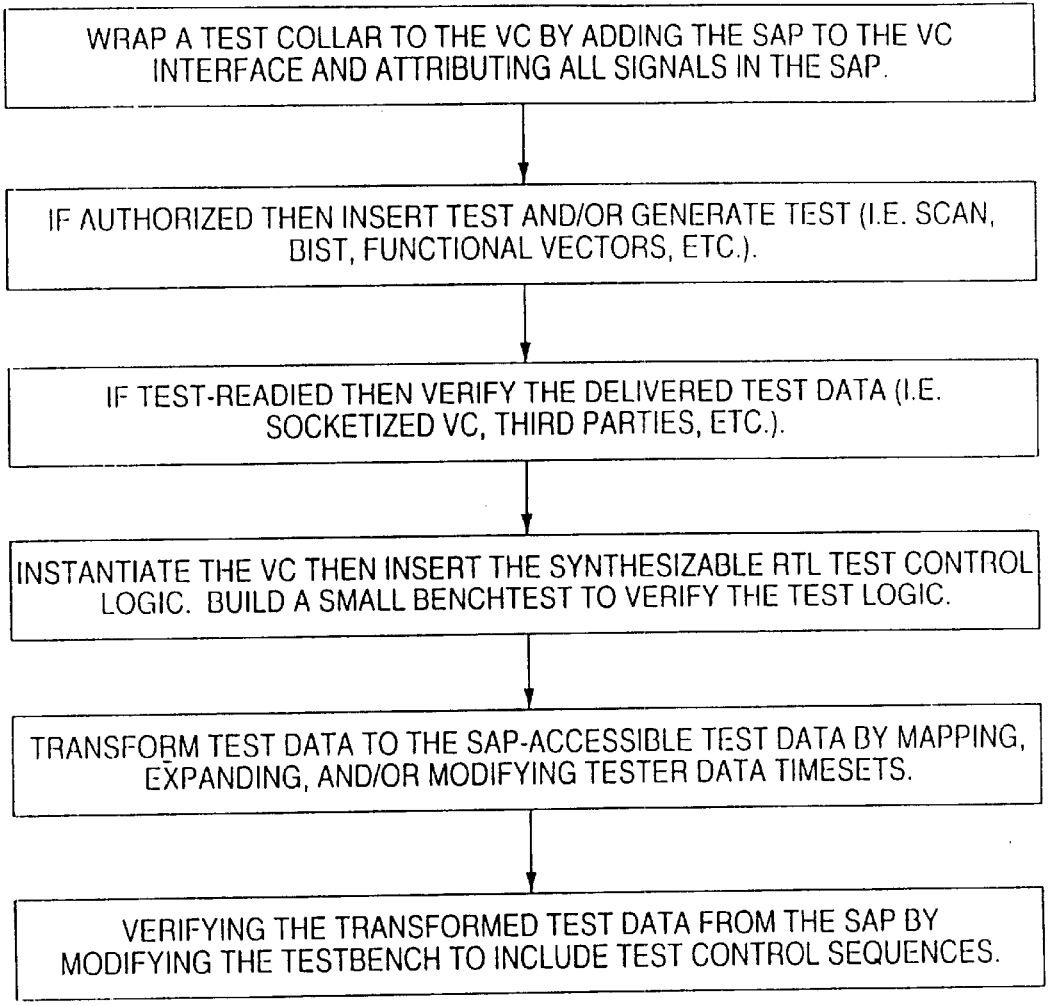
FIG. 66 illustrates a block level test development procedure of the method and system of the present invention.

The socketized design block can be modeled by creating a new module that describes the socket with the SAP specification, instantiating the original design block, and inserting test logic between them, as illustrated in the flowchart of FIG. 66. The socketized design block first restores the design block functional interface, add test access, test isolation, boundary test structures then provide the basic test interface (e.g. TAR scan, BSR, or direct-muxes) as defined during the chip planning. The result is the SAP with test attributes added as comments for each associated test I/O port. Each non-mergeable block will be wrapped by a test collar to add test access, isolation, and interconnect test facilities for performing test setup, test execution, and test post processing on a block by block basis. The output is a socketized design block including:

1. test access and control (e.g. test modes, activation, and deactivation)
2. test protocol (e.g. functional, mux-scan, BIST, diagnostics);
3. test data (e.g. test language, vector size, fault coverage);
4. tester format (e.g. tester specification, timesets, test speed);
5. test application time (e.g. no test setup time);

Adding Testability

For each non-mergeable block which does not come with re-usable test data, the design planning phase can specify the test interface, test method, test data format, expected fault coverage, and test budget by inserting test structures and estimate the overall area and timing cost. This estimate becomes the constraint for adding testability to each block.

Synthesizable RTL Soft Blocks

Figure 67:
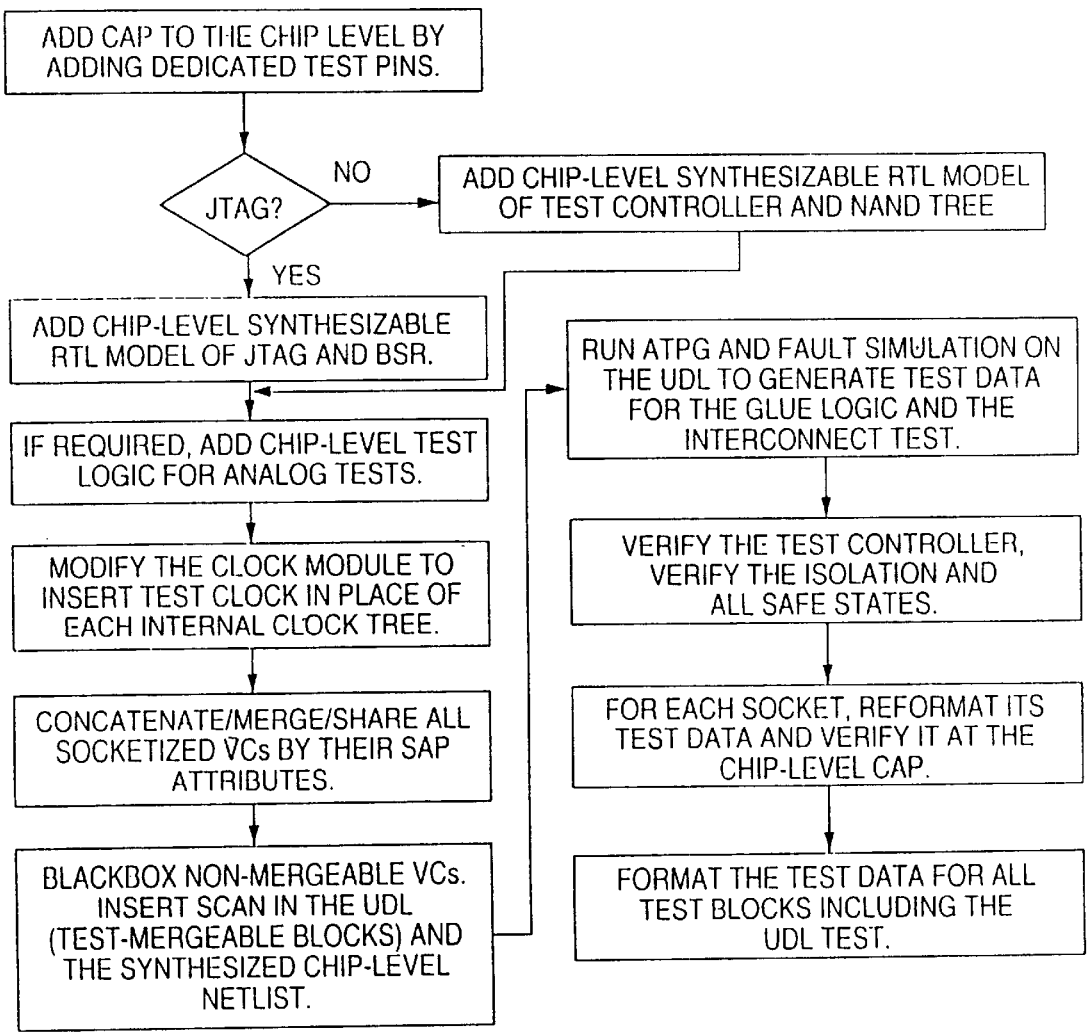
FIG. 67 illustrates a chip level test development procedure of the method and system of the present invention.

If the pre-designed block is a synthesizable soft block which does not compatible with scan based test application then fault coverage could be a problem. For example, scan design rule check can be done at the RTL or gate level to screen out scan violations. Since scan chain or test points can not be easily inserted into the model, sequential ATPG can be used in conjunction with functional test vectors, as illustrated in the flowchart of FIG. 67. The fault coverage for this type of design is difficult to predict and fault simulation should preferably be used to establish the re-usability criteria of such block during the planning phase. The TBA based test collar is the best test interface but the BSR based test collar could be considered if test budget for the block is allowed.

Verification

Moving now from DFT to design verification, the primary objective of the verification method and system of the present invention is to ensure that a completed design (at final tape out) meets the customer's functional requirements as specified in the Functional Specification and Chip Test Bench, supplied as part of front-end acceptance. A secondary objective is to achieve the primary objective in the minimum time possible.

It is especially essential to the proper function of the present invention, as it is to any design test scheme, that the customer-supplied Chip Test Bench form a complete test of the customer's requested functionality. This assumption is preferably emphasized during front-end acceptance. The BBD design flow will thereby incorporate grading of the Chip Test Bench while running on the Functional Specification model, thereby providing a measure of the Chip Test Bench.

The inventive approach is to utilize both the Functional Specification and the Chip Test Bench in an integrated manner, to insure that the two are consistent. Subsequently, as detail is added and refined through chip planning, chip assembly and block design, the design is re-verified via the Chip Test Bench to ensure that functionality remains consistent with the original Functional Specification. Verification of progressively more-detailed views may be performed at the complete chip level or at the individual block level with distinct Block Test Benches extracted from the Chip Test Bench, as described below.

Experience reveals that bus logic and the interaction of various blocks connected along the same bus can take significant time to resolve, causing iterative re-designs if not addressed early and continuously in the design process. For this reason, particular attention is given to validation of the bus functionality early in the design cycle. The bus and associated logic is therefore identified at an early stage and verified, independent of the rest of the design, using Bus Compliance Test Benches, as described below. However, it should be noted that the preferred verification flow of the present invention is flexible enough to handle a wide variety of designs with rapid turnaround. For example, if a design uses simple busses or the designer has significant experience with the blocks attached to the bus, then some or all of the bus compliance testing may be deferred. Similarly, if some or all of the blocks are either simple or reused from a prior design, then a portion of the individual block verification may be skipped, and verification deferred until the chip level verification stage is reached.

The detailed flow to be followed for a particular design should be established as part of the FEA process. FIGS. 12–15 provide a generalized flow of the tasks to be performed during functional verification according to the present invention. These figures will be described in detail, with cross-reference make to chip test bench FIGS. 69–73. It should noted that in FIGS. 12–15, a large arrow signifies task flow, a smaller arrow signifies task inputs, and a dashed arrow signifies an optional bypass path.

Figure 12:
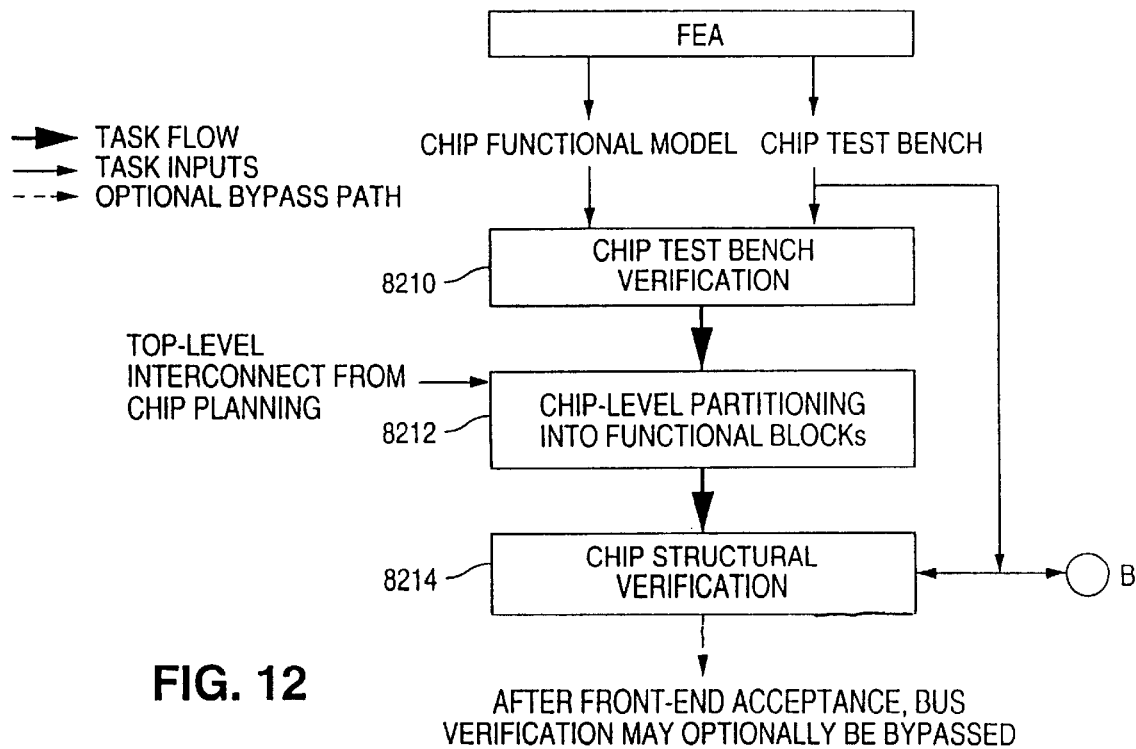
FIGS. 12, 13, 14, and 15 illustrate functional verification flow in accordance with the present invention.
Figure 69:
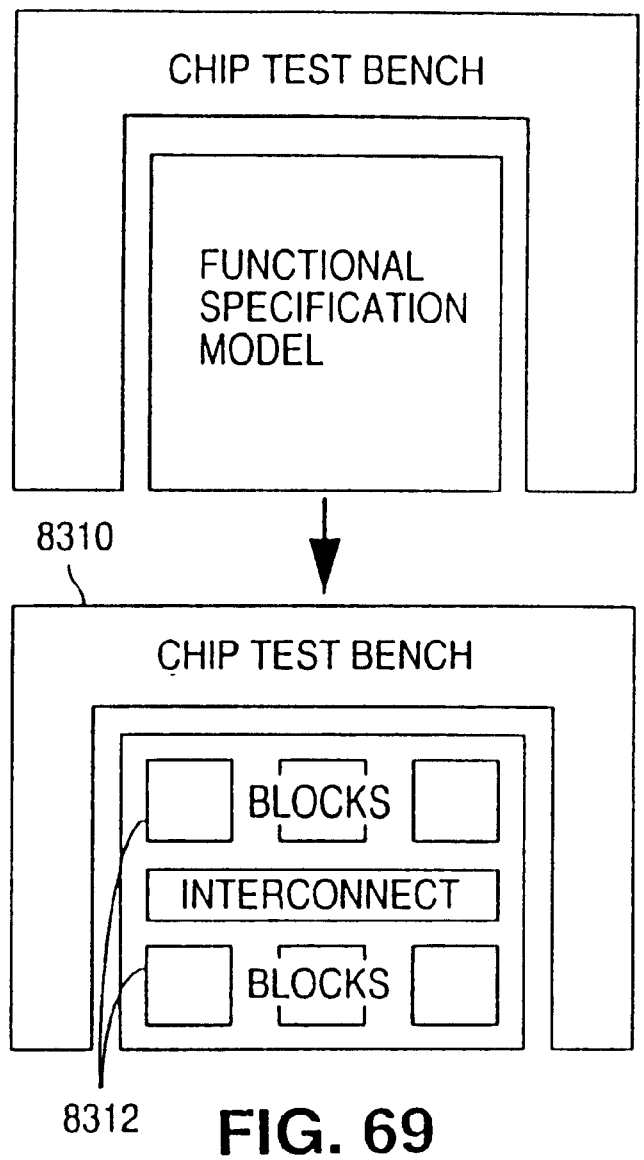
FIG. 69 illustrates a designer's view of the front-end acceptance verification tools of the present invention.

Referring to FIG. 12, after completion of FEA, as described above, the method of the present invention continues with chip test bench verification step 8210, wherein the chip-level functional model is exercised with the chip test bench 8310 in FIG. 69. Both the model and the test bench are customer-supplied, the purpose of verification being to ensure that the test bench and functional model are consistent. The model will preferably be in Verilog, VHDL or executable C code, although any compatible language will suffice. Chip test bench 8310 will be in a file compatible with the model. Any miss-matches between the model and the test bench will be fed back to the customer and either the model or the test bench will be modified to achieve internal consistency.

Next, the chip test bench is graded while running on the functional model. Such grading provides a "goodness" measure or coverage metric, of the test bench by measuring one or more of the following attributes: statement coverage, toggle coverage, FSM arc coverage, visited state coverage, pair arc coverage, path/branch coverage and/or expression coverage. This coverage metric is then fed back to the customer. The coverage metric may highlight areas of the design that appear to be poorly tested, as where a design is inadequately tested or the design includes redundant functionality. In either case the customer may chose to modify the test bench or the model to improve the coverage metric, thereby resetting the project start time for the BBD design methodology herein described.

Once the chip test bench is certified consistent with the functional model, a new view 8312 (in FIG. 69) of the chip is created at step 8212 (of FIG. 12) by combining the block functional models for each of the blocks with the defined glue logic between these blocks. The block functional models 8312 are either customer supplied or created via a "dipping" process during FEA, as described above. A glue logic model is also specified during chip planning, as described above.

Referring again to FIG. 12, chip level structural verification step 8214 comprises simulating the block functional model of the chip with the chip test bench. Any discrepancies are resolved by modifying one or more of the block functional models 8312 or the glue logic model, and rerunning the simulation. This step ensures that the block functional models are consistent with the chip functional model.

Figure 13:
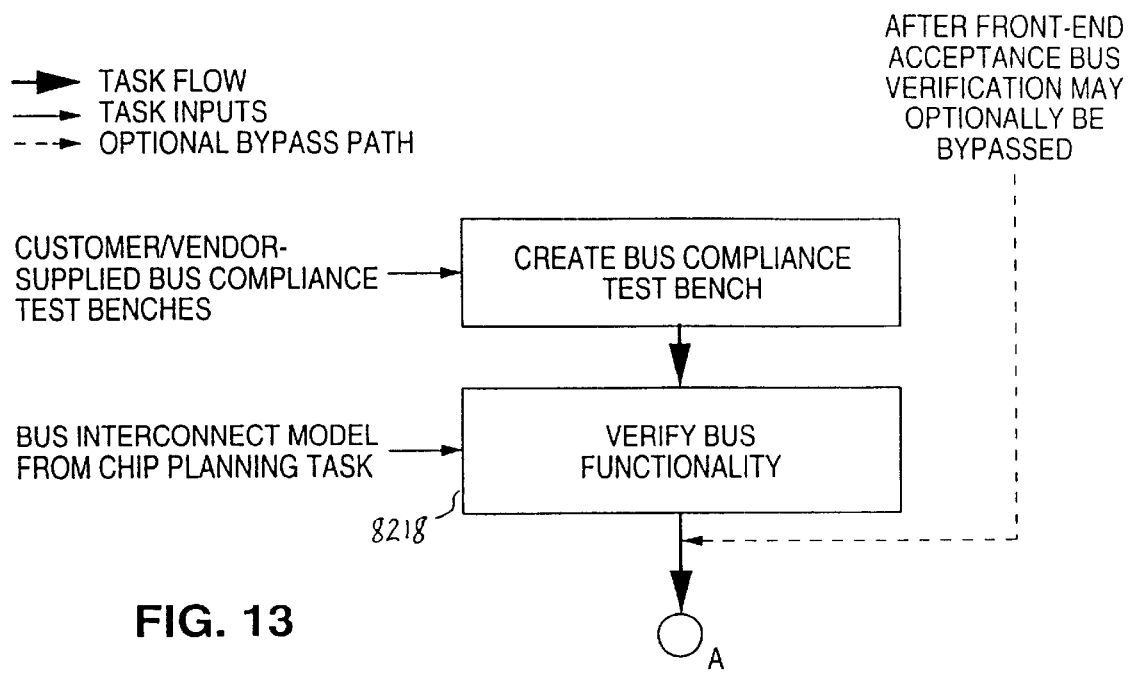
Figure 14:
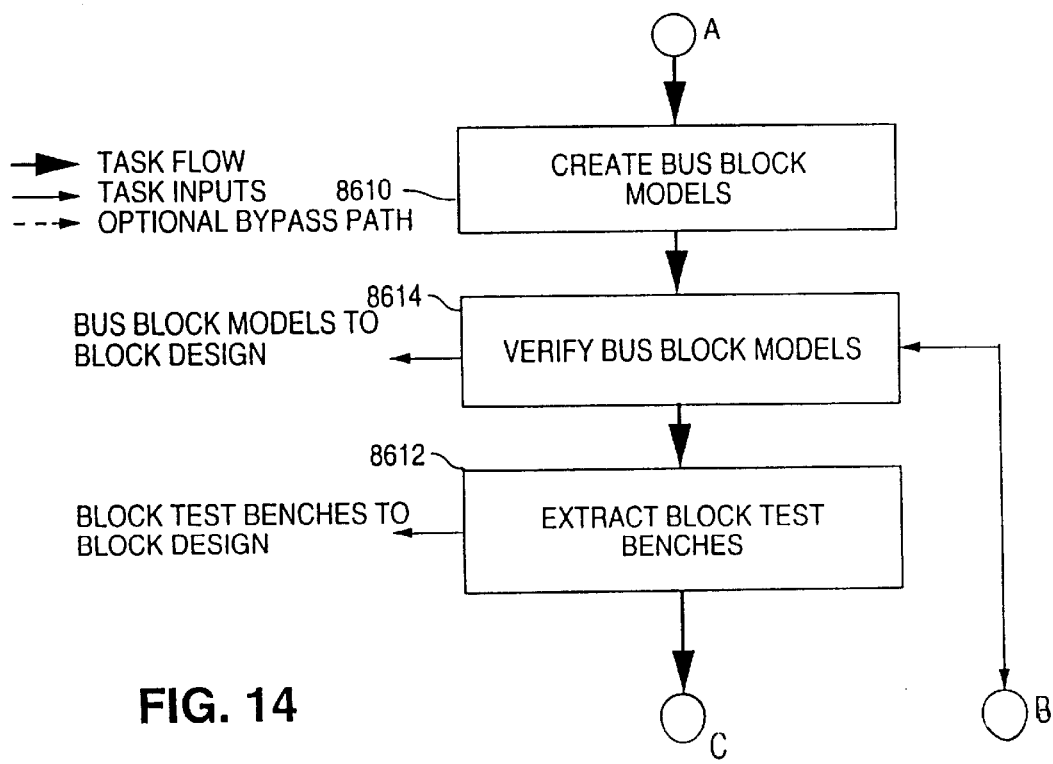

Turning next to FIGS. 13 and 14, the objective of the bus verification flow is to ensure that the bus logic within the chip operates correctly and that interactions between the different bus elements will not cause bus protocol errors. Thus, compliance vectors are created for the bus design. These vectors may be based on compliance test suites supplied by the customer or block design supplier. The vectors will have to be manipulated to correspond to the specific bus topology of the design. Where compliance vectors have not been provided, they will have to be written by the design team, preferably in such a manner that they exercise the interactions of the various blocks attached to the bus, exercise all boundary conditions, and verify that bus errors are correctly handled.

Step 8218 in FIG. 13 provides for the verification of bus functionality. The bus compliance vectors are simulated against the cycle-accurate model of the bus supplied from the chip planning stage discussed above. Any errors must be resolved by either modifying the compliance vector set (not shown) or by modifying one or more of the bus logic elements 8512 shown in FIG. 70. This step is repeated until the compliance test suite executes successfully on the bus logic model.

Referring next to FIG. 14, bus block model and test bench creation steps 8610 through 8614 are illustrated. The objective of both bus block model creation step 8610 and test bench generation extraction step 8612, as well as bus block model verification step 8614, is to create a high level behavioral model and associated test bench for each of the blocks within the design. These are passed to the block designers and define the target functionality for each of the blocks.

Figure 70:
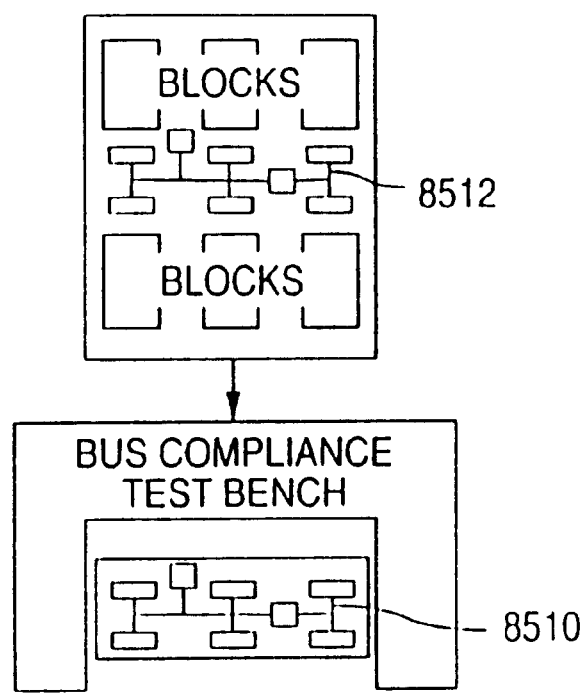
FIG. 70 illustrates a designer's view of moving from chip planning to block design.

Creating bus block model 8510 in FIG. 70 for each block comprises combining the functionally correct, cycle-approximate block functional model 8312 with a cycle-accurate bus logic model for that block. The bus logic is extracted from the bus glue logic model supplied from chip planning and verified above. Some modification of the Bus Functional Models may be required to get the interfaces to "align."

The bus block models are then verified by assembling a model of the chip combining all of the bus block models. The chip model is then verified by simulating it with the chip test bench. While the chip test bench has previously been verified on cycle approximate models, this behavioral block model of the chip has some cycle accurate operations and so some refinement of the chip test bench will be required to get the block model to pass. In some cases, errors may result due to miss-matches in the block functional model and the bus logic, at which time the model may be modified to correct the errors. Once the chip test bench successfully executes on this chip model, the individual bus block models may be sent to the block designers for detailed implementation.

Figure 71:
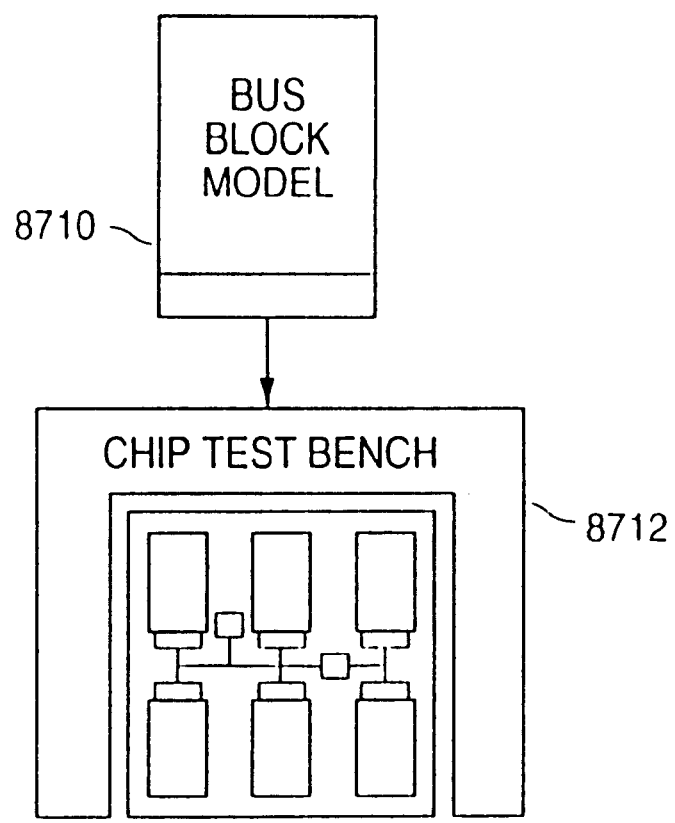
FIG. 71 illustrates a designer's view of the evolving bus block model and test bench generation of the method and system of the present invention.

At step 8612 in FIG. 14, block test benches are extracted. Once the chip test bench executes successfully on the chip level bus block model 8710, as illustrated in FIG. 71, probes can be set on the interfaces of the individual blocks and block test benches can be extracted from chip test bench 8712 as it executes on the model. These block test benches are sent to the block designers for validation of the blocks as they progress through implementation.

Figure 15:
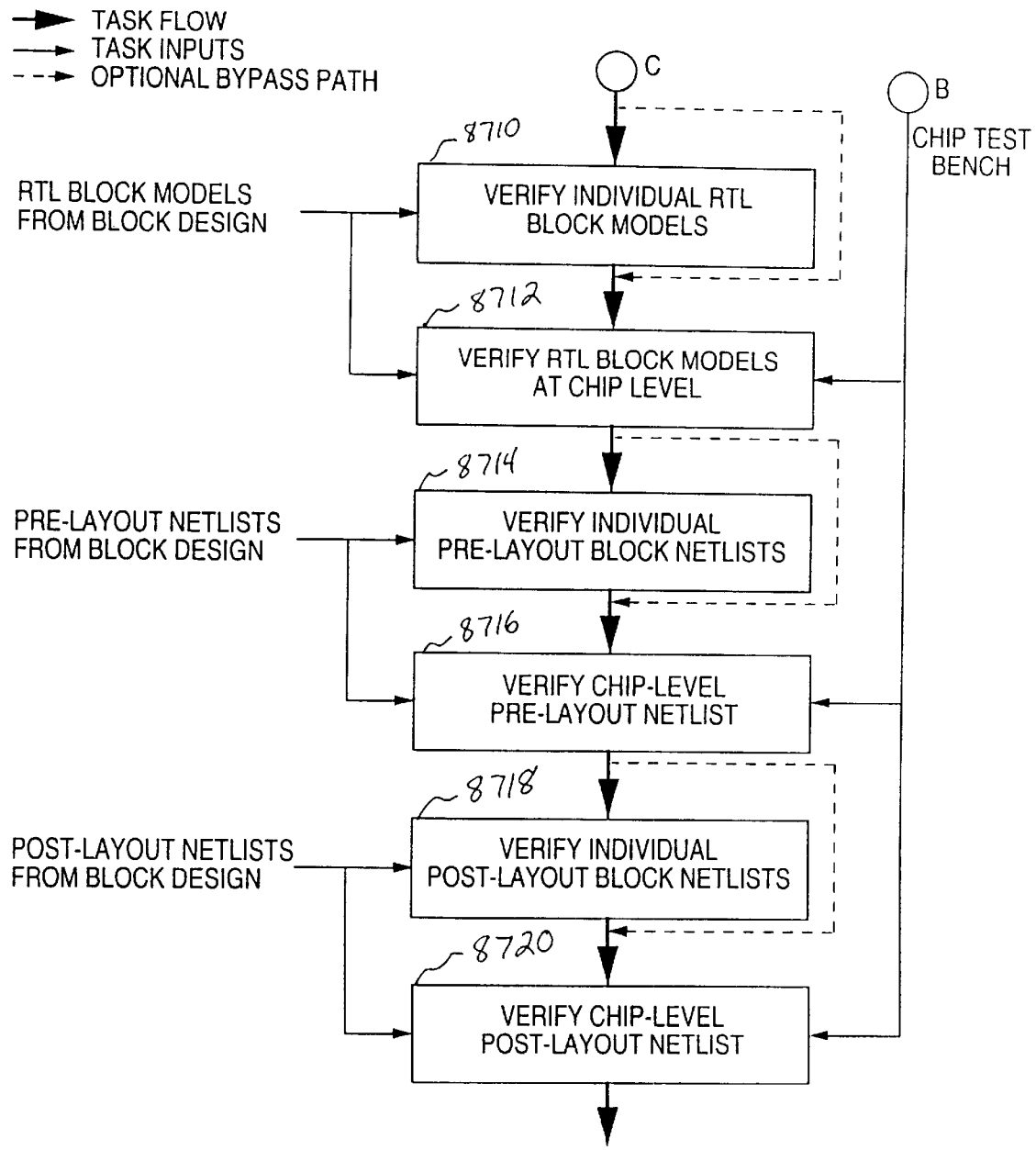

Proceeding next to the logical verification flow illustrated in FIG. 15, the objective of the logical verification tasks is to ensure that each of the blocks is functionally correct as it progresses through the implementation phases of the design (from RTL to pre-layout netlists to post-layout netlists). Also tested is whether the assembled chip continues to provide the required functionality.

Verification may be done either dynamically through functional simulation or statically using formal verification tools that perform equivalency checks. Dynamic verification requires simulation tools that are required and described elsewhere in the BBD methodology flow of the present invent-ion. Dynamic verification also utilizes vector sets used elsewhere and so aids in the migration of the test suite from cycle approximate to cycle accurate in nature. Static verification requires the inclusion of new tools. However, static verification will typically run faster than simulation and provides a "complete" equivalency check, in contrast to simulation, which only proves equivalency to the extent that the test bench exercises the design functionality.

Next, individual RTL block models are verified at step 8710, wherein RTL simulation models created by the block designers are verified against the chip test bench. This can be done by swapping the block RTL model with the corresponding behavioral model in the chip level behavioral model and performing a mixed mode simulation of the chip using the full chip test bench. In the alternative, the individual block RTL model can be simulated with the extracted block test bench. In either case, miss-matches can be expected due to the transition from a cycle approximate model to a cycle accurate model. These miss-matches will be resolved by modifying the test bench. If miss-matches are triggered by missing or incorrect functionality, then the RTL model must be modified to correct the errors.

At step 8712, RTL block models are verified at the chip level. The RTL simulation models for each of the blocks are combined to create a chip level RTL model. This model is verified by simulating with the chip test bench. Again, some errors may be present due to the transition from a cycle approximate model to a cycle accurate model. These errors will be resolved by modifying the chip test bench. Any functional errors will have to be resolved by modifying one or more of the block level RTL models.

At step 8714, individual pre-layout block netlists are verified. The post synthesis netlist simulation models for each block are against the RTL model for that block.

At step 8716, dynamic and static chip level pre-layout block netlists are verified. Dynamic verification can either be done by swapping the block level post synthesis netlist with the corresponding behavioral model in the chip level behavioral model and performing a mixed mode simulation of the chip using the full chip test bench. In the alternative, the individual block level post synthesis netlist can be simulated with the block test bench. In either case, miss-matches can again be expected due to the transition from a cycle accurate model to a model with intra-cycle timing. These miss-matches will be resolved by modifying the timing strobes within the test bench. Static verification is performed by running the equivalency checking tools on the post synthesis netlist and the RTL model for each block. Miss-matches will be resolved by modifying the post synthesis netlist to match the RTL model.

The post synthesis netlists for each of the blocks are then combined to create a chip post synthesis netlist. This chip level netlist is verified either through simulation or statically through formal equivalency checking tools. Dynamic verification is accomplished by simulating the chip post synthesis netlist with the chip test bench. Static chip level pre-layout verification is performed by running the equivalency checking tools on the chip post synthesis netlist and the chip RTL model for each block. Miss-matches will be resolved by modifying the post synthesis netlist to match the RTL model.

At step 8718, individual post-layout block netlists are verified. This step is a repeat of step 8714, but with the post-layout netlist substituted for the pre-layout netlist. The only difference, at the netlist level, between these two models should be the modification of buffers and drive strengths to achieve the timing goals of the laid-out design. Any errors encountered should be limited to the incorrect addition or deletion of buffers. The timing of the block test bench may have to be modified if the post-layout timing changes has moved signals with respect to the timing strobes.

This verification may be done either statically or dynamically. Dynamic verification can be done by swapping the block level post layout netlist with the corresponding block RTL model in the chip level RTL model and performing a mixed mode simulation of the chip using the full chip test bench. Alternatively, the individual block level post layout netlist can be simulated with the block test bench. Static verification is performed by running the equivalency checking tools on the post layout netlist and the RTL model for each block. Miss-matches will be resolved by modifying the post synthesis netlist to match the RTL model.

Verification of the chip level post-layout netlist is accomplished at step 8720, a repeat of step 8716 but with the post-layout chip level netlist substituted for the pre-layout netlist. The only difference, at the netlist level, between these two models should be the modification of buffers and drive strengths to achieve the timing goals of the laid-out design. Any errors encountered should be limited to the incorrect addition or deletion of buffers. Dynamic verification is accomplished by simulating the chip post layout netlist with the chip test bench. Static verification is performed by running the equivalency checking tools on the chip post layout netlist and the chip RTL model. Miss-matches will be resolved by modifying the post layout netlist to match the RTL model.

Figure 72:
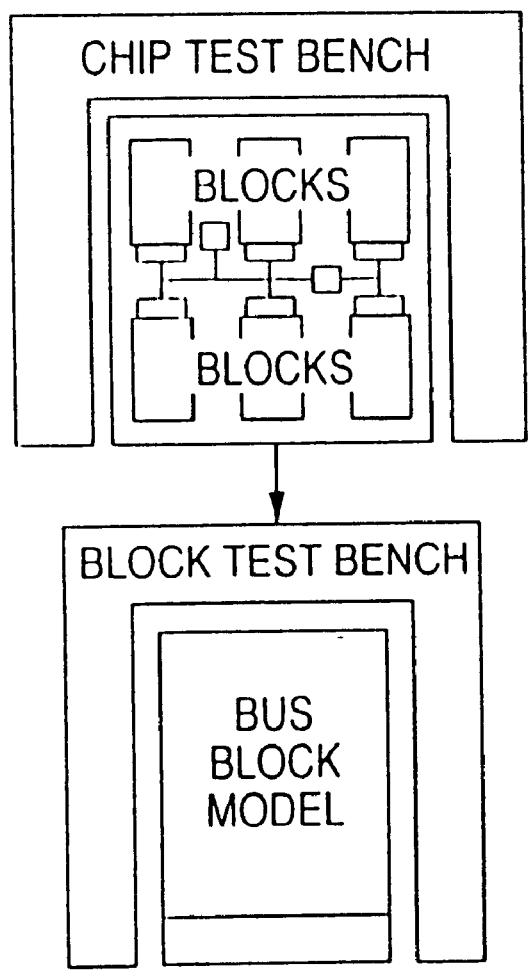
FIG. 72 illustrates a designer's view of a block test bench and a chip test bench.
Figure 73:
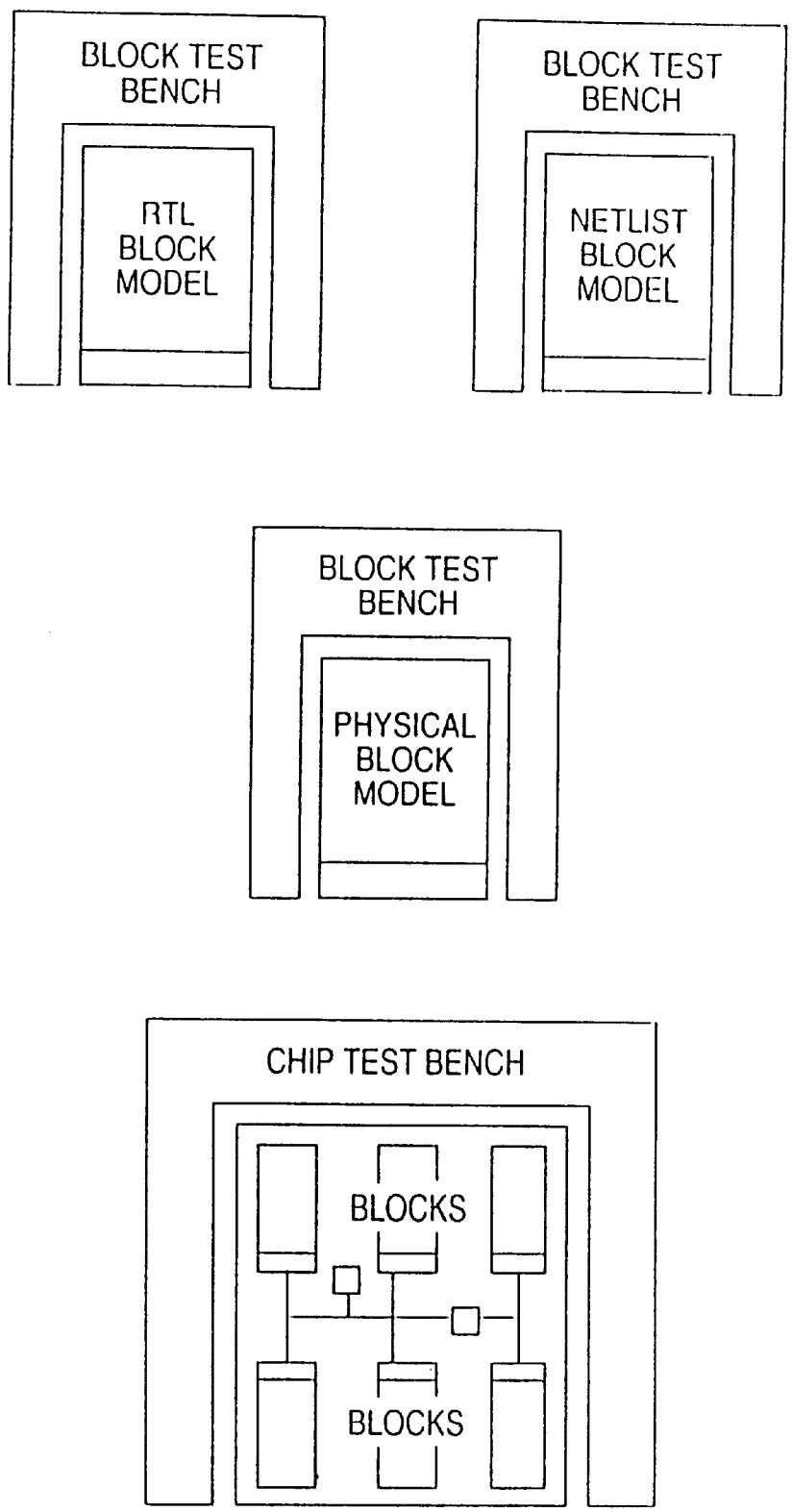
FIG. 73 is a designer's view of block and chip logical verification models.

Finally, physical verification is accomplished as illustrated in FIGS. 72 and 73, wherein both block and chip tape out are verified in the manner understood by one skilled in the art to which the present invention pertains. The objective of the physical verification tasks is to verify that the GDSII files created through the block design and chip assembly phases of the design are functionally correct and free of any violations of the design rules for the target technology.

The GDSII for each of the blocks, created by the block design process, are verified by running DRCs for the target technology. Any errors and warnings are fed back to the block designer for resolution. LVS is also run between the block GDSII file and the post layout netlist for that block. Any errors or warnings are fed back to the block designer for resolution.

The GDSII for the complete chip, created by the chip assembly process, is verified by running DRCs for the target technology. Any errors and warnings are sent back to the chip assembly designer for resolution. LVS is also run between the chip GDSII file and the post layout netlist for the chip. Any errors or warnings are fed back to the chip assembly designer for resolution.

While the invention has been illustrated and described in detail in the drawing and foregoing description, it should be understood that the invention may be implemented through alternative embodiments within the spirit of the present invention. Thus, the scope of the invention is not intended to be limited to the illustration and description in this specification, but is to be defined by the appended claims.

What is claimed is:

1. A method for organizing experience data of a designer regarding a plurality of pre-designed circuit blocks to be used to design a circuit system, wherein the method is executed by the designer and the experience data is used to perform a feasibility assessment for the circuit system design, the method comprising the steps of:

(a) defining a set of parameters by which experience data can be measured;

(b) identifying experience data of the designer regarding the circuit blocks;

(c) classifying the identified designer's experience data into a plurality of classes, wherein the experience data classes correspond to the circuit blocks;

(d) using the designer's experience data to form a decision rule, the decision rule including an acceptance region, a rejecting region, and an uncertain region; and (e) making a prediction using the requirements and constraints based on the decision rule.

2. The method of claim 1, further comprising the step of:

(f) accepting the circuit system design if the estimation is within the acceptance region of the decision rule, and rejecting the circuit system design if the estimation is within the rejecting region of the decision rule.

3. The method of claim 1, further comprising the step of:

(f) refining the classes of the experience data to minimize feasibility assessment error.

4. The method of claim 1, further comprising the step of:

(f) certifying the experience data.

5. The method of claim 1, wherein the identified experience data includes at least one of predicted experience data or collated experience data.

6. The method of claim 1, further comprising the step of:

(f) building a model upon the identified designer's experience data to predict similar parameters of a similar design.

* * * * *